United States Patent
Yamashita et al.

(10) Patent No.: US 9,841,219 B2
(45) Date of Patent: Dec. 12, 2017

(54) STORAGE CONTAINER

(71) Applicant: Sharp Kabushiki Kaisha, Osaka-shi, Osaka (JP)

(72) Inventors: Takashi Yamashita, Osaka (JP); Tetsuya Ide, Osaka (JP); Yasuyuki Umenaka, Osaka (JP); Tomohisa Miyatani, Osaka (JP); Kazuhiro Deguchi, Osaka (JP); Yuka Utsumi, Osaka (JP); Akio Miyata, Osaka (JP); Shigeaki Mizushima, Osaka (JP); Katsumi Kondoh, Osaka (JP); Tomoko Kase, Osaka (JP); Mitsuhiro Koden, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 300 days.

(21) Appl. No.: 14/402,774

(22) PCT Filed: May 22, 2013

(86) PCT No.: PCT/JP2013/064189
§ 371 (c)(1),
(2) Date: Nov. 21, 2014

(87) PCT Pub. No.: WO2013/176169
PCT Pub. Date: Nov. 28, 2013

(65) Prior Publication Data
US 2015/0153087 A1    Jun. 4, 2015

(30) Foreign Application Priority Data

May 23, 2012    (JP) .................................. 2012-118034

(51) Int. Cl.
*F25D 3/08*    (2006.01)
*F25D 3/00*    (2006.01)
(Continued)

(52) U.S. Cl.
CPC ................ *F25D 3/00* (2013.01); *A47B 81/00* (2013.01); *A47B 96/025* (2013.01);
(Continued)

(58) Field of Classification Search
CPC ... Y02E 60/145; F25D 3/00; F25D 2303/085; A47B 81/00; F28D 20/025; F28D 20/003; F28D 20/026
(Continued)

(56) References Cited

U.S. PATENT DOCUMENTS

| | | | |
|---|---|---|---|
| 2004/0151851 A1* | 8/2004 | Miller | B65D 81/18 428/34.2 |
| 2004/0226309 A1* | 11/2004 | Broussard | F25D 11/003 62/236 |
| 2011/0290792 A1 | 12/2011 | Krzak et al. | |

FOREIGN PATENT DOCUMENTS

| | | |
|---|---|---|
| JP | 58-219379 A | 12/1983 |
| JP | 02-017374 A | 1/1990 |

(Continued)

OTHER PUBLICATIONS

Official Communication issued in International Patent Application No. PCT/JP2013/064189, dated Aug. 20, 2013.

*Primary Examiner* — Len Tran
*Assistant Examiner* — Ana Vazquez
(74) *Attorney, Agent, or Firm* — Keating & Bennett, LLP

(57) ABSTRACT

An object is to provide a storage container including latent heat storage materials that provide a high cold insulation effect. A storage container 401 has an electric cooling function and stores an object. The storage container 401 includes at least one storage chamber 100 that stores the object; a first latent heat storage material A that is disposed in the storage chamber 100 and has a predetermined phase change temperature; and a second latent heat storage material B that is disposed in the storage chamber 100 and has a phase change temperature higher than the phase change temperature of the first latent heat storage material A.

4 Claims, 45 Drawing Sheets

(51) Int. Cl.
  *F28D 20/02* (2006.01)
  *A47B 81/00* (2006.01)
  *A47B 96/02* (2006.01)
  *F25D 11/00* (2006.01)

(52) U.S. Cl.
  CPC .......... *F25D 11/006* (2013.01); *F28D 20/025* (2013.01); *F25D 2303/085* (2013.01); *Y02E 60/145* (2013.01)

(58) Field of Classification Search
  USPC .................................................. 220/592.01
  See application file for complete search history.

(56) References Cited

FOREIGN PATENT DOCUMENTS

| | | |
|---|---|---|
| JP | 03-037381 U | 4/1991 |
| JP | 07-004807 A | 1/1995 |
| JP | 09-318242 A | 12/1997 |
| JP | 11-083277 A | 3/1999 |
| WO | 97/45685 A1 | 12/1997 |
| WO | 2010/055295 A1 | 5/2010 |

\* cited by examiner

FIG. 1
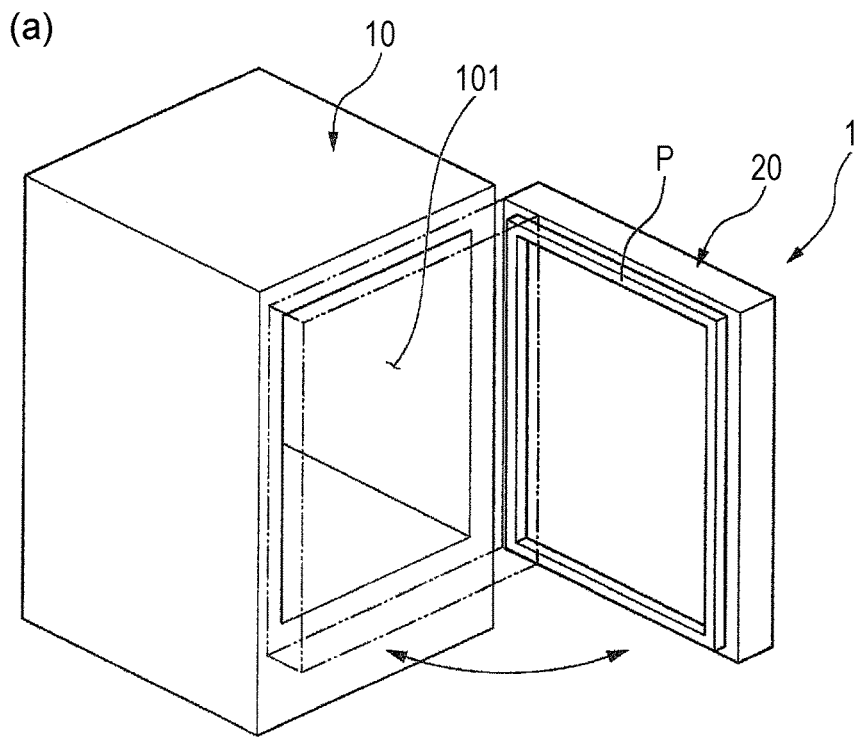
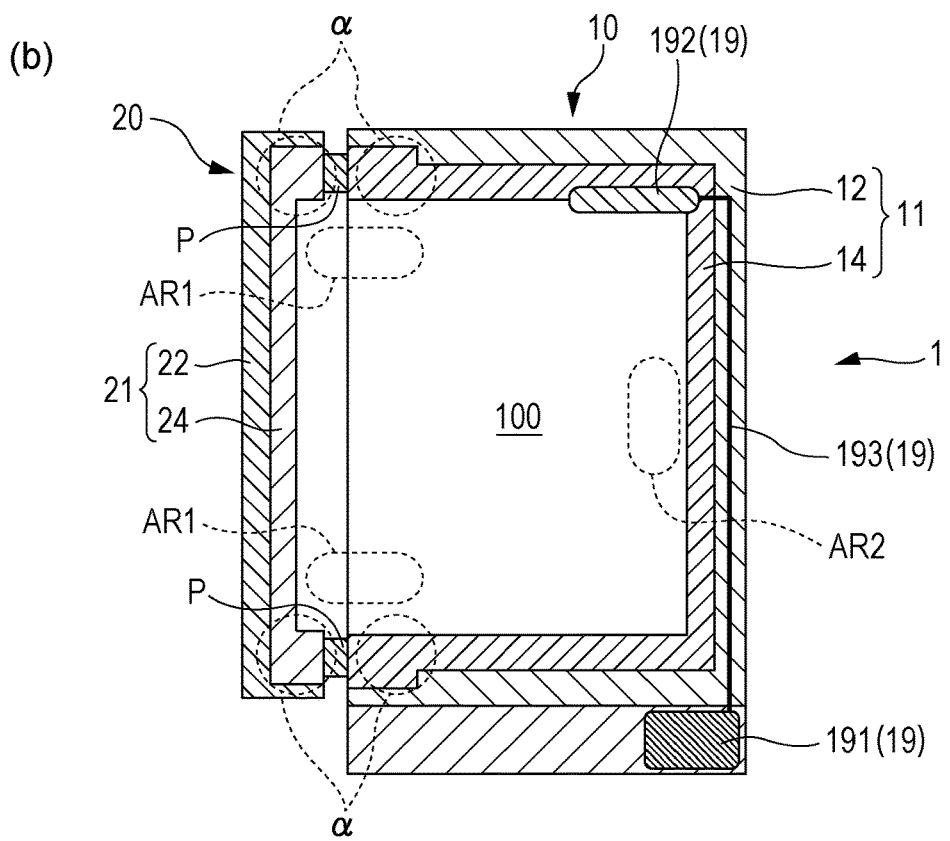

FIG. 3
(a)
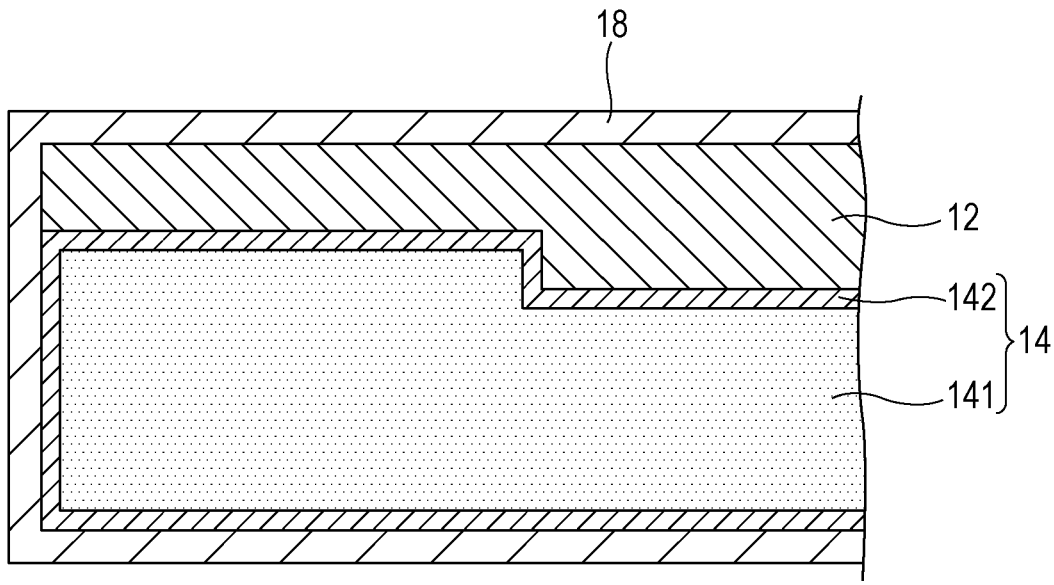
(b)
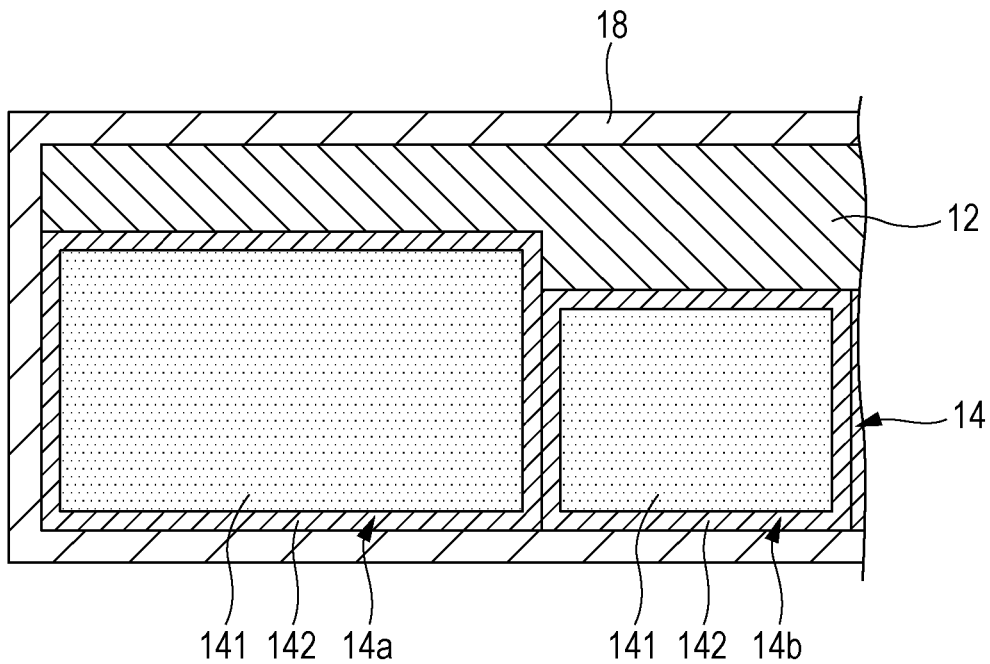

FIG. 4
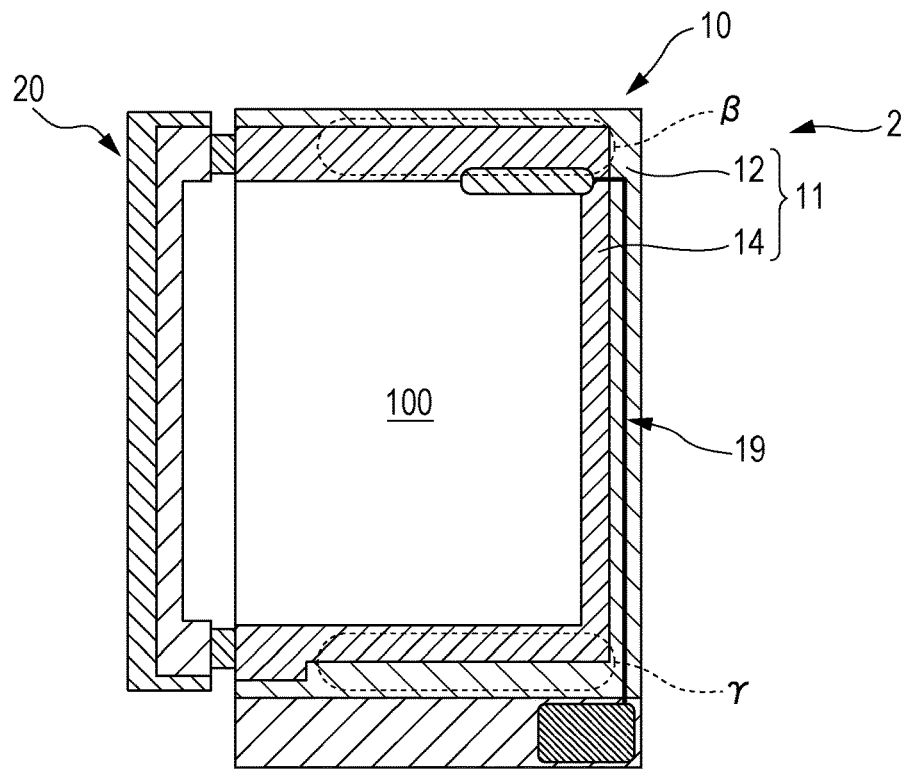
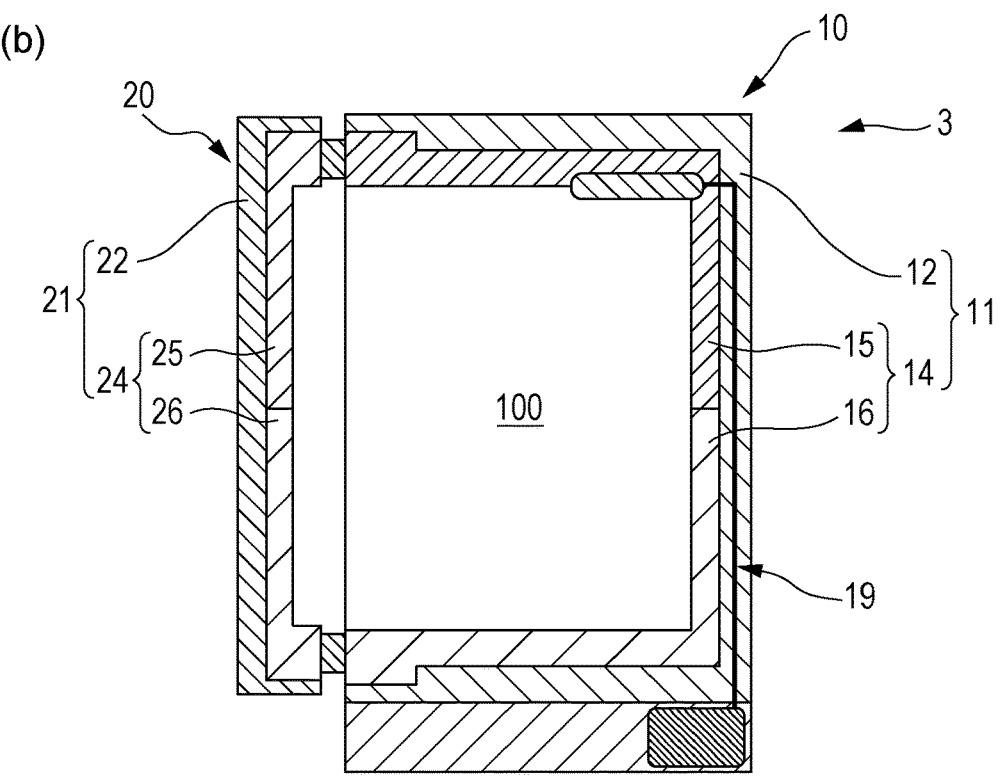

FIG. 6
(a)
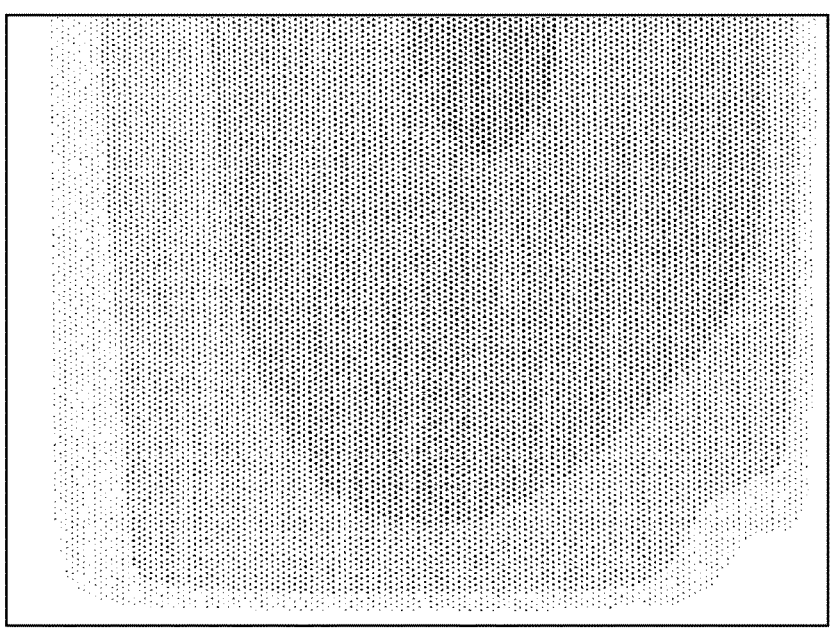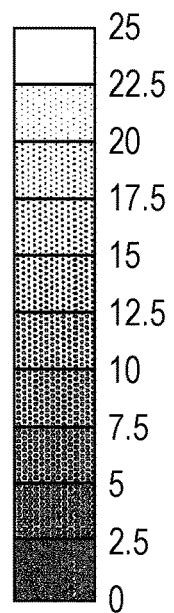
(b)
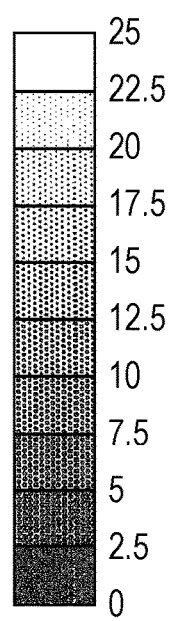

FIG. 7
(a)
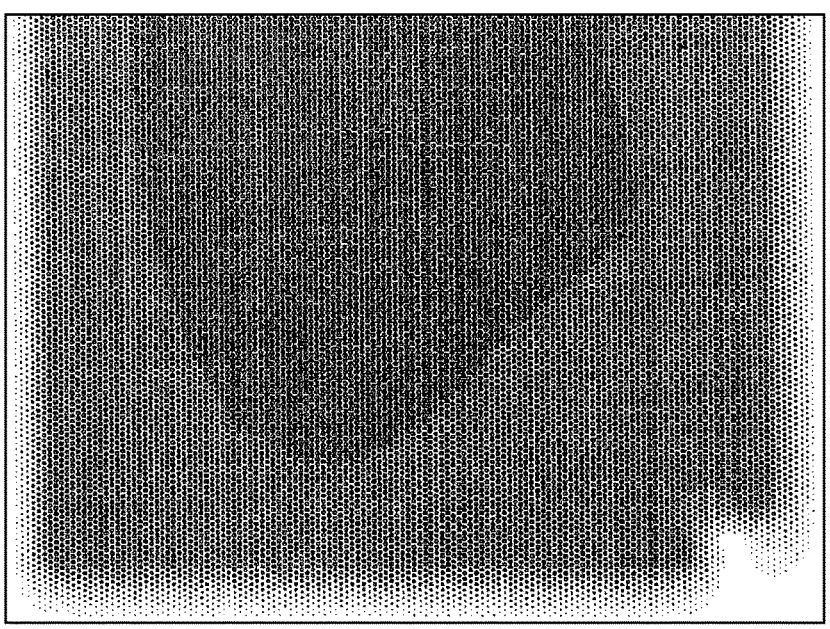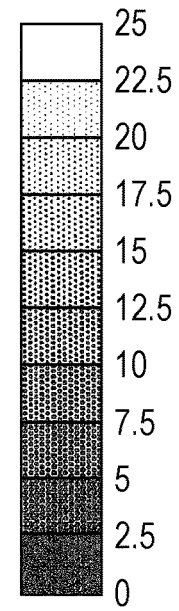
(b)
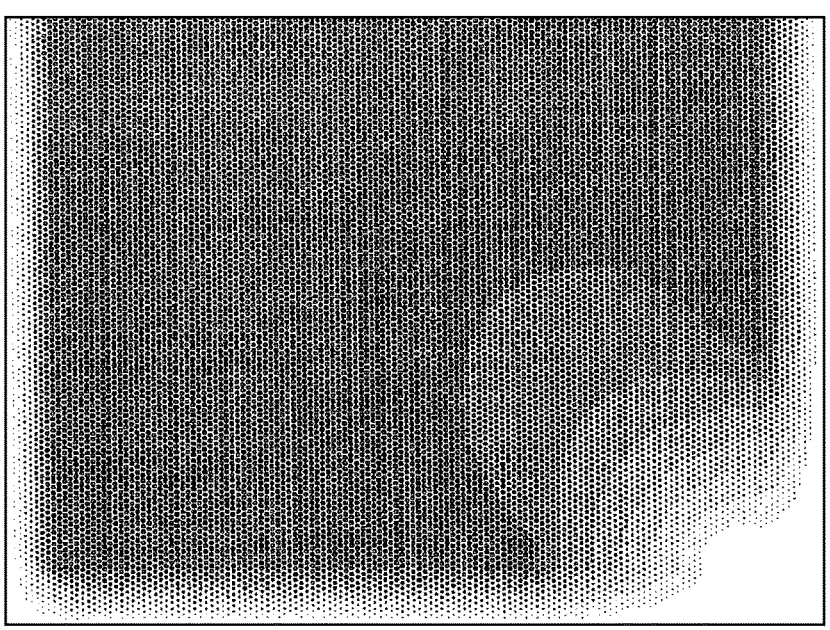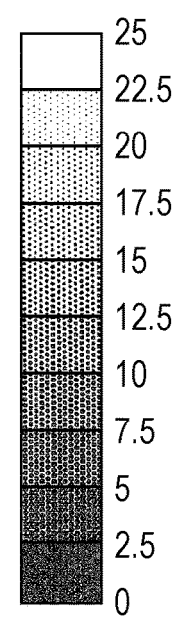

FIG. 8
(a)
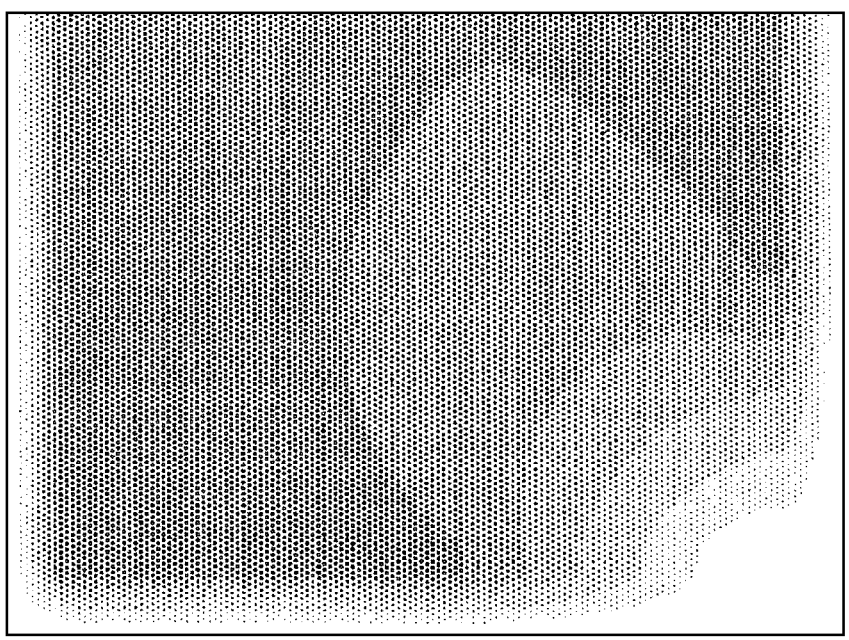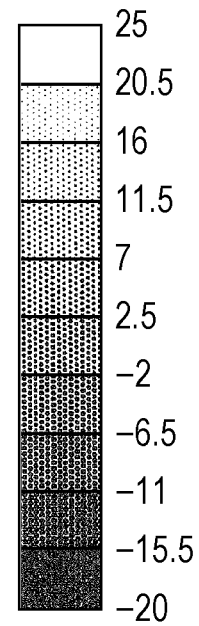
(b)
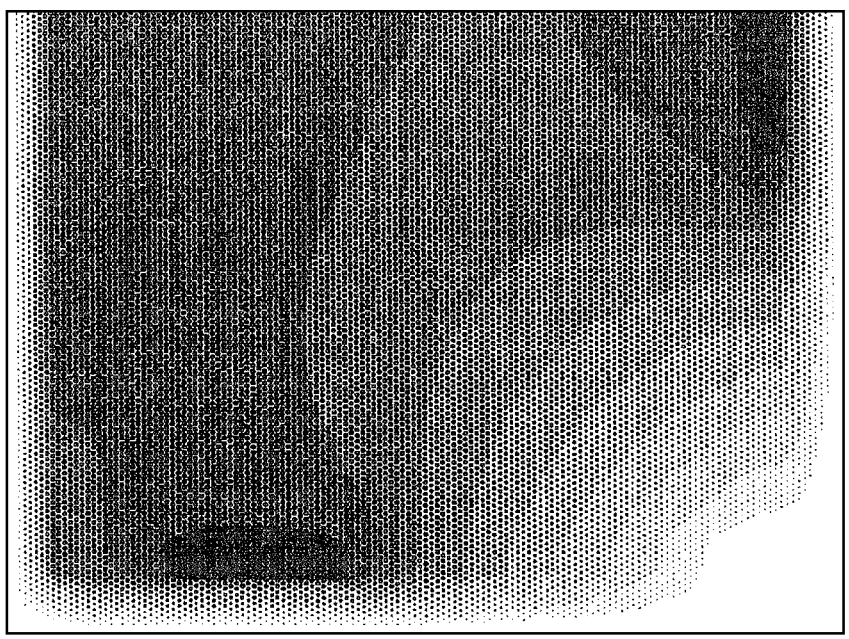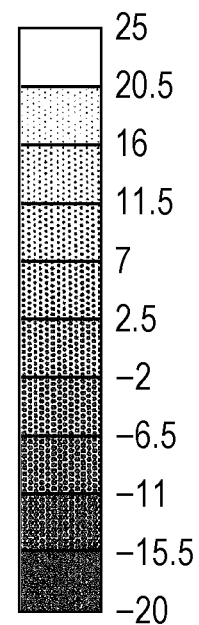

FIG. 9
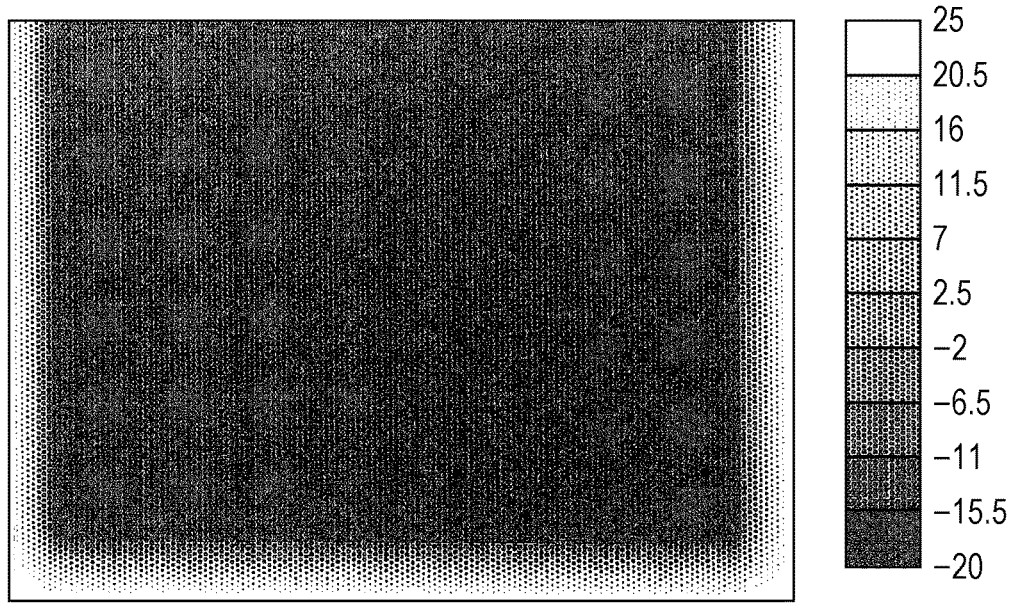
FIG. 10
(a) 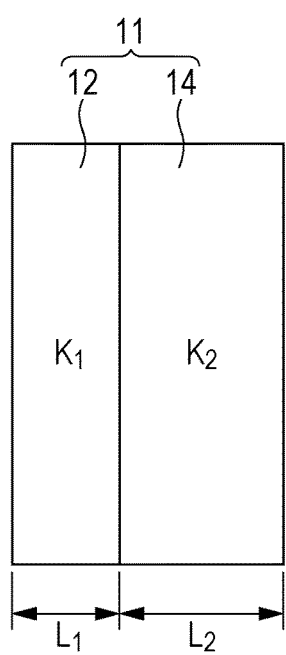
(b) 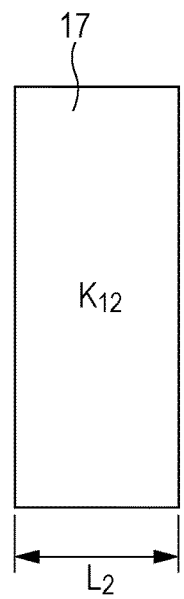

FIG. 11
(a)
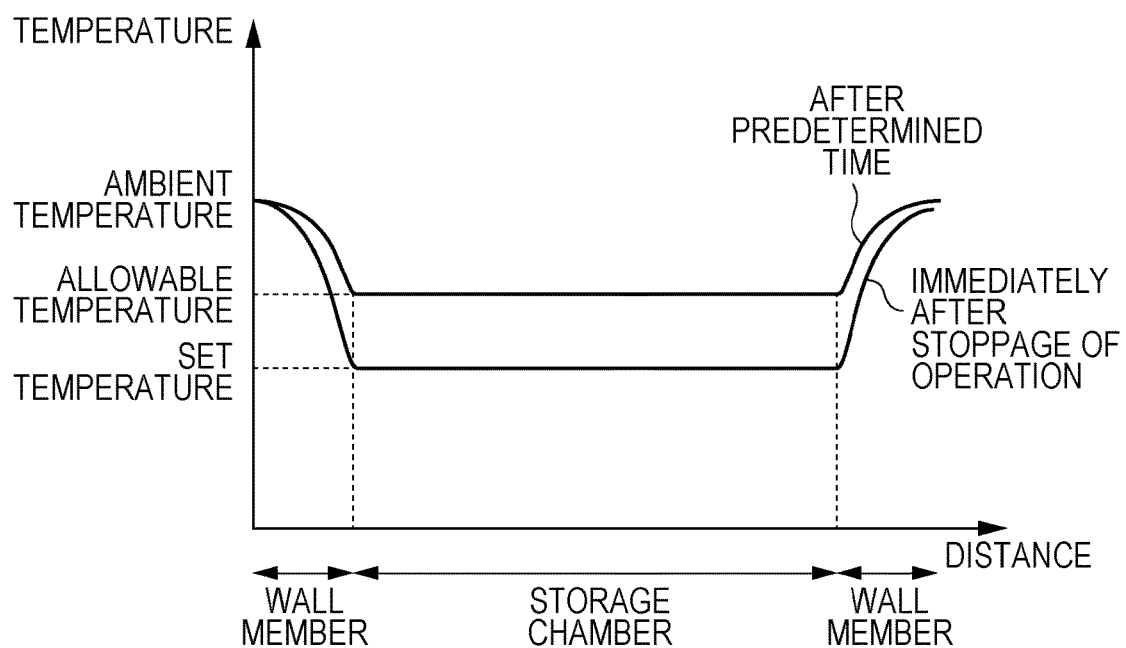
(b)
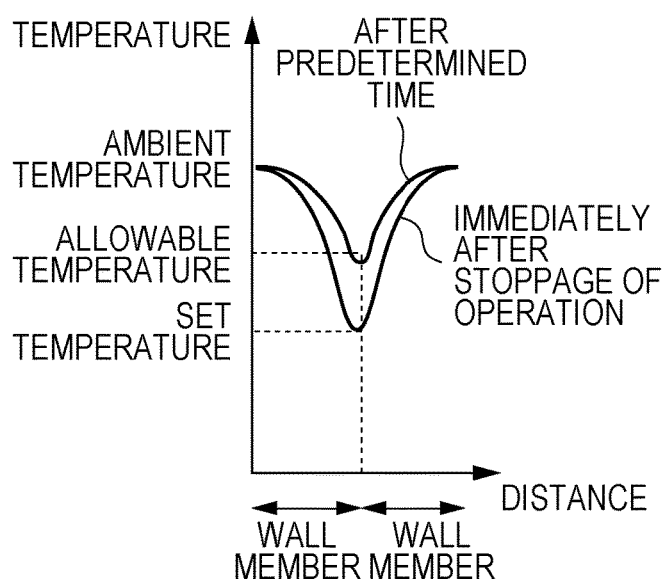

FIG. 15
(a)
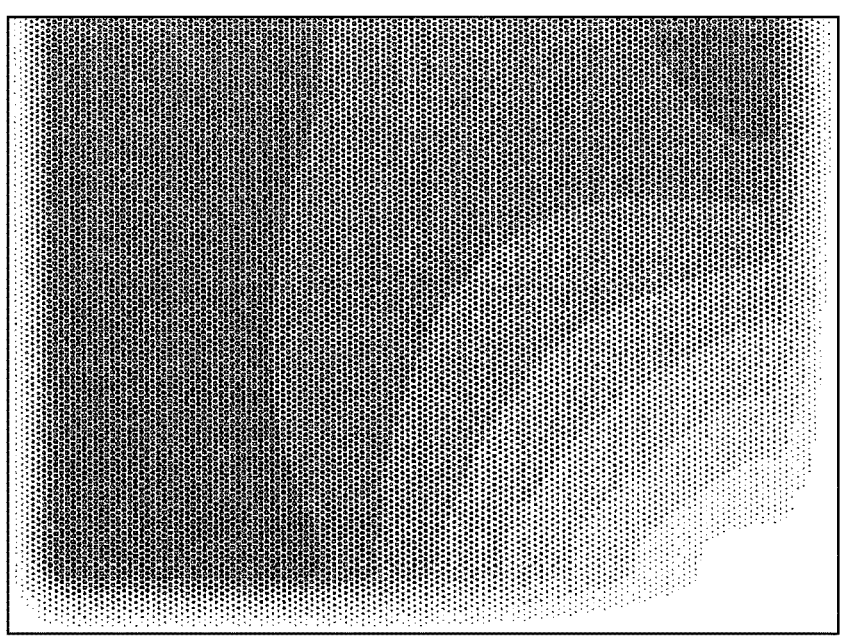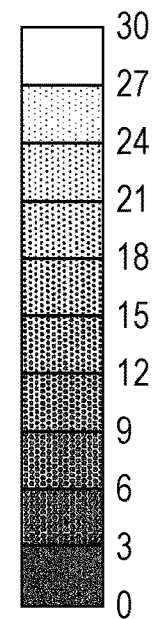
(b)
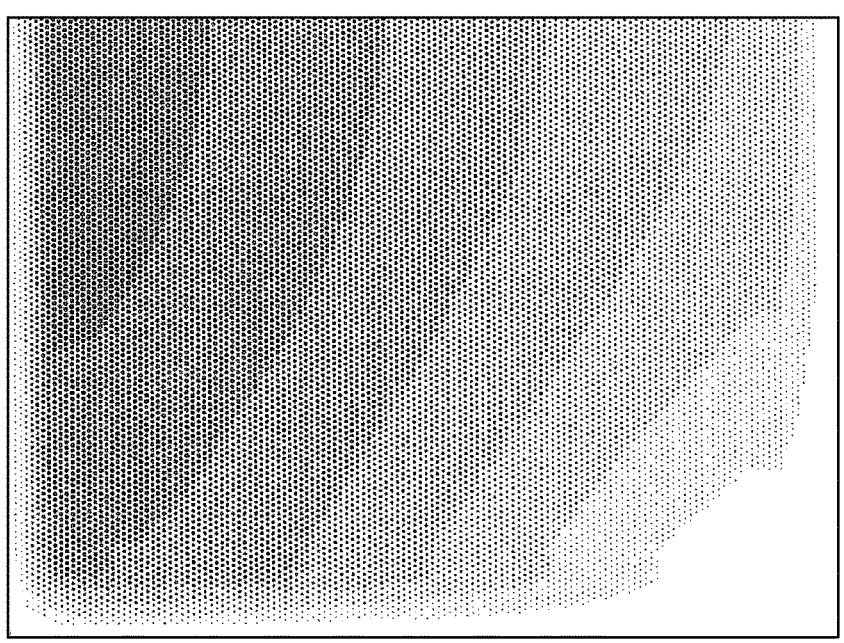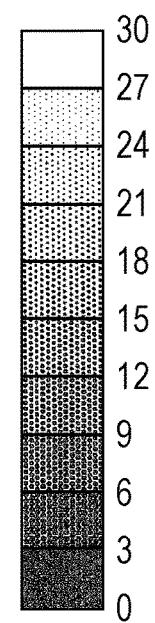

FIG. 16
(a)
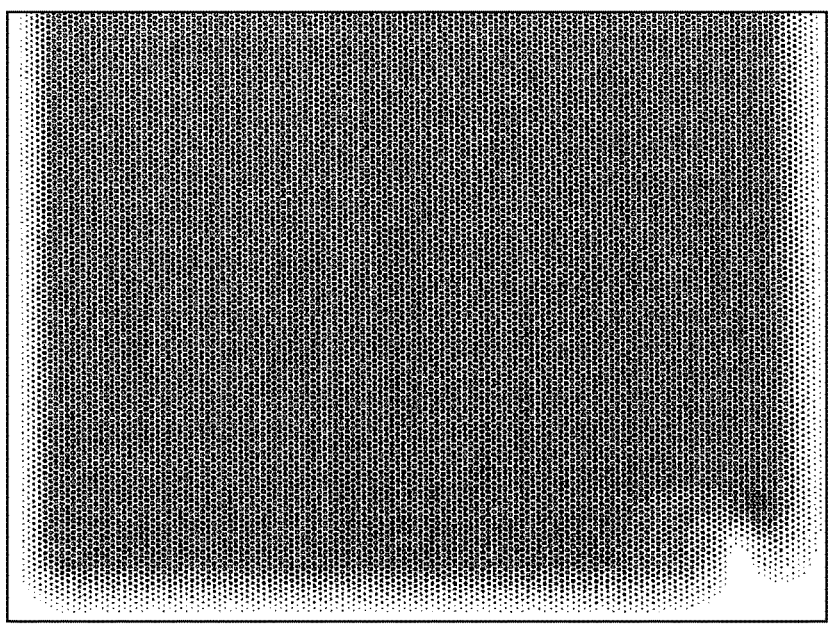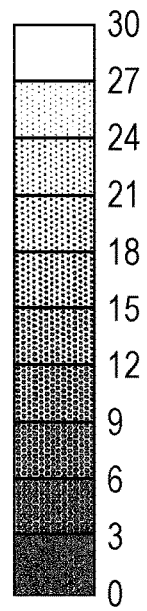
(b)
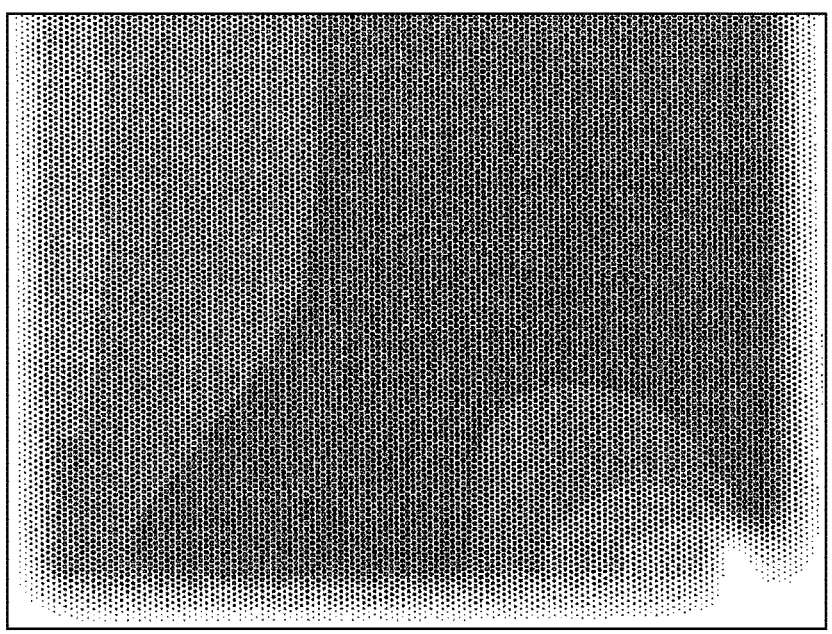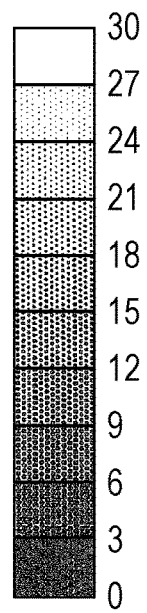

FIG. 20
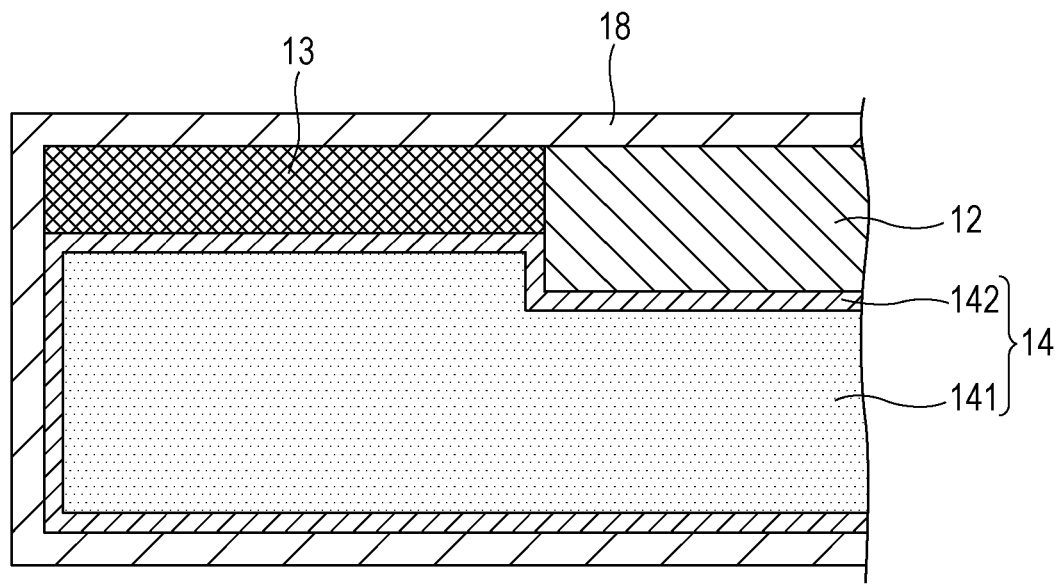
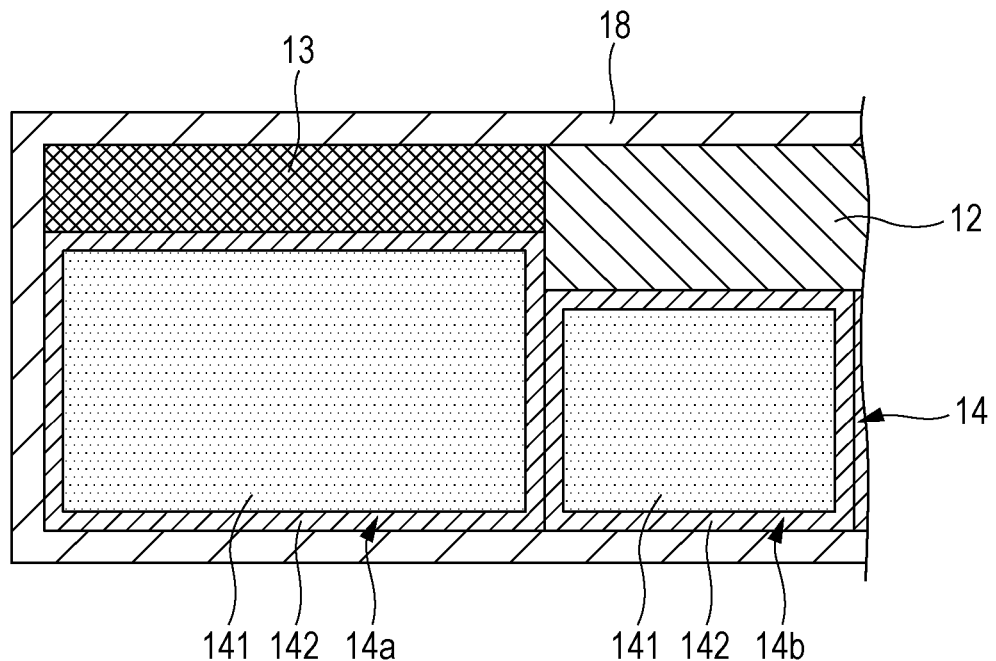

FIG. 21
(a)
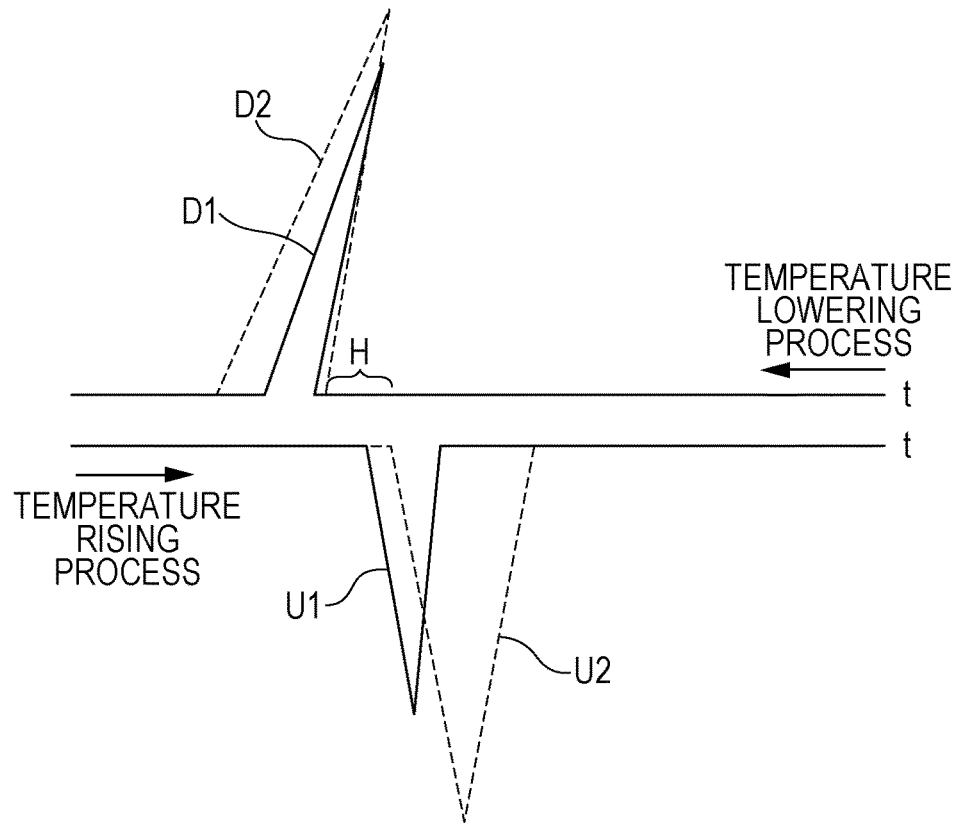
(b)
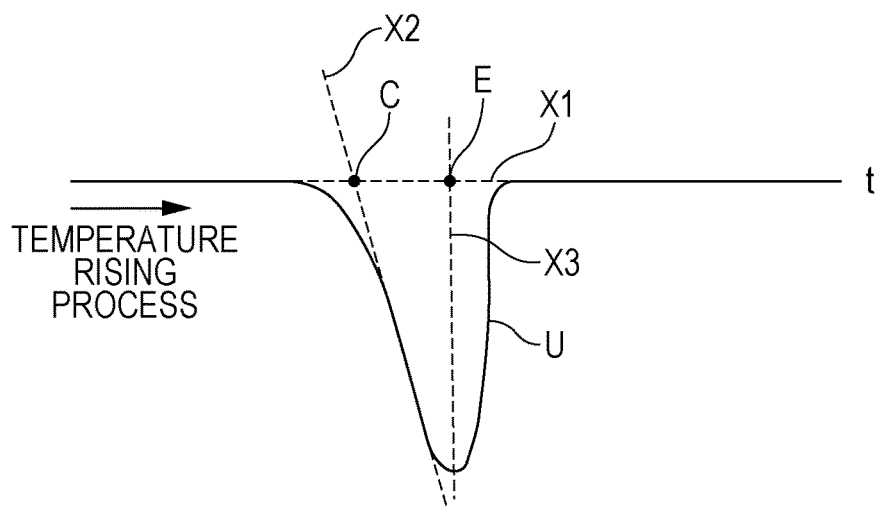

FIG. 24
(a)
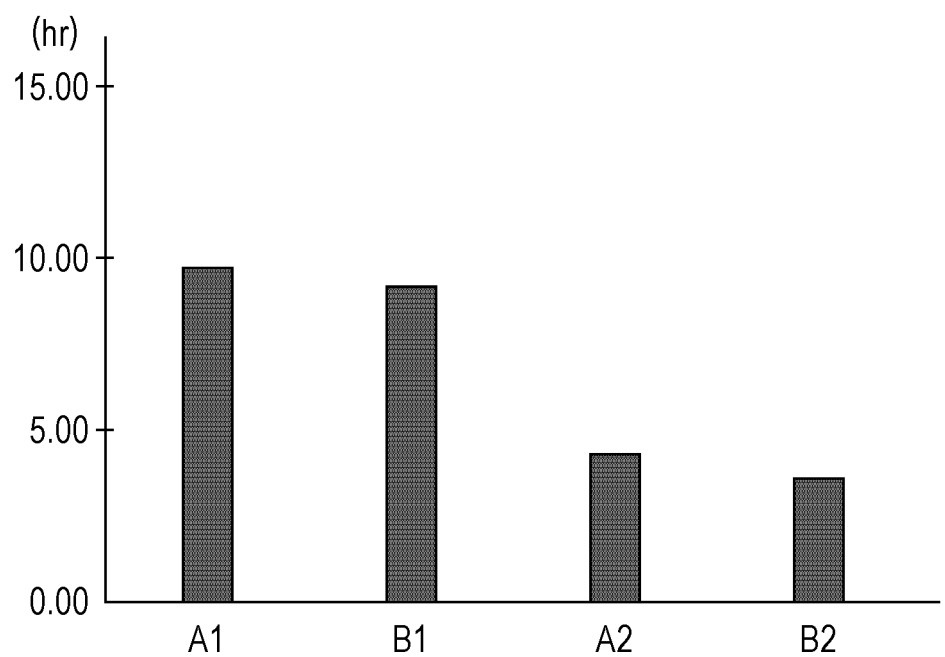
(b)
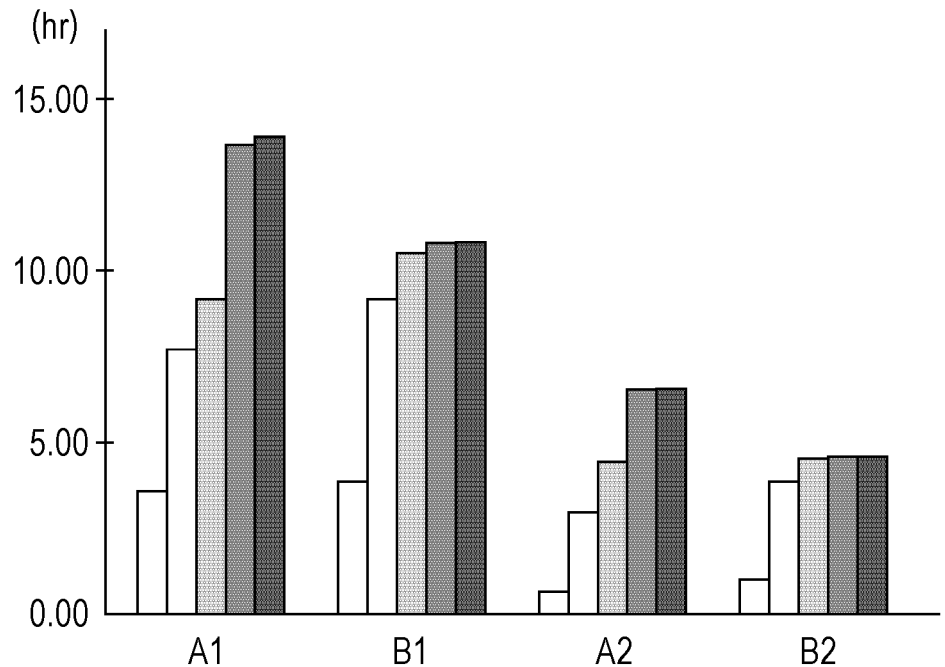

FIG. 28
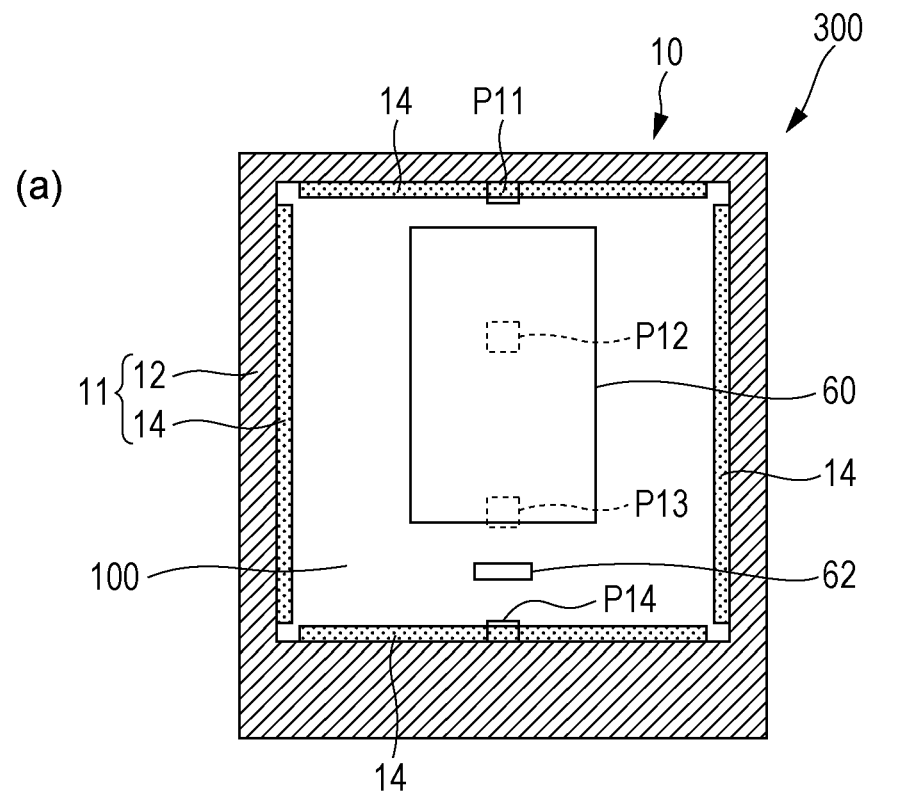
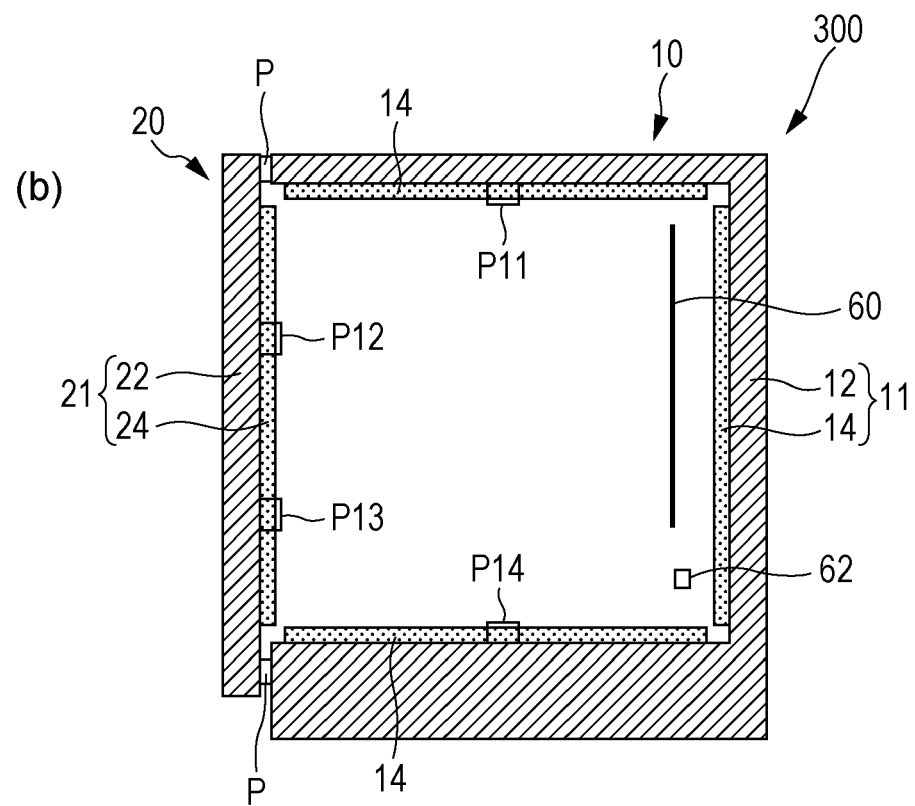

FIG. 30
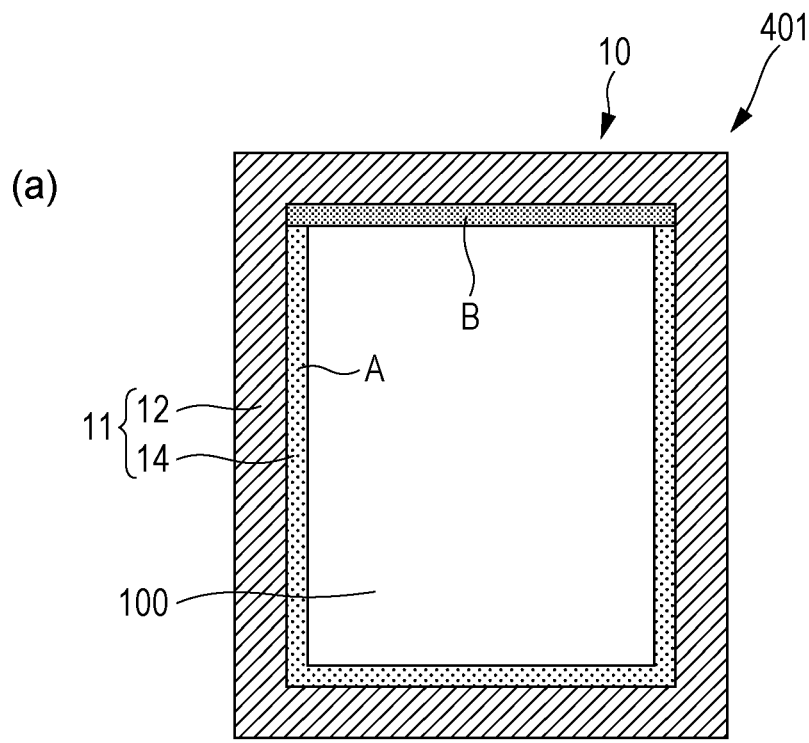
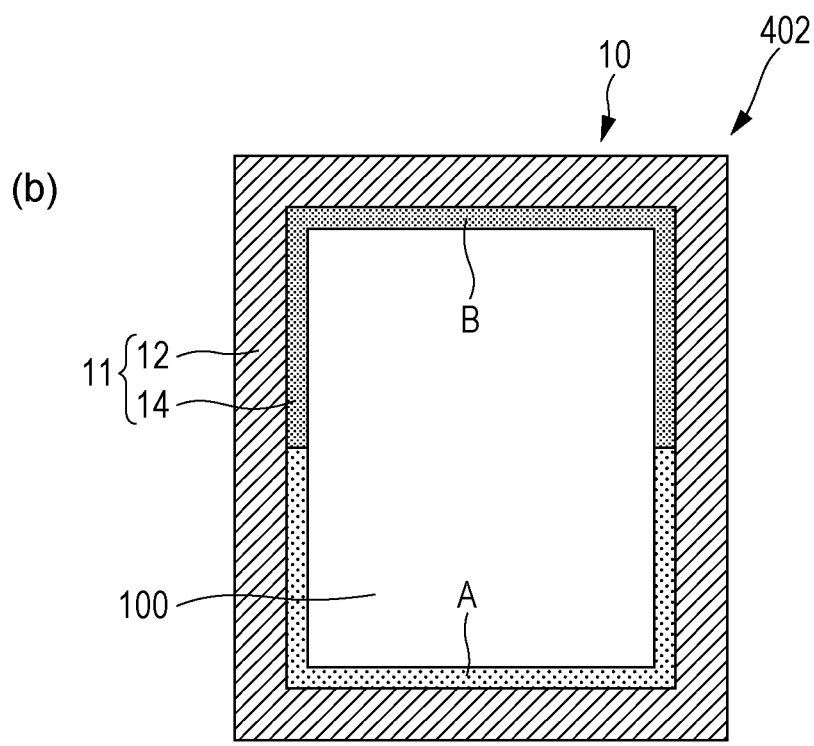

FIG. 31
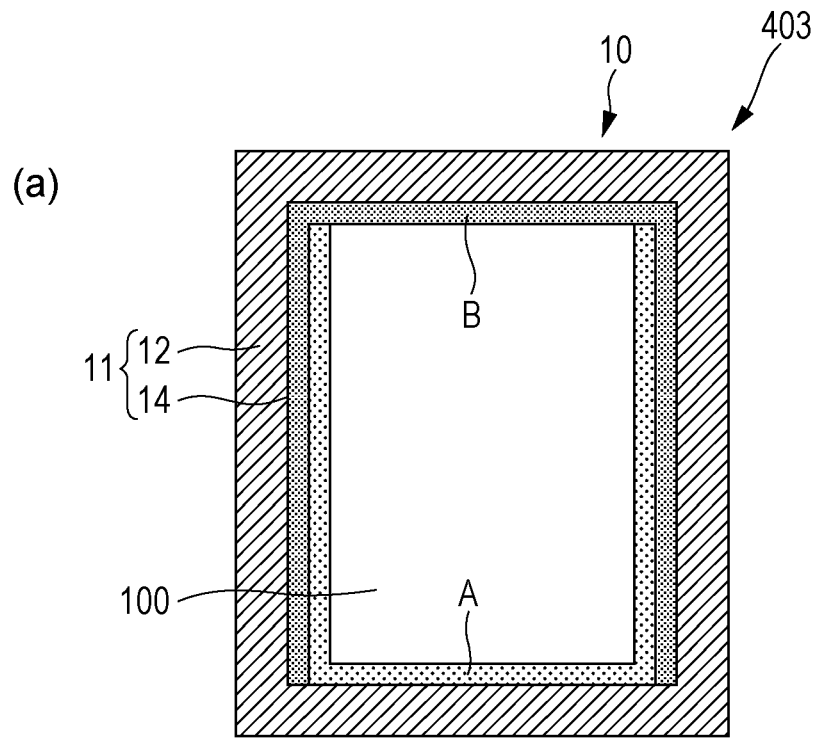
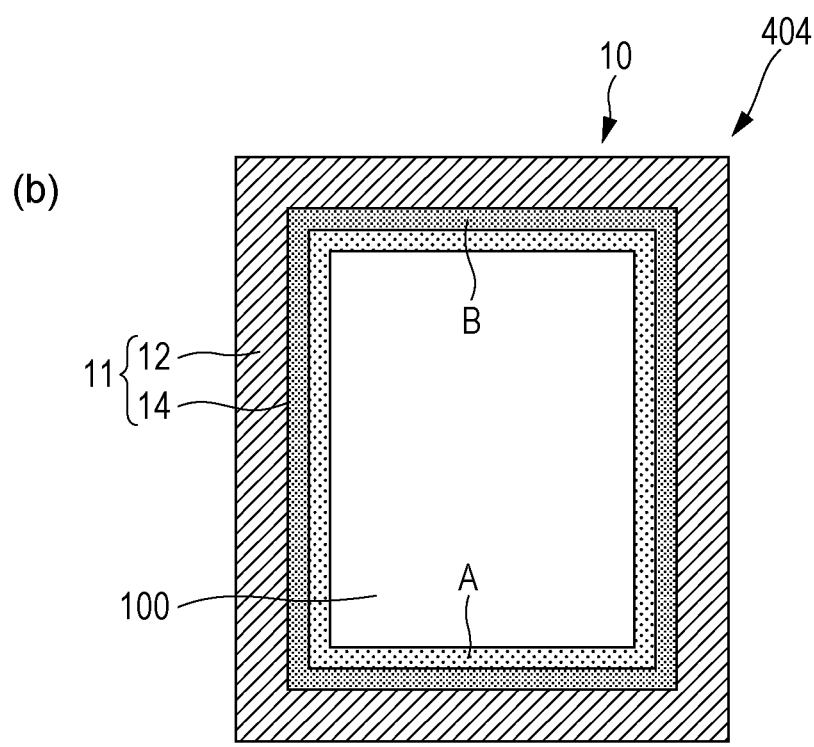

FIG. 35
(a)
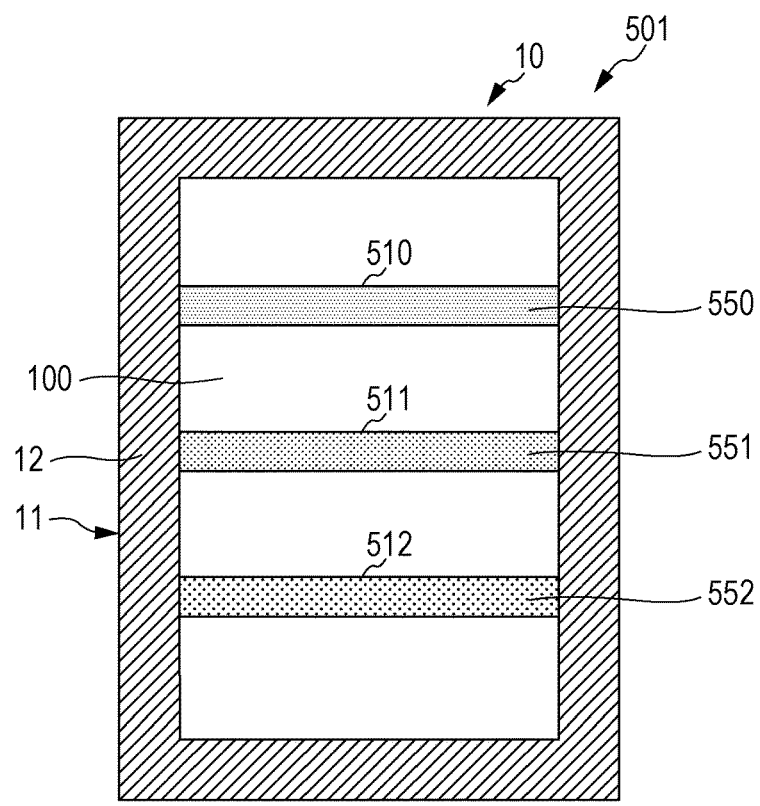
(b)
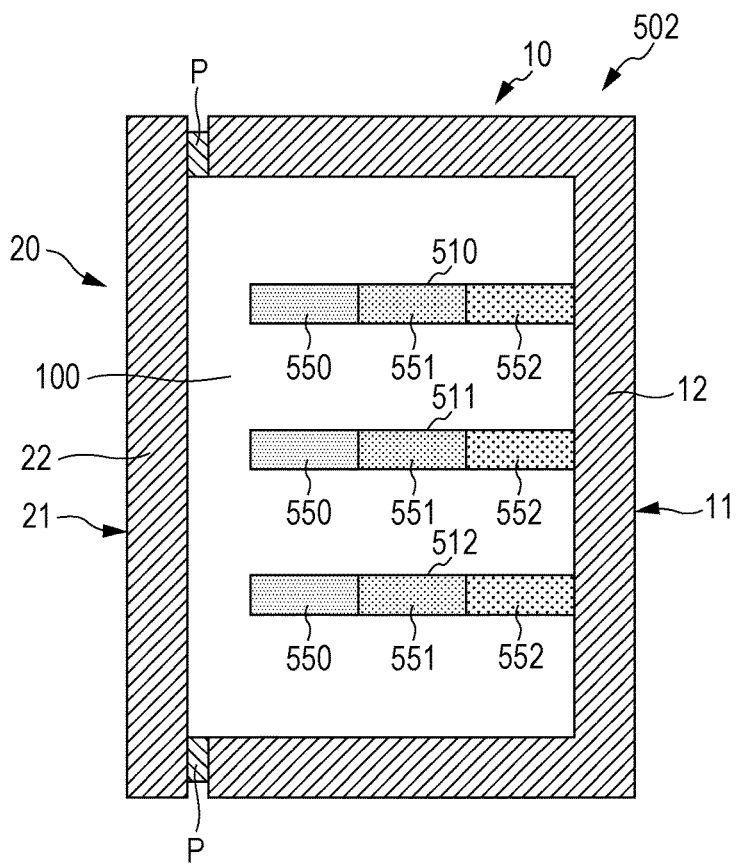

FIG. 45
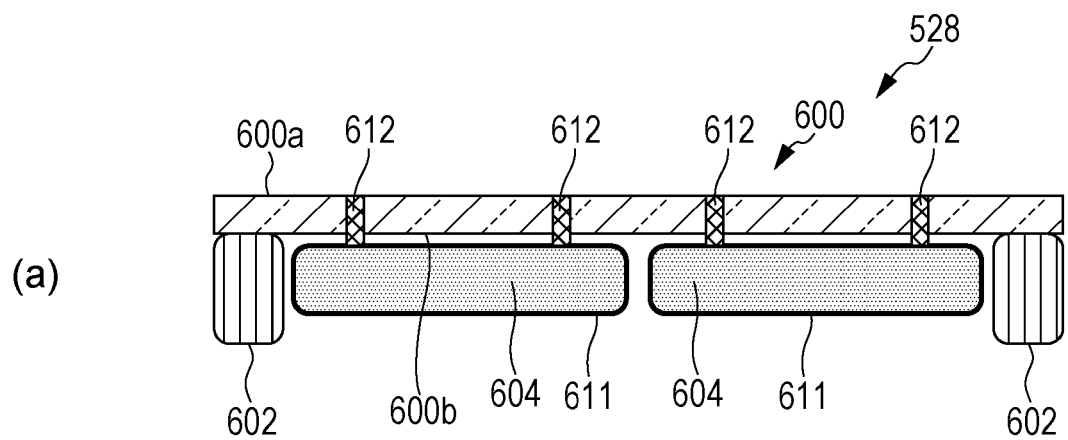
(a)
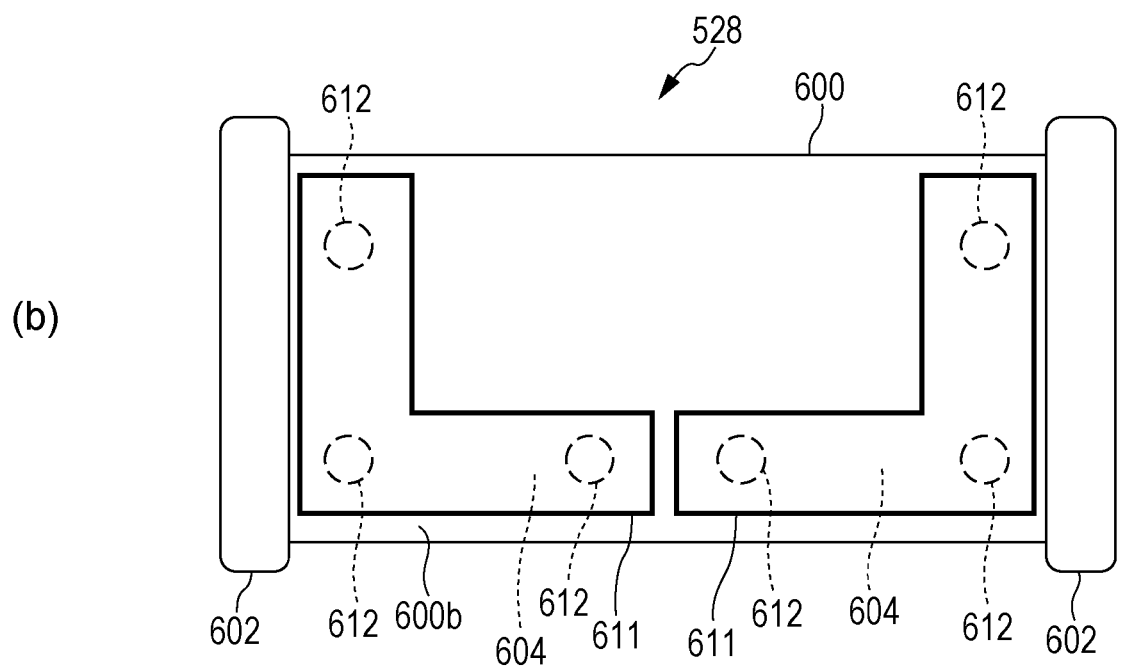
(b)

STORAGE CONTAINER

TECHNICAL FIELD

The present invention relates to a storage container.

BACKGROUND ART

Storage containers such as refrigerators and heating cabinets have been used to store objects at a temperature different from the ambient temperature. With such a storage container, objects can be stored at a desired temperature. For example, refrigerators can store, as the objects, various food items while keeping them fresh for a long time. Also, heating cabinets can store, as the objects, food items while keeping them at a temperature suitable for when they are served (for example, 80° C.)

When such a storage container stops operating due to power failure or the like, the temperature in a storage chamber in which the objects are stored approaches the ambient temperature, that is, rises if the storage container is a refrigerator and falls if the storage container is a heating cabinet. To prevent this, PTLs 1 and 2 propose refrigerators including cold storage materials and configured such that, even if the operation is stopped due to power failure or the like, cold air is supplied to the storage chamber for a certain time so that the temperature in the storage chamber does not change.

CITATION LIST

Patent Literature

PTL 1: Japanese Unexamined Patent Application Publication No. 58-219379
PTL 2: Japanese Unexamined Patent Application Publication No. 7-4807

SUMMARY OF INVENTION

Technical Problem

In the structures described in PTLs 1 and 2, the cold storage material is uniformly arranged so as to surround the storage chamber. However, it can be easily inferred that when heat flows from the outside into the storage chamber of the storage container that has stopped operating, the amount of heat that flows into the storage chamber is not uniform over the entire storage chamber. Therefore, a non-uniform temperature distribution is generated in the storage chamber over time, and there is a risk that the cold insulation function of the cold storage material cannot be obtained in some regions of the storage chamber.

Even when the storage container is in operation, the temperature distribution in the storage chamber is generally such that the temperature increases toward the top. Therefore, in the structures described in PTLs 1 and 2, there may be a case where the cold storage material cannot be sufficiently solidified in an upper region of the storage chamber. In this case, the latent heat of the cold storage material cannot be sufficiently utilized in the upper region of the storage chamber. Therefore, the cold insulation time for which a low temperature in the storage chamber can be maintained by the cold storage material when the storage container stops operating is reduced. If a cold storage material having a relatively high phase change temperature is used, the cold storage material can also be solidified in the upper region of the storage chamber, and the cold insulation time for which a low temperature can be maintained by the cold storage material can be increased accordingly. However, in this case, the cold insulation temperature at which the temperature in the storage chamber is maintained by the cold storage material when the storage container stops operating increases. Thus, the structures described in PTLs 1 and 2 have a problem that it is difficult to obtain a high cold insulation effect with the cold storage material.

The present invention has been made in light of the above-described circumstances, and an object of the present invention is to provide a storage container capable of maintaining a uniform temperature distribution in a storage chamber at least for a certain time even when the operation of the storage container is stopped.

Another object of the present invention is to provide a storage container including latent heat storage materials that provide a high cold insulation effect.

Solution to Problem

The above-described object is achieved by a storage container that has an electric cooling function and stores an object and that includes at least one storage chamber that stores the object; a first latent heat storage material that is disposed in the storage chamber and has a predetermined phase change temperature; and a second latent heat storage material that is disposed in the storage chamber and has a phase change temperature higher than the phase change temperature of the first latent heat storage material.

In the above-described storage container of the present invention, the second latent heat storage material is disposed in at least a part of an upper region of the storage chamber.

In the above-described storage container of the present invention, the first latent heat storage material and the second latent heat storage material are in contact with an inner wall of the storage chamber.

The above-described storage container of the present invention includes an overlapping portion in which at least a part of the first latent heat storage material and at least a part of the second latent heat storage material overlap. In the overlapping portion, the first latent heat storage material is located closer to an inner region of the storage container than the second latent heat storage material is.

The above-described storage container of the present invention further includes a shelf disposed in the storage chamber and having a surface on which the object is placed. The second latent heat storage material is provided on the shelf.

The above-described storage container of the present invention further includes a door which opens and closes the storage chamber. The first latent heat storage material is provided on the shelf, and the second latent heat storage material is located closer to the door than the first latent heat storage material is.

The above-described storage container of the present invention further includes a first shelf and a second shelf disposed in the storage chamber and each having a surface capable of receiving the object. The first latent heat storage material is provided on the first shelf, and the second latent heat storage material is provided on the second shelf.

In the above-described storage container of the present invention, the second shelf is located above the first shelf.

The above-described storage container of the present invention further includes a cold air outlet through which cold air is blown into the storage chamber. The second shelf is located at a position farther from the cold air outlet than the first shelf is.

In the above-described storage container of the present invention, the phase change temperature of the first latent heat storage material is within a control temperature range of the storage chamber.

Advantageous Effects of Invention

According to the present invention, a storage container capable of maintaining a uniform temperature distribution in the storage chamber can be provided.

In addition, according to the present invention, a storage container that provides a high cold insulation effect with a latent heat storage material can be provided.

BRIEF DESCRIPTION OF DRAWINGS

FIG. 1 illustrates a storage container according to a first embodiment.

FIG. 3 illustrates the storage container according to the first embodiment.

FIG. 4 illustrates modifications of the storage container according to the first embodiment.

FIG. 6 shows the results of unsteady heat conduction analysis in which the calculation model is used.

FIG. 7 shows the results of unsteady heat conduction analysis in which the calculation model is used.

FIG. 8 shows the results of unsteady heat conduction analysis in which another calculation model is used.

FIG. 9 shows the result of unsteady heat conduction analysis in which another calculation model is used.

FIG. 10 illustrates calculation models.

FIG. 11 shows graphs showing the relationship between the temperature and distance toward the inner region of the storage container.

FIG. 15 shows the results of unsteady heat conduction analysis in which the calculation model is used.

FIG. 16 shows the results of unsteady heat conduction analysis in which the calculation model is used.

FIG. 20 illustrates a storage container according to a fourth embodiment.

FIG. 21 illustrates a method for determining a phase transition temperature of a heat storage material included in a storage container according to a fifth embodiment.

FIG. 24 illustrates the analysis results of storage containers according to the sixth embodiment.

FIG. 28 illustrates the structure of a storage container according to the related art as a simulation model.

FIG. 30 shows sectional views illustrating the structures of storage containers according to first and second examples of a ninth embodiment.

FIG. 31 shows sectional views illustrating the structures of storage containers according to third and fourth examples of the ninth embodiment.

FIG. 35 illustrates storage containers according to a tenth embodiment.

FIG. 45 illustrates a shelf 528 included in a storage container according to the twelfth embodiment.

DESCRIPTION OF EMBODIMENTS

[First Embodiment]

Figure 2:
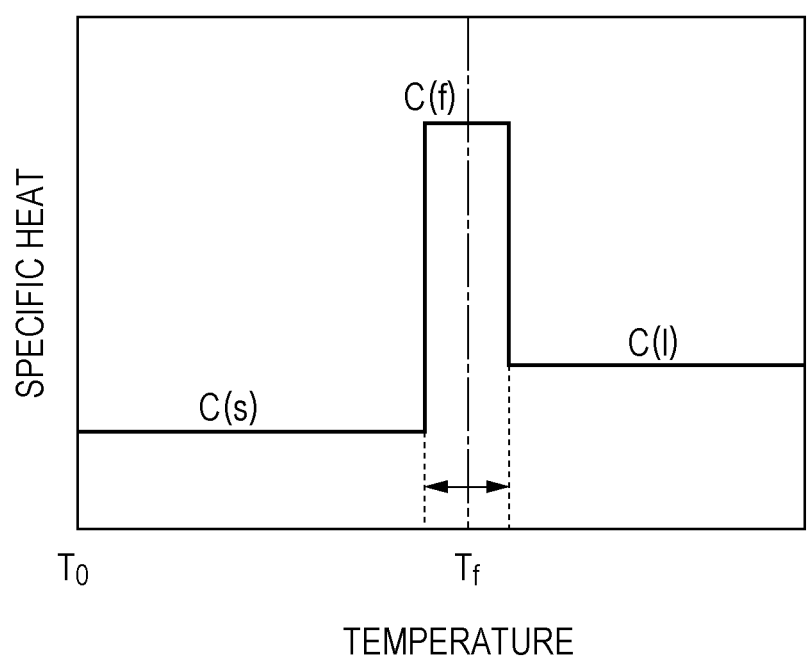
FIG. 2 is a graph schematically illustrating the thermal behavior of a material of a heat storage portion during phase transition.

A storage container according to a first embodiment of the present invention will now be described with reference to FIGS. 1 to 17. In all of the diagrams described below, components may be drawn in different dimensions, proportions, etc., as appropriate to improve viewability.

FIG. 1 illustrates a storage container 1 according to the present embodiment. FIG. 1(a) is a schematic perspective view and FIG. 1(b) is a schematic sectional view. The storage container 1 stores an object at a temperature different from the ambient temperature (living environment temperature) during stable operation. The storage container 1 may be, for example, a refrigerator, a freezer, or a heating cabinet. In the present embodiment, it is assumed that the storage container 1 is a refrigerator.

As illustrated, the storage container 1 of the present embodiment includes a container body 10 having a storage chamber 100 that communicates with the outside through an opening 101, and a door (lid) 20 attached to the opening 101. The storage chamber 100 is a space surrounded by a wall member 11 of the container body 10 and a wall member 21 of the door 20. The container body 10 includes a heat insulating portion 12 and a heat storage portion 14. The door 20 also includes a heat insulating portion 22 and a heat storage portion 24. The heat storage portions 14 and 24 have a larger thickness (volume) at locations adjacent to packing P than at other locations.

The storage container 1 of the present embodiment is capable of maintaining the temperature in the storage chamber 100 at a predetermined set temperature during stable operation. Also, even when, for example, supply of electric power is stopped due to power failure and the operation is stopped, a low temperature in the storage chamber 100 can be maintained so that a non-uniform temperature distribution is not generated for a certain time. This will now be described in detail.

The container body 10 includes the wall member 11 and a cooling device 19 for cooling the storage chamber 100. The wall member 11 includes the heat insulating portion 12 that surrounds the storage chamber 100 and the heat storage portion 14 disposed between the storage chamber 100 and the heat insulating portion 12 so as to surround the storage chamber 100. The heat insulating portion 12 and the heat storage portion 14 are disposed in a space surrounded by a housing (not illustrated) made of a resin material, such as an ABS resin.

The heat insulating portion 12 provides heat insulation for suppressing heat transfer to the storage chamber 100 and the heat storage portion 14, which are cooled during stable operation, from the outside through the housing. The heat insulating portion 12 may be made of a commonly known material, for example, a fiber-based heat insulating material such as glass wool, a resin-foam-based heat insulating material such as polyurethane foam, or a natural-fiber-based heat insulating material such as cellulose fiber.

The heat storage portion 14 is made of a heat storage material, which is a material that causes liquid-solid phase transition at a temperature between the set temperature of the storage chamber 100 and the ambient temperature. Here, the "set temperature of the storage chamber 100" is a set temperature in the storage chamber 100 during stable operation of the storage container 1. The "ambient temperature" is, for example, the expected temperature of the environment in which the storage container 1 is used. When, for example, the storage container 1 is a refrigerator with a set temperature of 4° C. and the expected ambient temperature is 25° C., a heat storage material having a solid-liquid phase transition temperature that is higher than 4° C. and lower than 25° C. is used.

FIG. 2 is a graph schematically illustrating the thermal behavior of the heat storage material, which is the material of the heat storage portion 14 illustrated in FIG. 1, during phase transition. In the graph, the horizontal axis represents the temperature, and the vertical axis represents the specific heat.

When the heat storage material is in a solid state (solid phase), the temperature of the heat storage material increases as the heat storage material absorbs an amount of heat corresponding to the specific heat C(s). When the heat storage material is in a liquid state (liquid phase), the temperature of the heat storage material increases as the heat storage material absorbs an amount of heat corresponding to the specific heat C(l). In contrast, at a temperature at which phase transition of the heat storage material occurs, the temperature of the heat storage material increases as the heat storage material absorbs an amount of heat corresponding to the latent heat.

Here, the term "specific heat" means an amount of heat required to raise the temperature of a unit mass of a substance by a unit temperature. Thus, in a temperature range in which phase transition occurs, the amount of heat to be absorbed to increase the temperature by a unit temperature corresponds to the latent heat. Therefore, as illustrated in FIG. 2, it can be understood that in a phase transition temperature range Tf, the temperature is increased by a unit temperature when an amount of heat corresponding to the specific heat C(f) is absorbed, and the specific heat of the heat storage material is increased. Accordingly, in the case where the phase transition temperature of the heat storage material is between the set temperature of the storage chamber 100 and the ambient temperature, when the operation of the storage chamber 100 stops, the temperature in the container reaches the phase transition temperature range Tf during a temperature rising process. Therefore, temperature variation can be suppressed for a long time in the phase transition temperature range Tf.

A material having a suitable phase transition temperature range Tf is used as the heat storage material depending on the set temperature of the storage chamber 100, that is, depending on the specifications of the storage container 1.

For example, when the storage container 1 is a refrigerator as in the present embodiment, the set temperature of the storage chamber (refrigerator compartment) is preferably 10° C. or less, and the peak temperature of the phase transition temperature of the heat storage material is preferably 0° C. to 10° C.

In the case where the storage container stores an object at a temperature lower than that of a refrigerator, the phase transition temperature range of the heat storage material is preferably 2° C. or less. For example, when the storage chamber is a chilled compartment, the set temperature is about 0° C. Therefore, the peak temperature of the phase transition temperature of the heat storage material is preferably 0° C. to 2° C. In the case where the storage chamber is a freezer compartment, the set temperature of the storage chamber (freezer compartment) is −10° C. or less, and the peak temperature of the phase transition temperature of the heat storage material is preferably −20° C. to −10° C.

The phase transition temperature of the heat storage material can be measured by using a differential scanning calorimeter (DSC). For example, the above-described peak temperature can be measured, by using a differential scanning calorimeter, as a peak temperature during phase transition from the liquid phase to the solid phase when a temperature lowering rate is set to 1° C./min.

The phase transition temperature range is a temperature range which is between the set temperature of the storage chamber 100 for stable operation and the ambient temperature and in which the phase transition from the liquid phase to the solid phase occurs.

When the storage chamber 100 is cooled during stable operation, the heat storage material having the above-described phase transition temperature is cooled by cold air in the storage chamber 100 to a temperature lower than or equal to the phase transition temperature. Therefore, the heat storage material is in the solid phase during stable operation. When the operation of the storage container 1 is stopped, the heat storage material supplies cold air to the inside of the storage chamber 100, thereby suppressing temperature variation in the storage chamber 100 for a certain time.

The heat storage material may be any commonly known material, such as water, paraffin, 1-decanol, $SO_2 \cdot 6H_2O$, $C_4H_3O \cdot 17H_2O$, and $(CH_2)3N \cdot 10 \cdot \frac{1}{4}H_2O$. A heat storage material having a desired phase transition temperature may also be produced by utilizing a freezing point depression that occurs when a solute is dissolved into the heat storage material in a liquid state. The heat storage material may be one of the above-described materials or a combination of two or more of the above-described materials.

FIGS. 3(a) and 3(b) illustrate the structure of the wall member 11. As illustrated in FIG. 3(a), the heat storage portion 14 includes a heat storage material 141 and a protective film 142 that covers the heat storage material 141. The heat storage portion 14 may be disposed so as to fill the space between a housing 18 of the container body 10 and the heat insulating portion 12 disposed in the housing 18. Alternatively, as illustrated in FIG. 3(b), the heat storage portion 14 may be formed by filling the space between the housing 18 and the heat insulating portion 12 with a plurality of small blocks (denoted by 14a and 14b) each including the heat storage material 141 and the protective film 142.

The heat storage material 141 may be subjected to a gelling process or the like so that the shape thereof can be maintained during solid-liquid phase transition. In this case, even when a part of the heat storage material 141 in a solid phase is melted by radiation and the phase thereof is changed to a liquid phase, convection of the heat storage material 141 in a liquid phase can be suppressed. Therefore, rapid melting due to convection does not occur, and heat is gradually radiated. In this case, the shape of the heat storage material 141 can be maintained, and leakage can be prevented. Therefore, the protective film 142 is not always necessary.

The heat storage material 141 may be produced in the form of slurry by, for example, microencapsulation. In this case, the volume of the heat storage material 141 does not change during solid-liquid phase transition, so that the thermal resistance at the contact surface between the heat storage material 141 and another component can be maintained constant.

Referring to FIG. 1 again, the cooling device 19 is a gas-compression-type cooling device including a compressor 191 that is provided at the bottom of the container body 10 and compresses a coolant; a cooling unit 192 that is exposed in the storage chamber 100 and cools the surrounding region with evaporation heat when a coolant compressed therein evaporates; and a pipe 193 that connects the compressor 191 and the cooling unit 192 to each other. The cooling device 19 may further include other commonly known components such as a condenser for causing the compressed coolant to radiate heat and a drier for removing moisture from the coolant.

Although a gas-compression-type cooling device is described in this example, the cooling device is not limited to this, and may instead be a gas-absorption-type cooling device or an electronic cooling device including a Peltier element. In addition, in this example, the storage container 1 is illustrated as a direct cooling type (cold-air natural convection type) storage container in which the cooling unit 192 is exposed in the storage chamber 100. However, the storage container 1 is not limited to this, and may instead be an indirect cooling type (cold-air forced circulation type) storage container in which the storage chamber 100 is cooled by circulating the cold air, cooled by the cooling unit 192, with a fan.

The door 20 is rotatably attached to the container body 10 with a connecting member (not shown), such as a hinge, so that the opening 101 can be opened and closed. Packing P is provided on the door 20 at a side at which the door 20 comes into contact with the container body 10 when the door 20 is closed.

Similar to the container body 10, the door 20 also includes the wall member 21 including the heat insulating portion 22 that surrounds the storage chamber 100 and the heat storage portion 24 disposed between the storage chamber 100 and the heat insulating portion 22 so as to surround the storage chamber 100. The heat insulating portion 22 and the heat storage portion 24 may be made of materials similar to those of the heat insulating portion 12 and the heat storage portion 14.

In the storage container 1, the heat storage portions 14 and 24 are arranged such that the thicknesses of the heat storage materials thereof are large in the thickness direction at locations adjacent to the packing P with the housings of the container body 10 and the door 20 disposed therebetween (locations shown by α in FIG. 1).

The storage container 1 according to the present embodiment has the above-described basic structure.

FIG. 4 illustrates modifications of the storage container of the present embodiment, and corresponds to FIG. 1(b).

The temperature in the storage chamber increases and a non-uniform temperature distribution is gradually generated over time after a stoppage of the operation of the storage container. Accordingly, the air density varies so that relatively warm air accumulates in an upper region of the storage chamber and relatively cold air accumulates in a lower region of the storage chamber. In other words, the temperature in the upper region of the storage chamber more easily approaches the ambient temperature than the temperature in the lower region of the storage chamber. To suppress formation of such a non-uniform temperature distribution, the modifications of the storage container of the present embodiment re structured as follows.

That is, in a storage container 2 illustrated in FIG. 4(a), the volume of the heat storage portion 14 included in the wall member 11 is larger in an upper region (ceiling section) of the storage chamber 100 than in a lower region (bottom section) of the storage chamber 100. In FIG. 4(a), the volume of the heat storage portion 14 is larger in a region denoted by β than in a region denoted by γ.

In a storage container 3 illustrated in FIG. 4(b), the heat storage portion 14 included in the wall member 11 includes an upper heat storage portion 15 disposed in an upper region of a storage chamber 100 and a lower heat storage portion 16 disposed in a lower region of the storage chamber 100. Similarly, the heat storage portion 24 included in the wall member 21 of the door 20 includes an upper heat storage portion 25 disposed in the upper region of the storage chamber 100 and a lower heat storage portion 26 disposed in the lower region of the storage chamber 100. The upper heat storage portion 15 is made of a material having a larger amount of latent heat compared to that of the material of the lower heat storage portion 16. Similarly, the upper heat storage portion 25 is made of a material having a larger amount of latent heat compared to that of the material of the lower heat storage portion 26.

Accordingly, cold air is supplied for a longer time in the upper region than in the lower region of the storage chamber 100, so that the warm air that accumulates in the upper region of the storage chamber can be cooled and the temperature difference between the warm air in the upper region and the cold air in the lower region can be reduced. Therefore, in the storage containers 2 and 3 having the above-described structures, formation of non-uniform temperature distribution can be suppressed.

The storage container 1 according to the present embodiment will be described in more detail with reference to FIGS. 5 to 13, taking thermal characteristics of the heat storage portions into account. In the following description, reference numerals used in FIG. 1 are used as appropriate.

First, the heat storage materials of the heat storage portions will be discussed.

Figure 5:
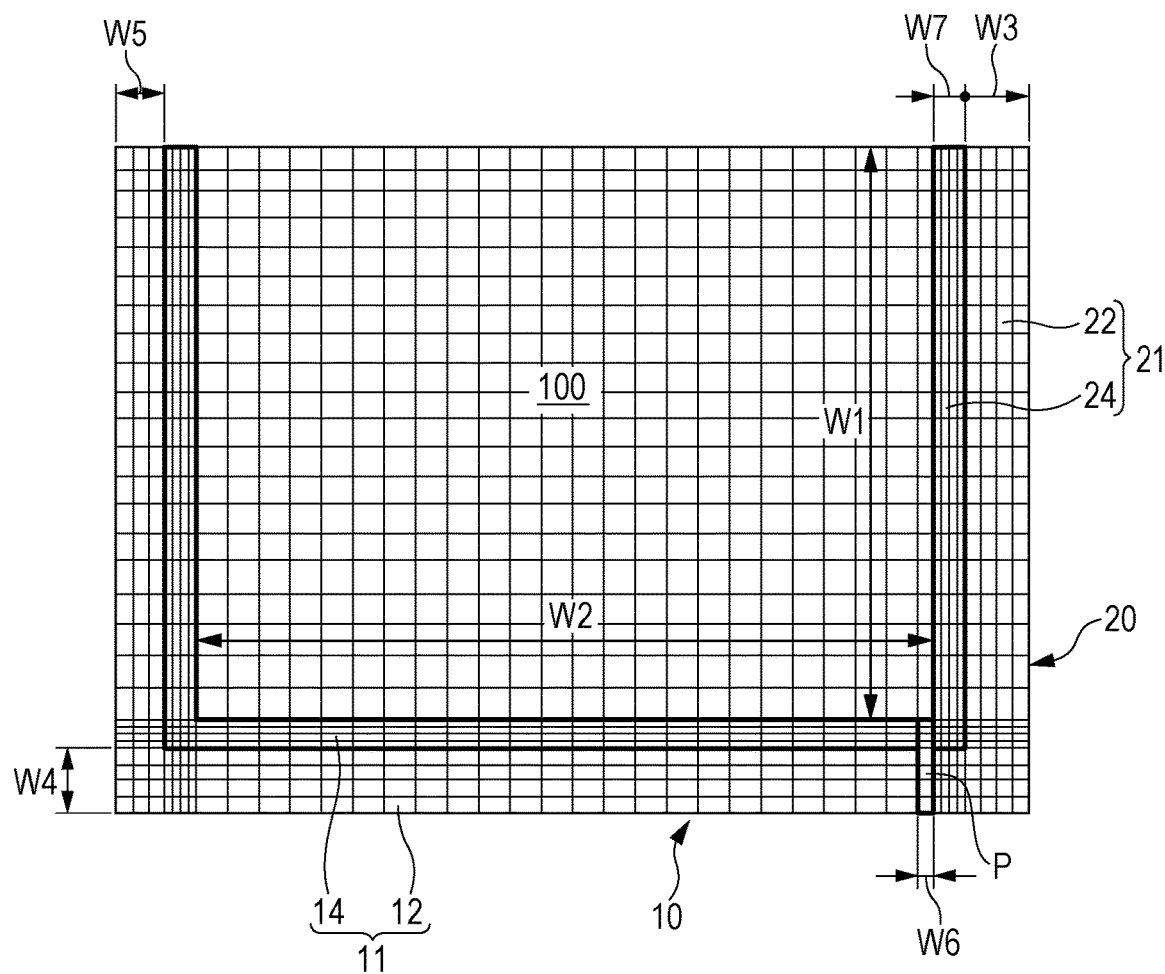
FIG. 5 illustrates a calculation model for determining a temperature distribution along a horizontal cross section of a storage container.

The thermal characteristics of the heat storage portions are determined by simulation using a two-dimensional model illustrated in FIG. 5. FIG. 5 illustrates a calculation model for determining a temperature distribution along a horizontal cross section of the storage container 1. Here, it is assumed that the storage container 1 is a substantially rectangular parallelepiped, and calculation is performed for half the region, considering the symmetry of the cross section.

In FIGS. 5, W1 and W2 are inner dimensions of the storage chamber 100, W3 is the thickness of the heat insulating portion 22 included in the wall member 21, W4 and W5 are the thicknesses of the heat insulating portion 12 included in the wall member 11, W6 is the thickness of the packing P disposed at a contact portion between the container body 10 and the door 20, and W7 is the thickness of the heat storage portions 14 and 24 included in the respective wall members. Here, W1=400 mm, W2=500 mm, W3=45 mm, W4=45 mm, W5=35 mm, W6=1 mm, and W7 is a variable.

FIGS. 6 and 7 show the results of unsteady heat conduction analysis in which the calculation model illustrated in FIG. 5 is used. FIG. 6 shows the temperature in the storage chamber 100 in the case where the heat storage portions 14 and 24 are not provided (W7=0 mm), and FIG. 7 shows the temperature in the storage chamber 100 in the case where the heat storage portions 14 and 24 in which paraffin is used as the heat storage materials are provided (W7=5 mm). FIGS. 6(a) and 7(a) show the temperature after an hour, and FIGS. 6(b) and 7(b) show the temperature after twelve hours.

With regard to the calculation conditions, the melting point of paraffin (phase transition temperature) is 5.9° C., the latent heat is 229 kJ/kg, the starting temperature is 3° C., the ambient temperature is 25° C., the material of the packing P is iron, and the filling factor of the heat storage materials in the heat storage portions is 100%.

As is clear from FIG. 6, when the heat storage portions 14 and 24 are not provided, the temperature in the storage chamber 100 increases to about 10° C. to 20° C. in an hour (FIG. 6(a)), and becomes completely equal to the ambient temperature in 12 hours (FIG. 6(b)). In contrast, when the heat storage portions 14 and 24 are provided, as illustrated in FIG. 7, the temperature in the storage chamber is maintained at about 5° C. after an hour (FIG. 7(a)), and at about 7° C. to 8° C. even after 12 hours (FIG. 7(b)).

In addition, as is clear from FIG. 7, after the operation is stopped, heat flows into the storage chamber 100 of the storage container 1 mainly at the position of the packing P, and is transferred toward the central region of the storage chamber 100 from the position of the packing P. Accordingly, the performance of the heat storage portions is studied through simulation in which heat transfer is taken into account.

FIG. 8 illustrates the results of calculation performed by using a model in which only the physical properties of the heat storage materials of the heat storage portions are changed. FIG. 8 corresponds to FIGS. 6 and 7. Here, the calculation is performed for two types of heat storage materials having the same phase transition temperature, different latent heat values, and different thermal conductivities. Calculation conditions other than those of the heat storage materials are the same as those in FIGS. 6 and 7 except that the phase transition temperature is −18° C. and the starting temperature is −18° C.

In FIG. 8(a), the heat storage materials have a latent heat of 334 kJ/kg and a thermal conductivity of 2.2 W/(m·K). In FIG. 8(b), the heat storage materials have a latent heat of 229 kJ/kg and a thermal conductivity of 0.34 W/(m·K). The values of latent heat and thermal conductivity of the heat storage materials used in the calculation of FIG. 8(a) are similar to those of ice, and the values of latent heat and thermal conductivity of the heat storage materials used in the calculation of FIG. 8(b) are similar to those of paraffin.

FIGS. 8(a) and 8(b) each shows the temperature distribution after 12 hours. As is clear from FIGS. 8(a) and 8(b), the temperature increase is smaller in FIG. 8(b) than in FIG. 8(a).

FIG. 9 shows the result of calculation performed by using a model in which the conditions are similar to those in FIG. 8(a) except that the packing P is omitted, that is, the storage chamber 100 is sealed with a wall member (a heat insulating portion and a heat storage portion). It can be understood that, with the model having such a structure, temperature increase in the storage chamber is suppressed even after 12 hours.

As is clear from the above-described calculation results, with the structure of the storage container including the packing P, the major factor that causes the temperature variation in the storage chamber is the heat that flows into the storage chamber at the position of the packing P. In addition, when the heat storage materials of the heat storage portions in regions near the packing P are selected, factors other than the latent heat also need to be taken into consideration. In other words, it has been found that not only the value of latent heat but also thermal conductivity needs to be taken into consideration to select appropriate heat storage materials for the heat storage portions.

More specifically, it has been considered that the most important factor in selecting a latent heat storage material is that the material has a large amount of latent heat. However, the inventors have invented a refrigerator that provides a cold insulation effect greater than that in the related art by using a latent heat storage material selected on the basis of an index in which the value of latent heat and thermal conductivity are combined. The index in which the value of latent heat and thermal conductivity are both taken into account is defined as temperature conductivity as in Equation (1). The definition will now be described.

[Math. 1]

$$\alpha = \frac{k}{\rho \cdot C} \quad (1)$$

($\alpha$: temperature conductivity (m²/s), k: thermal conductivity (W/(m·K)), $\rho$: density of material of heat storage portion (kg/m³), C: specific heat of material of heat storage portion (J/(kg·K)))

Here, the specific heat in the equation is assumed to be the latent heat in the phase transition temperature range. Since the specific heat is an amount of heat required to increase the temperature of the heat storage material by 1° C., in the case where the phase transition temperature range is, for example, 2° C., the specific heat to be used in Equation 1 can be determined by dividing the total amount of latent heat by the width of the phase transition temperature range.

The temperature conductivities of ice and paraffin can be determined as in Table 1.

TABLE 1

| Substance | Density [kg/m³] | Latent Heat [J/kg · K] | Thermal Conductivity [W/m · K] | Temperature Conductivity [m²/s] |
|---|---|---|---|---|
| Paraffin (n-Tetradecane (m.p. 5.9° C.)) | 790 | 229,000 | 0.34 | $1.88 \times 10^{-9}$ |
| Ice | 990 | 334,000 | 2.2 | $6.65 \times 10^{-9}$ |

Figure 34:
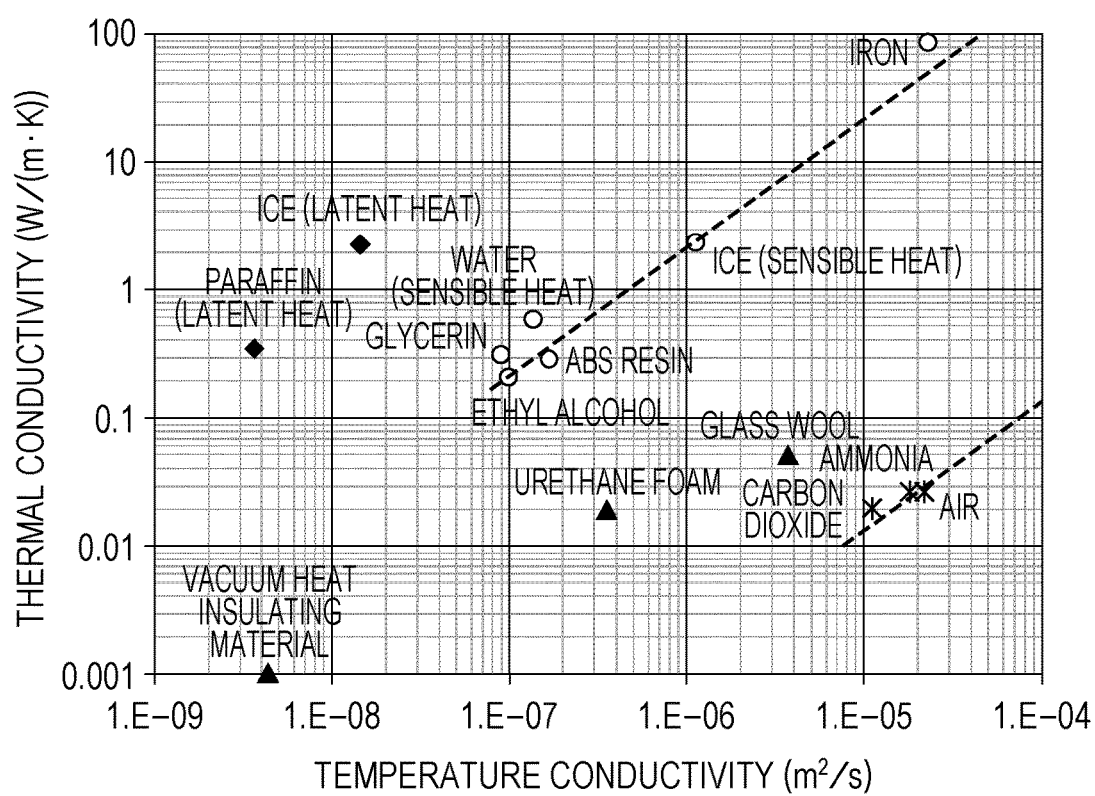
FIG. 34 is a graph showing the relationship between the temperature conductivity and thermal conductivity of substances.

Although paraffin has a smaller amount of latent heat than ice, since the temperature conductivity thereof is small, that is, the temperature thereof does not easily increase, the time required for the phase transition to complete is longer than that of ice. As a result, the phase transition temperature can be maintained for a long time. Therefore, when ice and paraffin are compared, it can be understood that paraffin, which has the lower temperature conductivity, provides a greater heat insulation effect when the inflow of heat occurs. Thus, when ice and paraffin are compared, a greater cold insulation effect can be obtained by using paraffin as a material of a heat storage portion in a region where the inflow of heat occurs, that is, in a region around the packing P in the present embodiment. As illustrated in FIG. 34, the temperature conductivities of liquid and solid substances are generally such that the lower limit thereof is approximately $1 \times 10^{-7}$ (m²/s) and the relationship between the thermal conductivity and temperature conductivity is substantially linear (see dashed lines in FIG. 34). The temperature conductivities of the heat storage materials whose latent heat is used (paraffin (latent heat) and ice (latent heat) in FIG. 34) are not on these lines, and are in the range below $1 \times 10^{-8}$ (m²/s). Thus, it is clear that the cold insulation effect can be obtained when the value of the temperature conductivity is smaller by one order of magnitude than those of ordinary liquid and solid substances. Accordingly, heat storage materials whose latent heat is used need to have temperature conductivities in the range below $1 \times 10^{-8}$ (m²/s). When the temperature conductivity is in this range, the cold insulation effect can be provided for 10 hours or more when the storage chamber is sealed with a wall member (a heat insulating portion and a heat storage portion), as in the calculation result shown in FIG. 9. When there is a region in which, for example, the heat insulating material is thin and the heat insulation performance is low, as in the structure including the packing P, as is clear from the calculation results in FIGS. 8(a) and 8(b), a heat storage material having a smaller temperature conductivity that is below $5 \times 10^{-9}$ (m²/s) is preferably used.

Next, the thickness of the heat storage portion 14 will be discussed.

As described above, in the storage container 1 illustrated in FIG. 1, the heat storage portions 14 and 24 are arranged such that the thicknesses of the heat storage materials thereof are large in the thickness direction at locations adjacent to the packing P with the housings of the container body 10 and the door 20 disposed therebetween (locations shown by α in FIG. 1). In other words, the heat storage portions 14 and 24 are arranged such that an index value obtained by dividing the temperature conductivity of a material by the amount of the material per unit area when viewed from the inner wall of the storage chamber 100 is smaller at the locations shown by α than at other locations. The reason for this will now be described.

When the storage container 1 stops operating, the external heat flows into the storage chamber 100 mainly through the packing P, and increases the temperature in the storage chamber 100. This is because since the container body 10 and the door 20 are connected to each other with the packing P interposed therebetween, the heat insulating portions 12 and 22 and the heat storage portions 14 and 24 of the storage container 1 are discontinuous in the region around the packing. In other words, in the storage chamber 100, the temperature more easily approaches the ambient temperature in the region around the packing P (first region AR1) than in a region distant from the packing P (second region AR2).

Accordingly, in the storage container 1 of the present embodiment, instead of arranging the heat storage portion 14 uniformly, the heat storage portion 14 is arranged such that the thickness thereof is larger (the above-described index value is smaller) in the region around the packing P in the wall member 11, that is, the region in which the temperature relatively easily approaches the ambient temperature after the operation is stopped, than in the region in the wall member 11 in which the temperature does not easily approach the ambient temperature. Accordingly, at the locations near the packing P, compared to the locations distant from the packing P, the temperature does not easily increase and the cold air is supplied for a long time. Therefore, even when the operation is stopped, a uniform temperature distribution in the storage chamber can be relatively easily maintained for a certain time.

The above-described index value may instead be controlled by using, as the material of the heat storage portions 14 and 24 in the regions near the first region AR1, a material whose temperature conductivity at the phase transition temperature is smaller than that of the material of the heat storage portions 14 and 24 in the regions near the second region AR2.

Alternatively, the index value may be controlled by arranging the heat storage portions 14 and 24 so that the total amount of latent heat thereof is larger in the regions near the first region AR1 than in the regions near the second region AR2. As is clear from Equation (1), the denominator of the temperature conductivity includes the specific heat, that is, the latent heat in the phase transition temperature range. In addition, the denominator of the above-described index value includes the product of the specific heat and the amount of use, that is, the total amount of latent heat. Since the index value decreases as the total amount of latent heat increases, this matches the above-described idea.

Although the region in which the temperature easily approaches the ambient temperature is referred to as the first region and the region in which the temperature does not easily approach the ambient temperature is referred to as the second region, this simply shows a relative relationship and it does not mean that the entire inner region is divided into two regions. For example, in the case where there is a region in which the thickness of the heat insulating material is thin, the heat insulation performance is low in that region, and the temperature more easily approaches the ambient temperature than in other regions. However, compared to the region around the packing P, the temperature does not easily approach the ambient temperature. When there are three different regions as in this case, two of the three regions that are compared with each other are referred to as the first and second regions.

As the thickness of the heat storage portion 14 increases, that is, as the amount of latent heat accumulated in the heat storage portion 14 increases, the above-described index value decreases and the cold air can be provided for a longer time. Therefore, the temperature increase in the storage chamber 100 can be suppressed after the operation has stopped. However, when the heat storage portion 14 is too thick, it is expected that adverse effects will occur in terms of the manufacturing cost and the size and shape of the product.

Accordingly, the thickness of the heat storage portion 14 is preferably determined so as to satisfy, for example, a requirement that the temperature in the storage chamber 100 does not reach the maximum allowable temperature (allowable temperature) even after a predetermined time (heat insulation time) since the stoppage of the operation.

The heat insulation time is calculated and set on the assumption that there is no heat load in the storage chamber 100 other than the components of the storage chamber 100, that is, there is no special heat source that increases the temperature in the storage chamber 100 after the operation has stopped.

The thickness of the heat storage portion 14 can be determined in consideration of the above-described inflow and transfer of heat as follows.

First, to simplify calculation, a combined thermal conductivity for the case in which the thickness of the wall member is assumed to be the same as that of the heat storage portion 14 is determined from the equations that show the thermal fluxes that pass through the heat insulating portion 12 and the heat storage portion 14.

More specifically, a calculation model illustrated in FIG. 10(a), in which the wall member 11 includes the heat insulating portion 12 having a thickness $L_1$ and a thermal conductivity $k_1$ and the heat storage portion 14 having a thickness $L_2$ and a thermal conductivity $k_2$, is converted into a calculation model illustrated in FIG. 10(b), in which a wall member 17 is made of a virtual material having a thickness $L_2$ and a thermal conductivity $k_{12}$, so that calculation can be simplified. Then, the thermal conductivity of the wall member 17 is determined.

In the case where a predetermined amount of heat flows into the storage chamber 100 from the outside, the amount of heat is expressed as in Equation (2) for the calculation model illustrated in FIG. 10(a), and as in Equation (3) for the calculation model illustrated in FIG. 10(b). Accordingly, from Equations (2) and (3), the thermal conductivity of the wall member 17 illustrated in FIG. 10(b), that is, the combined thermal conductivity of the heat insulating portion 12 and the heat storage portion 14, is calculated as in Equation (4).

[Math. 2]

$$q = \frac{T_1 - T_2}{\left(\frac{L_1}{k_1} + \frac{L_2}{k_2}\right)} \quad (2)$$

[Math. 3]

$$q = \frac{k_{12}(T_1 - T_2)}{L_2} \quad (3)$$

[Math. 4]

$$k_{12} = \frac{L_2}{\left(\frac{L_1}{k_1} + \frac{L_2}{k_2}\right)} \quad (4)$$

(q: amount of heat (W), $T_1$: ambient temperature (K), $T_2$: set temperature of storage chamber (K), $L_1$: thickness of heat insulating portion (m), $L_2$: thickness of heat storage portion (m), $k_1$: thermal conductivity of heat insulating portion (W/(m·K)), $k_2$: thermal conductivity of heat storage portion (W/(m·K)), $k_{12}$: combined thermal conductivity of heat insulating portion and heat storage portion (W/(m·K)))

Next, the structure of the storage container 1 is simplified. The amount of heat that flows into the simplified structure will be discussed. FIG. 11 shows graphs of the relationship between the temperature and the distance from the outer surface of the storage container toward the central region.

As illustrated in FIG. 11(a), since the heat outside the storage container is transferred to the inside of the storage chamber through the wall member, the temperature of the wall member is equal to the ambient temperature at the outer surface and to the temperature in the storage chamber at the inner surface, and varies in the thickness direction. The air in the storage chamber has a small thermal capacity, and therefore it can be assumed that the temperature thereof is equal to that of the inner wall of the storage chamber. This relationship is obtained both when the operation has just been stopped and when the temperature in the storage chamber reaches the allowable temperature after a predetermined time.

Therefore, assuming that the temperature variation in the storage chamber can be determined by calculating the temperature variation on the inner wall of the storage chamber, the temperature in the storage chamber is indirectly calculated through calculation using a calculation model illustrated in FIG. 11(b) in which the space in the storage chamber is abstracted. Since the thickness of the wall member is set to $L_2$, with the model illustrated in FIG. 11(b), the temperature in the storage chamber can be calculated by calculating the temperature distribution in a solid body having a thickness of $2L_2$ and determining the temperature at the center of the solid body (position separated from the surface by $L_2$).

Figure 12:
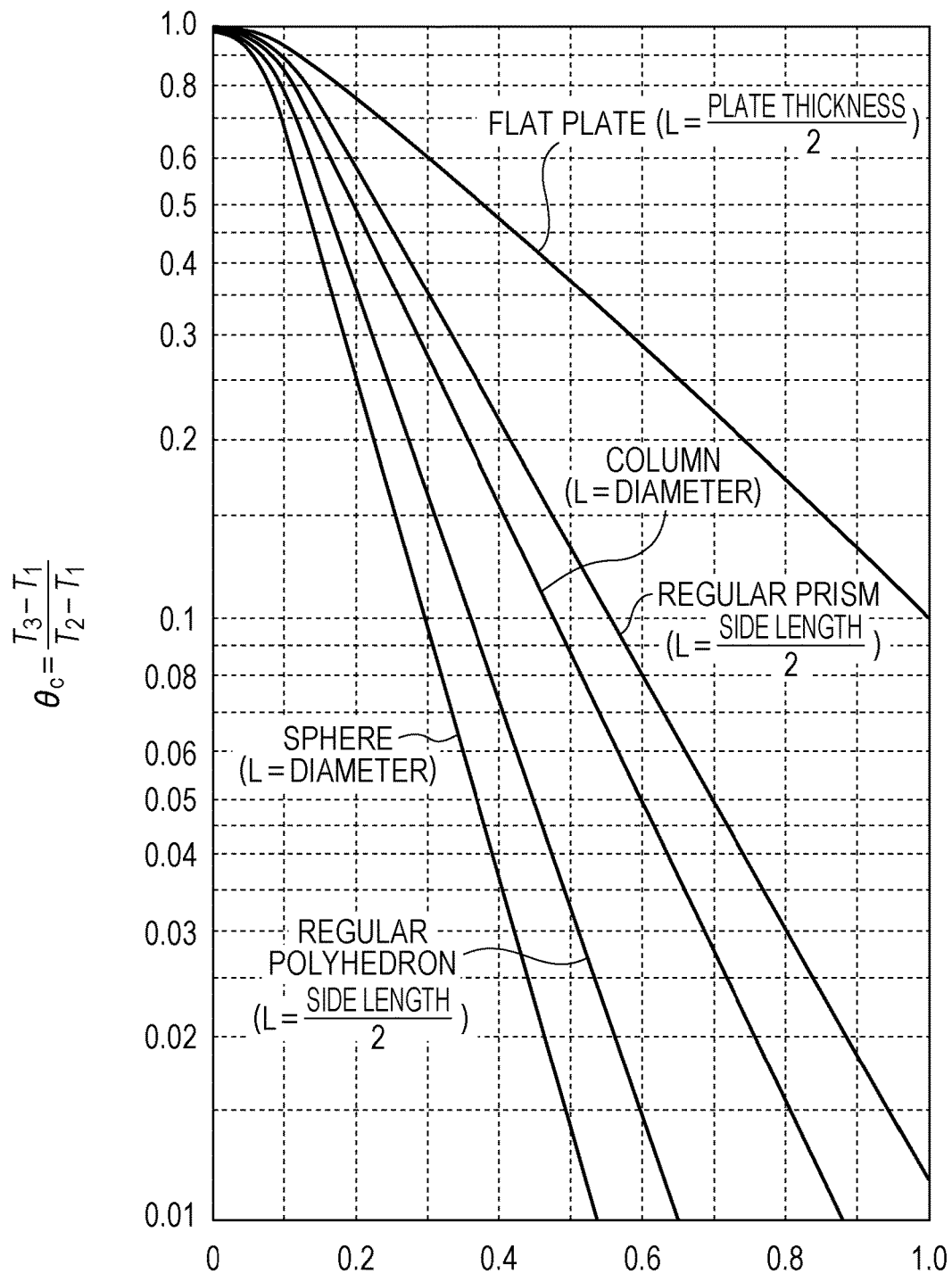
FIG. 12 is a Heisler chart showing heat transfer in a solid body.

The calculation of heat transfer from the surface of the solid body (storage container from which the storage chamber is abstracted) toward the inner region of the solid body can be performed by solving the fundamental equation of unsteady heat conduction through general heat transfer calculation by using the initial temperature of the solid body and the initial ambient temperature. With regard to the temperature variation due to heat transfer toward the central region of a solid body, a Heisler chart as illustrated in FIG. 12 which shows the relationship between the dimensionless temperature and dimensionless time (Fourier number) is known. The temperature variation in the solid body may be determined by using the Heisler chart.

The dimensionless time (Fourier number) represented by the horizontal axis of the Heisler chart illustrated in FIG. 12 can be expressed as in Equation (5) by using the temperature conductivity of the solid body, the time elapsed since the stoppage of the operation, and the distance to the center of the solid body (that is, the thickness of the wall member).

[Math. 5]

$$F_o = \frac{\alpha \cdot t}{L_2^2} \quad (5)$$

($F_o$: dimensionless time (Fourier number), $\alpha$: temperature conductivity (m²/s), t: elapsed time (s), $L_2$: thickness of wall member (m))

The dimensionless temperature represented by the vertical axis of the Heisler chart illustrated in FIG. 12 can be expressed as in Equation (6) by using the ambient temperature, the set temperature of the storage chamber, and the temperature in the storage chamber that varies after the stoppage of the operation.

[Math. 6]

$$\theta_c = \frac{T_3 - T_1}{T_2 - T_1} \quad (6)$$

($\theta_c$: dimensionless temperature, $T_1$: ambient temperature (K), $T_2$: set temperature of storage chamber (K), $T_3$: temperature in storage chamber (K))

Of the parameters that determine the dimensionless temperature, the ambient temperature $T_1$ and the set temperature $T_2$ are set values. Therefore, when the allowable temperature of the storage chamber 100 is set, the corresponding Fourier number can be determined. When the Fourier number is determined from the Heisler chart illustrated in FIG. 12, the Fourier number may be directly read from the chart. Alternatively, the Fourier number may be calculated from Equation (7), which is an approximate equation. Equation (7) is an approximate equation for the curve of flat plate in FIG. 12.

[Math. 7]

$$\theta_c = 1.273 \cdot \exp(-2.467 \cdot F_o) \quad (7)$$

Of the parameters that determine the Fourier number expressed as in Equation (5), the temperature conductivity can be calculated by using Equations (1) and (4) mentioned above. Therefore, a function representing the relationship between the thickness of the wall member (that is, the thickness of the heat storage portion) and the time elapsed since the stoppage of the operation can be determined by using the Fourier number determined by using the Heisler chart and Equation (5).

Figure 13:
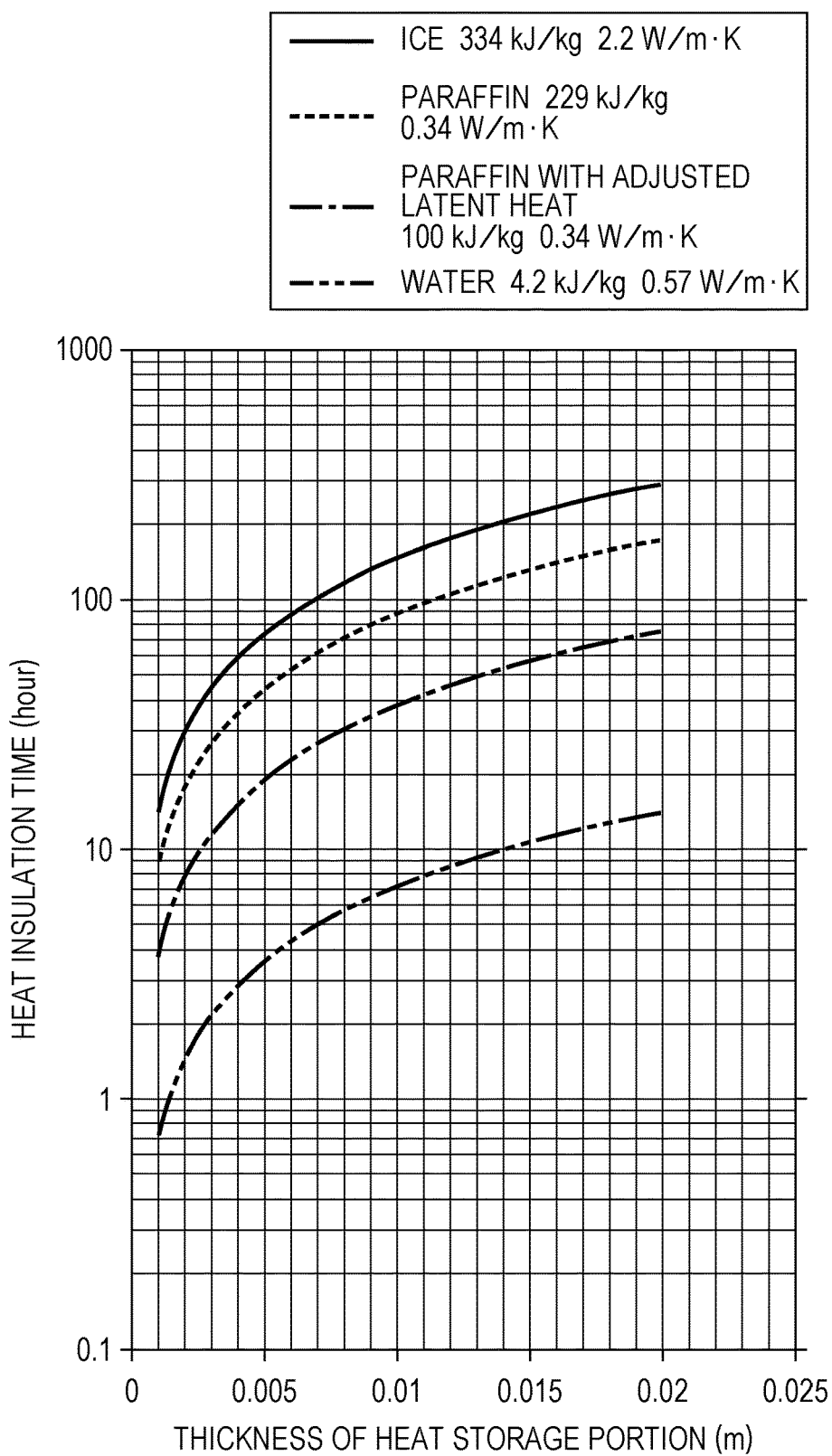
FIG. 13 is a graph showing the relationship between the heat insulation time and the thickness of the heat storage portion.

FIG. 13 is a graph showing the relationship between the thickness of the heat storage portion and the heat insulation time (time elapsed since the stoppage of the operation) determined on the basis of the above-described idea. The graph shows the results for a plurality of types of heat storage materials.

Most part of the heat insulation time is the time from the start of phase transition of the heat storage material of the heat storage portion to the end of the phase transition. Therefore, the graph shows the result of calculation of the heat insulation time versus thickness of the heat storage portion in the case where the temperature in the storage chamber changes from 5° C. to 7° C. under the conditions that the phase change temperature range of paraffin is 5° C. to 7° C. and the ambient temperature is 25° C.

By using the relationship illustrated in FIG. 13, when, for example, the time from when the operation is stopped to when the temperature reaches the allowable temperature is set, the required thickness of the heat storage portion can be determined. Thus, a storage container with desired specifications can be obtained. In addition, by using the relationship illustrated in FIG. 13, the time from when the operation of a storage container is stopped to when the temperature reaches the allowable temperature, that is, the heat insulation time of the storage container, can be estimated.

The heat insulation time is preferably set to at least 2 hours to prepare for power failure. Although the heat insulation time increases as the thickness of the heat storage portion increases, the capacity of the storage chamber 100 decreases accordingly. Therefore, to ensure sufficiently large capacity, the upper limit of the heat insulation time is preferably set to 24 hours.

Thus, a storage container with desired specifications can be obtained by appropriately setting the arrangement, material, and thickness of the heat storage portion.

To verify the effect of heat storage portions configured in accordance with the above-described idea, the present inventors have performed a simulation regarding the thermal characteristics of the heat storage portions. In the simulation, calculation models illustrated in FIGS. 5 and 14 were used.

Figure 14:
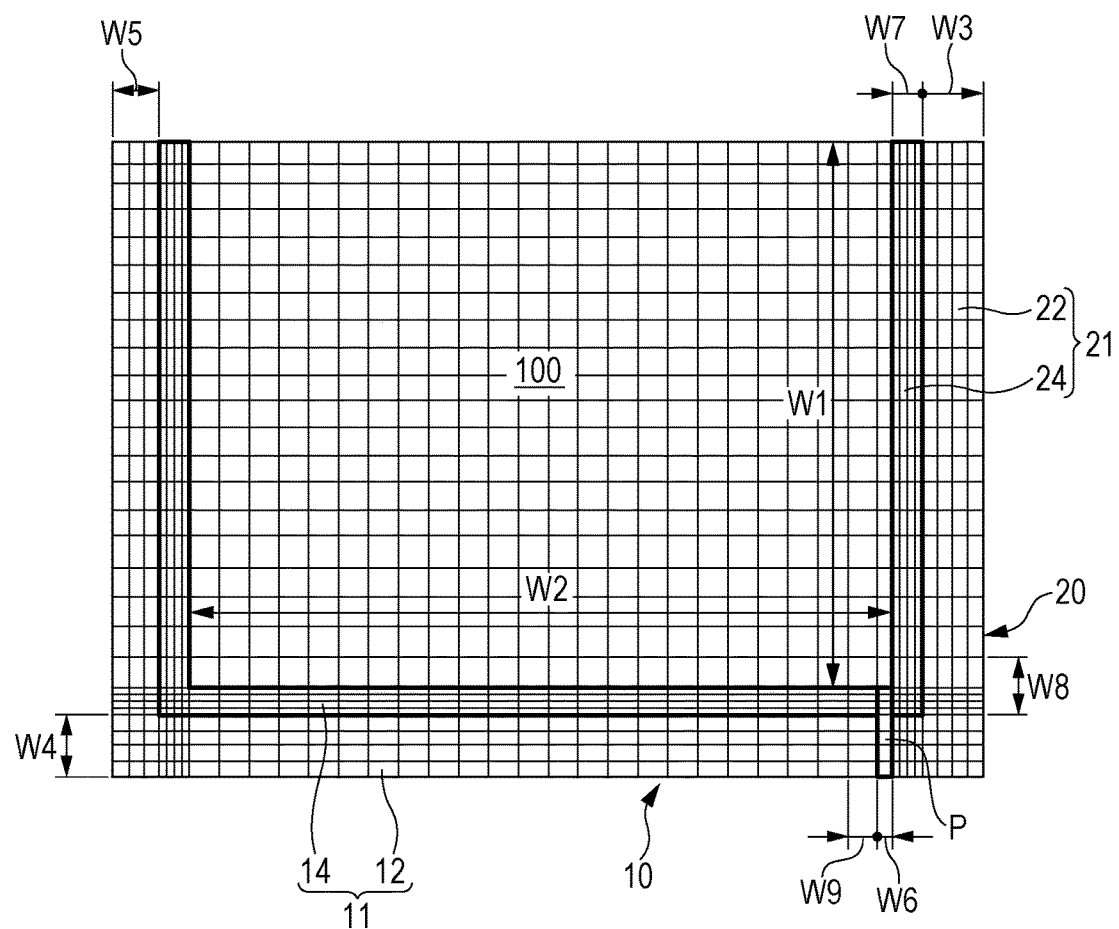
FIG. 14 illustrates a calculation model for determining a temperature distribution along a horizontal cross section of the storage container.

FIG. 14 illustrates a calculation model in which parameters W8 and W9 are added to the calculation model illustrated in FIG. 5. Here, W8 and W9 are distances from the ends of the heat storage portions that are in contact with the packing P. Table 2 shows the parameters used in the calculation.

TABLE 2

| Substance | State | Density [kg/m³] | Specific Heat [J/ kg · K] | Thermal Conductivity [W/m · K] | Temperature Range |
|---|---|---|---|---|---|
| Urethane Foam | Solid | 28.6 | 1900 | 0.019 | — |
| Packing Magnet (Iron) | Solid | 7870 | 442 | 80.3 | — |
| Air | Gas | 1.1763 | 1000 | 0.02614 | — |
| Paraffin (n-Tetradecane (m.p. 5.9° C.)) | Solid | 790 | 1800 | 0.34 | 5° C.> |
| | Solid → Liquid | 790 | 114500 | 0.34 | 5° C.-7° C. |
| | Liquid | 790 | 2100 | 0.14 | 7° C.< |

FIGS. 15(a) and 15(b) show the results of calculation of unsteady heat conduction analysis in which the calculation model illustrated in FIG. 5 is used. The values of W1 to W7 are the same as those in FIG. 7 (W7=5 mm).

FIGS. 16(a) and 16(b) show the results of calculation of unsteady heat conduction analysis in which the calculation model illustrated in FIG. 14 is used. W1 to W6 are the same as those in FIG. 14. The thickness of the heat storage portions 14 and 24 is set to W7=20 mm within the distances of W8=40 mm and W9=20 mm from the ends and is set to W7=2 mm in other regions.

FIGS. 15(a) and 16(a) show the temperature after 6 hours, and FIGS. 15(b) and 17(b) show the temperature after 8 hours.

With regard to the calculation conditions, the melting point of paraffin (phase transition temperature) is 5.9° C., the latent heat is 229 kJ/kg, the starting temperature is 3° C., the ambient temperature is 25° C., the material of the packing P is iron, and the filling factor of the heat storage materials in the heat storage portions is 100%.

As a result of the calculation, as is clear from FIG. 15, in the case where the heat storage portion 14 has a uniform thickness, a non-uniform temperature distribution is generated in the storage chamber 100 in 6 hours (FIG. 15(a)), and the temperature in the storage chamber 100 is increased to about 20° C. in 8 hours (FIG. 15(b)). In contrast, as is clear from FIG. 16, in the case where the heat storage portion 14 is arranged so that the volume thereof is large in the region around the packing P and small in other regions, the temperature in the storage chamber is maintained at about several degrees after 6 hours (FIG. 16(a)), and about 10° C. even after 8 hours (FIG. 16(b)).

When a commercially available product (model number: SJ-V200T) in which the capacity of the storage chamber 100 is 170 L is used as a model, the amount of heat storage material used to form the heat storage portion 14 is estimated as 7 kg for the model illustrated in FIGS. 15(a) and 15(b). In contrast, the amount of heat storage material is estimated as 3.3 kg for the model illustrated in FIGS. 16(a) and 16(b). Thus, with the model illustrated in FIG. 16, heat insulation can be provided in the storage chamber 100 for a longer time and the amount of heat storage material can be reduced.

Thus, it has been found that a storage container that provides an effective heat insulation function can be obtained by appropriately setting the arrangement, material, and thickness of the heat storage portion.

With the above-described storage container 1 having the above-described structure, even when the operation is stopped, a uniform temperature distribution in the storage chamber can be maintained for a certain time.

In the present embodiment, the storage container that stores an object at a temperature lower than the ambient temperature is described. However, another embodiment of the present invention may be a storage container that stores an object at a temperature higher than the ambient temperature, that is, a so-called heating cabinet.

In such a case, in the storage chamber after that operation has stopped, the temperature in the lower region of the storage chamber more easily approaches the ambient temperature than the temperature in the upper region of the storage chamber. Therefore, unlike the structure illustrated in FIG. 4, the heat storage portion is arranged such that the volume thereof is larger in the lower region of the storage chamber than in the upper region of the storage chamber.

In the case where the storage container is a heating cabinet, the set temperature of the storage chamber is generally about 80° C. to 100° C. Therefore, the phase transition temperature range of the heat storage materials is preferably 80° C. to 100° C. The heat storage materials may be, for example, D-Threitol, which has a phase change temperature of 90° C. and a latent heat of 225 kJ/kg.

In the present embodiment, to simplify calculation, the simulation is performed by using a two-dimensional model in which the structure is simplified. However, the simulation may instead be performed by using a two-dimensional model in which the actual structure of the storage container is reproduced without being simplified.

In addition, in the present embodiment, the storage container including a single storage chamber 100 is described. However, the storage container may include, for example, two or more types of storage chambers having different set temperatures. In such a case, the heat storage portion is set for each storage chamber.

In addition, according to the present embodiment, the door 20 is rotatably attached to the container body 10. However, the structure is not limited to this as long as the door (lid) is capable of opening and closing the storage chamber 100.

For example, the structure may instead be such that the storage chamber 100 is opened or closed by sliding a lid along a certain rail. Alternatively, the lid may be detachably attached so that the storage chamber 100 can be opened or closed. Also in this case, the temperature in the space around the lid relatively easily approaches the ambient temperature when the operation is stopped. Therefore, by arranging the heat storage portion so that the thickness thereof is large in the region near the lid in the wall member, the cold insulation effect can be provided for a long time after the stoppage of the operation of the storage container.

[Second Embodiment]

Figure 17:
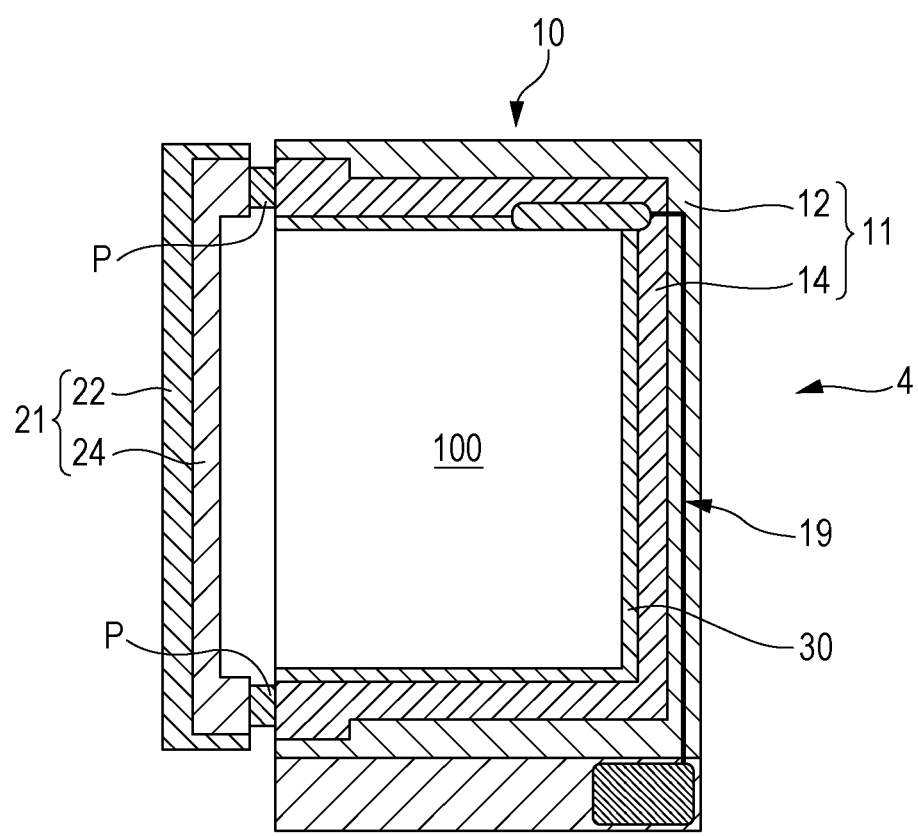
FIG. 17 illustrates a storage container according to a second embodiment.
Figure 18:
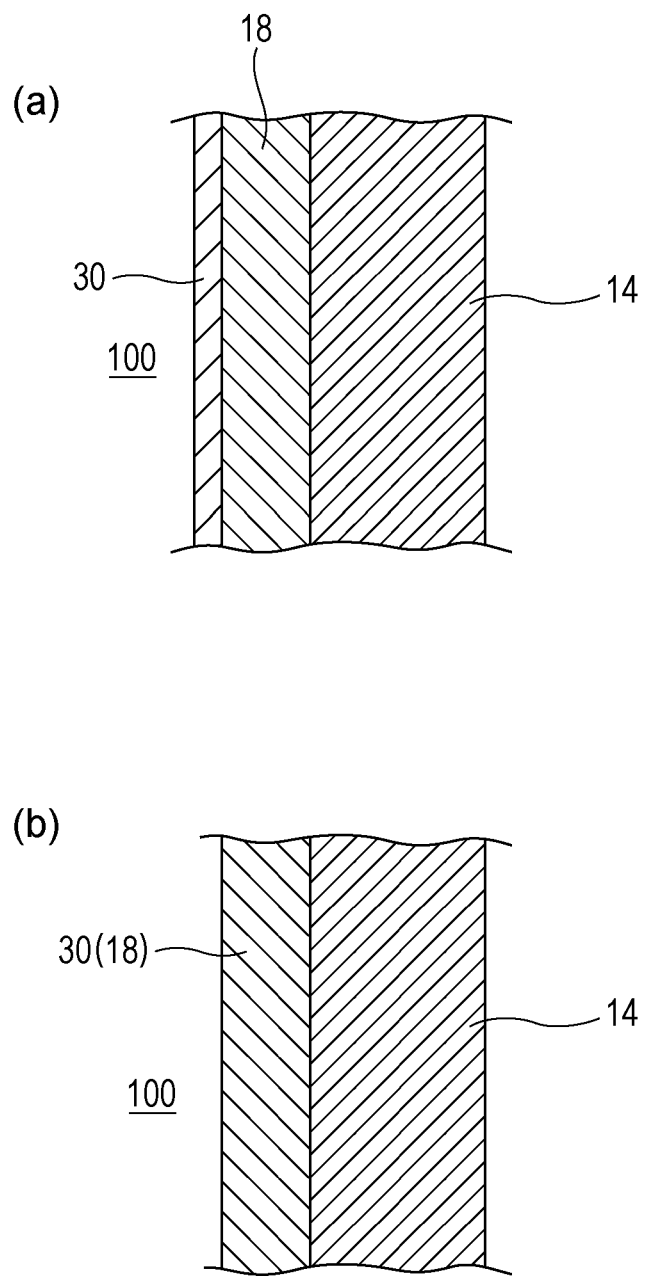
FIG. 18 illustrates the storage container according to the second embodiment.

FIGS. 17 and 18 illustrate a storage container 4 according to a second embodiment of the present invention. The storage container 4 according to the present embodiment includes portions having the same structures as those of the storage container 1 according to the first embodiment. Therefore, in the present embodiment, components having the same structures as those in the first embodiment are denoted by the same reference numerals, and detailed descriptions thereof are thus omitted.

As illustrated in FIG. 17, the storage container 4 includes a reflective layer (infrared reflective layer) 30, which reflects infrared light, on an inner wall of the storage chamber 100.

When a user wishes to take out an object stored in the storage chamber 100 while the operation of the storage container 4, which is a refrigerator, is stopped, the user needs to open the door 20 and insert his or her hand into the storage chamber 100. At this time, since the surface temperature of the user's hand is higher than the temperature in the storage chamber 100, heat of radiation from the user's hand flows into the storage chamber 100.

Heat transfer due to radiation between the user and the inside of the storage chamber 100 that occurs when the door 20 is opened can be estimated as in Equation (8).

[Math. 8]

$$Q = A \cdot \epsilon \cdot \sigma \cdot s \cdot (T_4^4 - T_5^4) \quad (8)$$

(Q: amount of heat entered due to radiation (J), A: surface area (m$^2$), $\epsilon$: emissivity, $\sigma$: Stefan-Boltzmann constant (5.67×10$^{-8}$ (W/(m$^2$·K$^4$)), s: time for which door is opened (s), $T_4$: body surface temperature (K), $T_5$: temperature in storage chamber (K))

When it is assumed that the surface temperature of the user wearing clothes is 30° C., the temperature in the storage chamber is 6° C., and radiation from half the surface area of a human (1.8 m$^2$) is considered, the amount of heat transfer can be determined from Equation (8) as 109 J/s. Accordingly, the amount of heat that flows into the refrigerator is 33 kJ when the time for which the door is opened is 30 seconds and 66 kJ when the time for which the door is opened is 60 seconds.

In the case where the capacity of the container is 140 L, the amount of heat that flows into the storage chamber when the air in the storage chamber is completely replaced with the outside air is calculated as 32 kJ when the density of the air is $\rho$ (=1.1763 kg/m$^3$), the specific heat of the air is Cp (=1007 J/(kg·K)), the ambient temperature is 25° C., and the temperature in the storage chamber is 6° C. (amount of heat=140/1000×$\rho$×Cp×(25−6)).

Thus, it can be understood that heat that enters when the door 20 is opened is greatly influenced by the radiation from the surface of the user's body.

The storage container 4 according to the present embodiment includes the reflective layer 30, which reflects infrared light, on the inner wall of the storage chamber 100. Therefore, the infrared light radiated from the surface of the user's body can be reflected when the user takes out an object from the storage chamber 100 during power failure. Thus, the inflow of the heat of radiation can be reduced and the temperature increase in the storage chamber can be suppressed. In addition, during stable operation, the temperature in the storage chamber does not easily increase and the power consumption can be reduced accordingly.

The reflective layer 30 is made of a material having a low absorbance for infrared light radiated from a human body. The peak wavelength of such infrared light can be determined as around 9.6 μm from the Wien's displacement law. In addition, according to the Kirchhoff's laws, the absorbance is in inverse correlation with the reflectance. Therefore, a material having a high reflectance for such infrared light may instead be used. For example, a material that reflects 60% or more of infrared light having a peak wavelength corresponding to the surface temperature of a human body is preferably used. An example of such a material is a metal material that reflects light, such as aluminum.

The reflective layer 30 may be provided on the surface of the housing 18, as illustrated in FIG. 18(a), or be configured to constitute a portion of the housing 18 so that the reflective layer 30 and the heat storage portion 14 are in contact with each other, as illustrated in FIG. 18(b). When the reflective layer 30 is structured as illustrated in FIG. 18(b) and is made of a metal material, the heat storage portion 14 can be easily cooled by the cold air in the storage chamber 100 through the reflective layer 30, which is made of a metal material, in stable operation. Accordingly, the phase of the heat storage portion 14 can be easily changed to the solid phase.

With the storage container 4 having the above-described structure, even when an object is taken out of the storage chamber while the operation is stopped, temperature increase in the storage chamber can be suppressed and a uniform temperature distribution in the storage chamber can be maintained.

[Third Embodiment]

Figure 19:
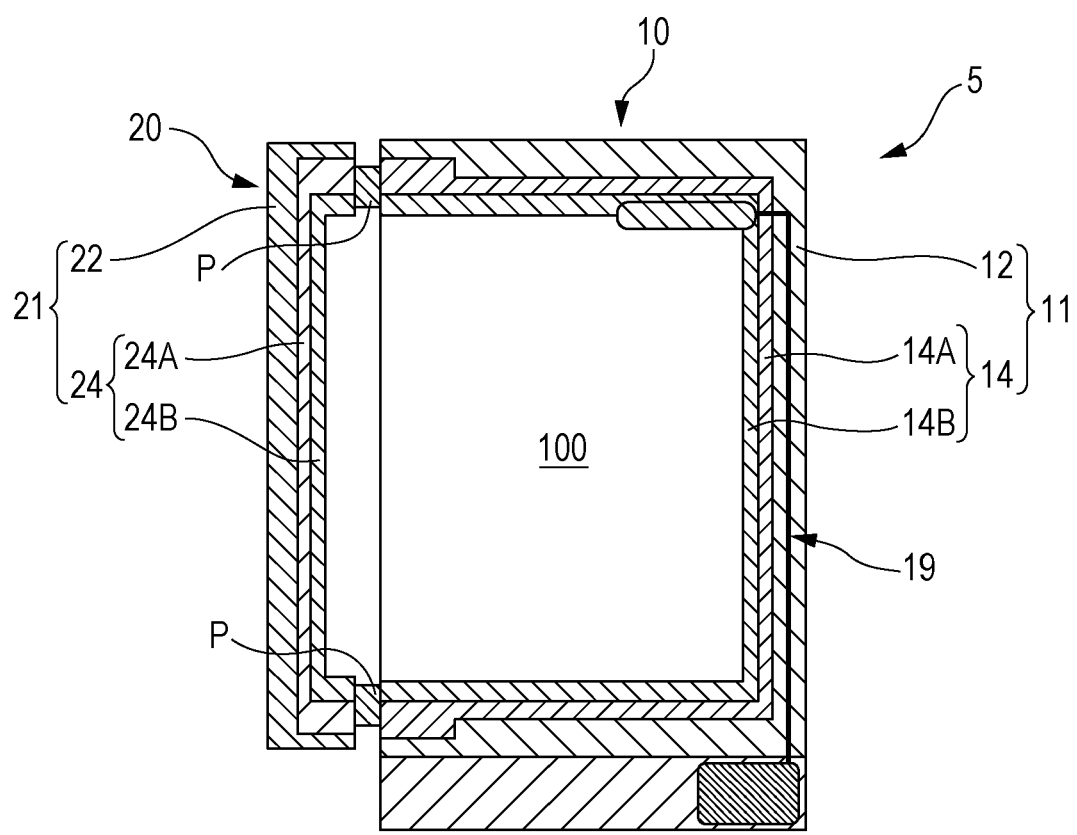
FIG. 19 illustrates a storage container according to a third embodiment.

FIG. 19 illustrates a storage container 5 according to a third embodiment of the present invention. The storage container 5 according to the present embodiment includes portions having the same structures as those of the storage container 1 according to the first embodiment. Therefore, in the present embodiment, components having the same structures as those in the first embodiment are denoted by the same reference numerals, and detailed descriptions thereof are thus omitted.

As illustrated in FIG. 19, the heat storage portion 14 of the storage container 5 includes a first heat storage portion 14B that surrounds the storage chamber 100 and a second heat storage portion 14A that surrounds the storage chamber 100 in a space between the heat insulating portion 12 and the first heat storage portion 14B. Also, the heat storage portion 24 includes a first heat storage portion 24B that surrounds the storage chamber 100 and a second heat storage portion 24A that surrounds the storage chamber 100 in a space between the heat insulating portion 22 and the first heat storage portion 24B. The second heat storage portions 14A and 24A are made of a material having a phase transition temperature closer to the ambient temperature than that of the material of the first heat storage portions 14B and 24B.

With the storage container 5 having the above-described structure, when the operation is stopped, first, cold air is supplied to the inside of the storage chamber 100 from the first heat storage portions 14B and 24B, which have a relatively low phase transition temperature, until the phase transition of the first heat storage portions 14B and 24B is completed. Then, cold air is supplied to the inside of the storage chamber 100 from the second heat storage portions 14A and 24A, which have a relatively high phase transition temperature, until the phase transition of the second heat storage portions 14A and 24A is completed. Thus, the heat storage portions 14 and 24 have multiple phase transition temperatures, so that the temperature in the storage chamber 100 can be easily maintained.

With the storage container 5 having the above-described structure, a uniform temperature distribution in the storage chamber can be maintained.

[Fourth Embodiment]

FIG. 20 illustrates a storage container according to a fourth embodiment of the present invention. The storage container according to the present embodiment includes portions having the same structures as those of the storage container 1 according to the first embodiment. Therefore, in the present embodiment, components having the same structures as those in the first embodiment are denoted by the same reference numerals, and detailed descriptions thereof are thus omitted.

FIGS. 20(a) and 20(b) illustrate structures of the wall member 11. As illustrated in FIGS. 20(a) and 20(b), the heat storage portion 14 has a large thickness in the thickness direction from the wall surface of the storage chamber 100 at a location adjacent to the packing P with the housings of the container body 10 and the door 20 disposed therebetween (location shown by α in FIG. 1). Therefore, the thickness of a heat insulating portion 13 provided on the heat storage portion 14 in a region adjacent to the packing P is smaller than that of the heat insulating portion 12 disposed on the heat storage portion 14 in a region that is not adjacent to the packing P.

The heat insulating portion 13 made of a relatively thin heat insulating material allows a larger amount of heat to enter than in other regions. Therefore, the cold insulation performance is lower in the region in which the heat storage portion 14 is thick than in other regions. Therefore, it is necessary to reduce the difference in heat insulation performance between the heat insulating portion 12 and the heat insulating portion 13. In this example, the heat insulating portion 13 is made of a vacuum heat insulating material which has a higher heat insulation performance than urethane foam, which is used as the material of the heat insulating portion 12. Accordingly, the heat insulating portion 13 and the heat insulating portion 12 have a similar heat insulation performance, and reduction in the cold insulation performance of the heat storage portion 14 in the region adjacent to the packing P can be suppressed.

[Fifth Embodiment]

FIG. 21 illustrates a method for determining a phase transition temperature of a heat storage material included in a storage container according to a fifth embodiment of the present invention. FIG. 21(a) shows an example of a measurement of the phase transition temperature of the heat storage material using a DSC. In FIG. 21(a), the horizontal axes represent the temperature t. The right side of the horizontal axes representing the temperature t is the high temperature side. Two horizontal axes are illustrated: the upper horizontal axis shows the measurement result obtained when the temperature is lowered and the lower horizontal axis shows the measurement result obtained when the temperature is raised. The vertical axis represents the amount of heat. The upper side of each horizontal axis shows the amount of heat radiated from the heat storage material, and the lower side of each horizontal axis shows the amount of heat absorbed by the heat storage material.

In FIG. 21(a), the measurement result obtained when the DSC furnace is cooled at a predetermined temperature lowering rate (temperature lowering speed) is shown by the solid curve D1, and the measurement result obtained when the DSC furnace is cooled at a temperature lowering rate higher than the predetermined temperature lowering rate is shown by the dashed curve D2. Similarly, the measurement result obtained when the DSC furnace is heated at a predetermined temperature rising rate is shown by the solid curve U1, and the measurement result obtained when the DSC furnace is heated at a temperature rising rate higher than the predetermined temperature rising rate is shown by the dashed curve U2.

As illustrated in FIG. 21(a), in the measurement with the DSC, the peak temperature varies in accordance with the temperature lowering rate or the temperature rising rate. In addition, since the phase transition temperature decreases due to supercooling H in a temperature lowering measurement, hysteresis occurs between the temperature rising process and the temperature lowering process. In the above-described first embodiment, it is described that the peak temperature is measured during phase transition from the liquid phase to the solid phase when the temperature lowering rate is set to 1° C./min. However, in a non-steady state, as illustrated in FIG. 21(a), the peak temperature measured with the DSC varies depending on the temperature lowering or rising rate and the hysteresis between the temperature lowering process and the temperature rising process. The peak temperature needs to be a temperature at which the heat storage material can be maintained in a solid phase during cold insulation or hot insulation in the storage container. Therefore, when the phase transition temperature of the heat storage material is measured with the DSC, the peak temperature is preferably measured when the phase changes from the solid phase to the liquid phase. Accordingly, the peak temperature of the phase transition temperature of the heat storage material with the DSC is preferably measured in a temperature rising process at a relatively low temperature rising rate.

FIG. 21(b) illustrates a method for measuring the peak temperature in a temperature rising process with the DSC. Similar to FIG. 21(a), the horizontal axis represents the temperature t and the vertical axis represents the amount of heat. In FIG. 21(b), the measurement result obtained when the DSC furnace is heated at a predetermined temperature rising rate is shown by the solid curve U. The dashed line obtained by extending, toward the high temperature side, a straight portion of the curve U in a range before the start of phase transition of the heat storage material from the solid phase to the liquid phase is defined as an imaginary straight line X1. The dashed line obtained by extending a straight portion of the curve U in a range after the start of phase transition of the heat storage material and before the amount of absorbed heat reaches a maximum is defined as an imaginary straight line X2. The peak temperature is determined as the temperature at the intersecting point C between the imaginary lines X1 and X2. The thus-determined peak temperature is within a temperature range in which the heat storage material can be maintained in the solid state in the storage container in most cases.

[Sixth Embodiment]

Figure 22:
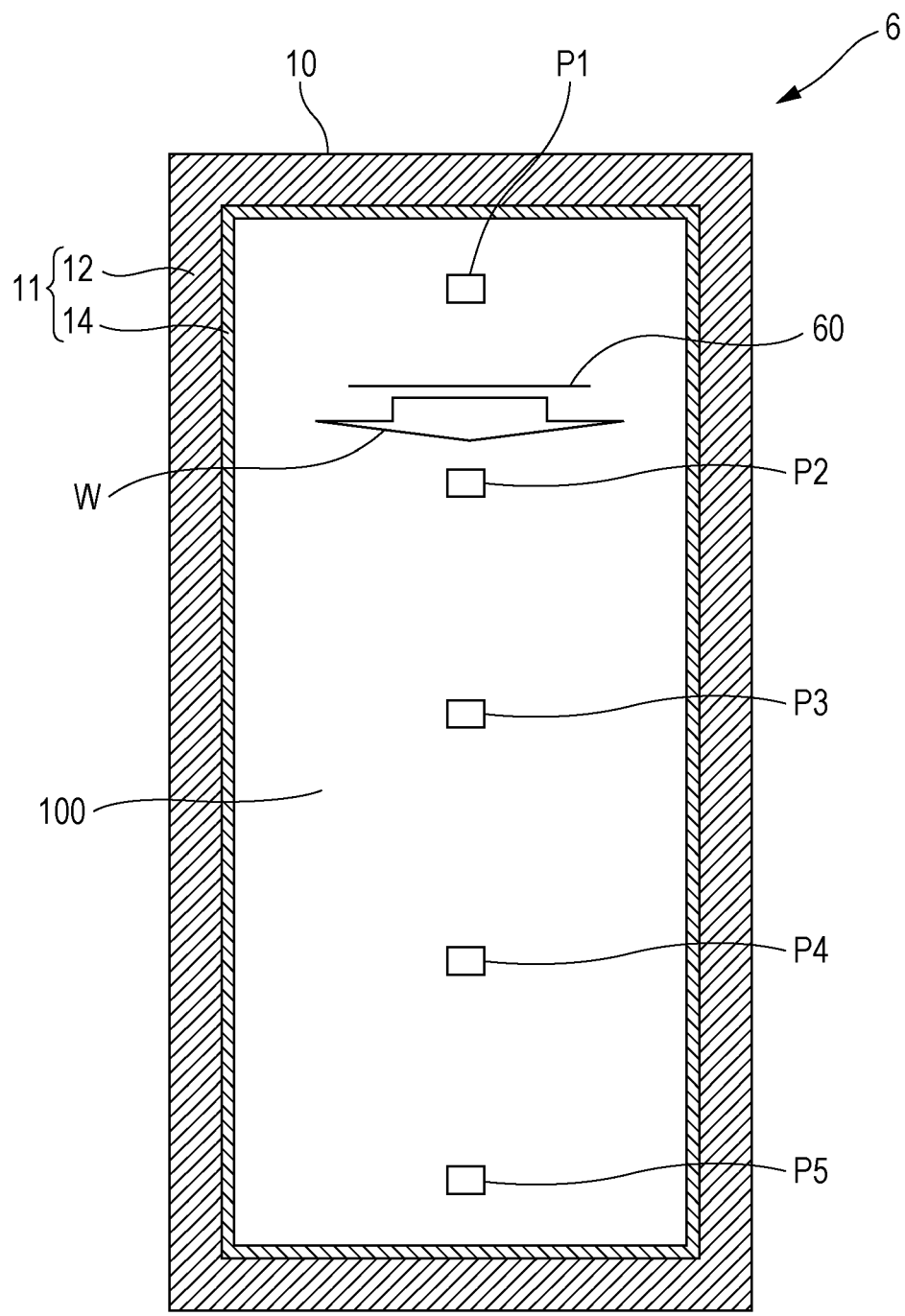
FIG. 22 illustrates a storage container according to a sixth embodiment.
Figure 23:
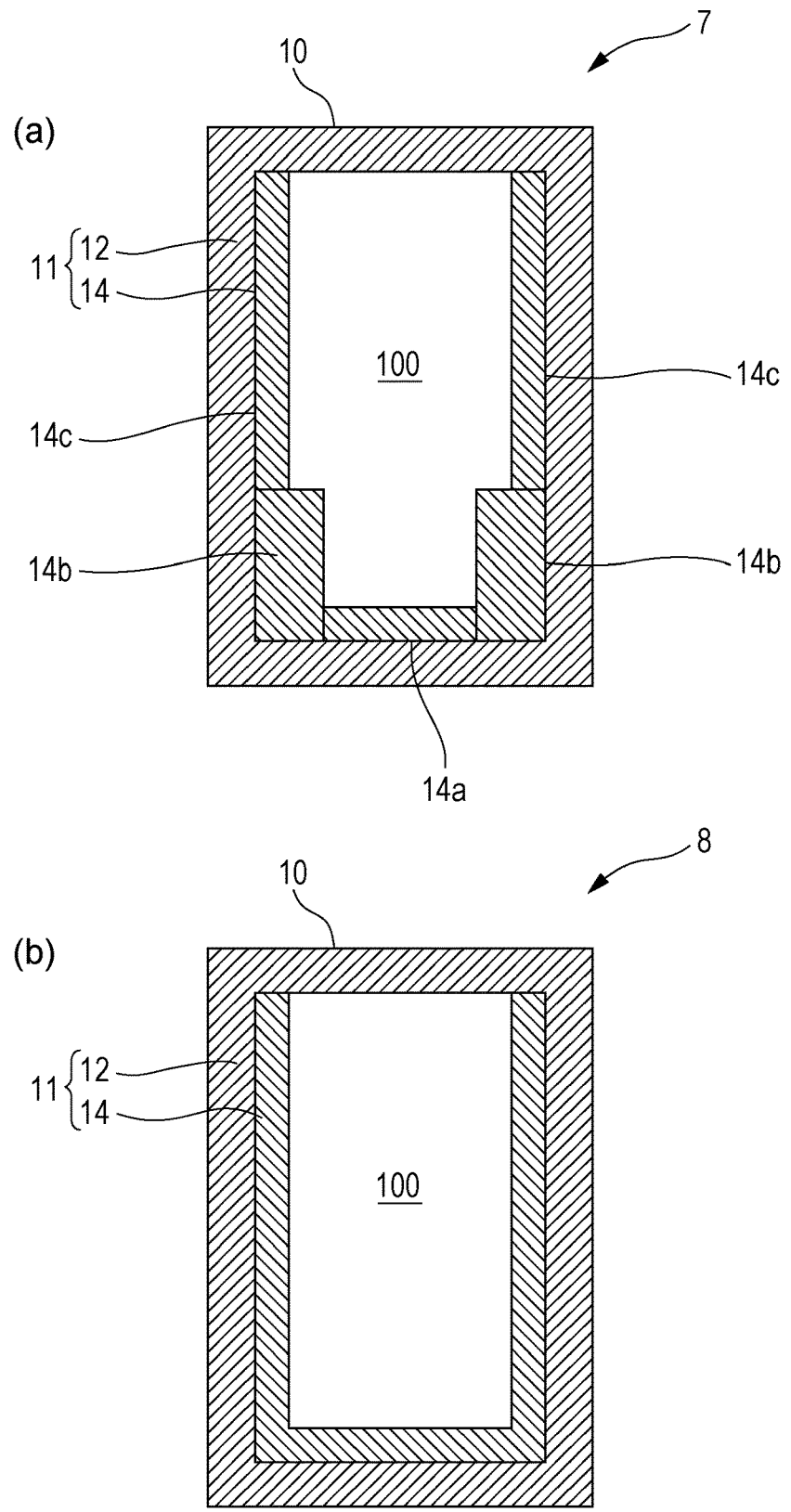
FIG. 23 illustrates storage containers according to the sixth embodiment.

FIGS. 22, 23(a), and 23(b) illustrate storage containers 6, 7, and 8 according to a sixth embodiment of the present invention. The storage containers 6, 7, and 8 according to the present embodiment include portions having the same structures as those of the storage container 1 according to the first embodiment. Therefore, in the present embodiment, components having the same structures as those in the first embodiment are denoted by the same reference numerals, and detailed descriptions thereof are thus omitted. FIG. 22 is a sectional view of the storage container 6 illustrating the state in which the storage chamber 100 is viewed from the opening 101. In the storage container 6, a cold air outlet 60 is provided in place of the cooling unit 192 in an upper portion of the inner wall of the storage chamber 100 at the back side. The cold air outlet 60 has an elongated opening that extends in the horizontal direction. Cold air is blown into the storage chamber 100 through the elongated opening of the cold air outlet 60 at a flow rate of, for example, 10 cm/s in the direction shown by the arrow W.

Five temperature data sampling points P1 to P5 are provided on the inner wall of the storage chamber 100 at the back side. The temperature data sampling point P1 is located at the center of a region above the cold air outlet 60. The temperature data sampling points P2 to P5 are vertically arranged at equal intervals along a single line at the center of a region below the cold air outlet 60.

The external shape of the storage container 6 is a rectangular parallelepiped shape with a square bottom of 50 (cm)×50 (cm) and a height of 100 cm. The latent heat storage material of the heat storage portion 14 has a latent heat of 50 kJ/kg, a specific heat of 1 kJ/(kg·K), and a phase transition temperature of 6° C. The heat insulating portion 12 is a urethane board having a thermal conductivity of 0.025 W/(m·k) and a thickness of 5 cm.

FIG. 23(a) is a sectional view of the storage container 7 illustrating the state in which the storage chamber 100 is viewed from the opening 101. The structure of the storage container 7 is the same as that of the storage container 6 except for the arrangement of the heat storage portion 14. In FIG. 23(a), the cold air outlet 60 and the temperature data sampling points P1 to P5 of the storage container 7 are not illustrated. The heat storage portion 14 of the storage container 7 includes a heat storage portion 14a having a thickness v1 on a bottom inner wall portion of the storage chamber 100. A heat storage portion 14b having a thickness v2 larger than that of the heat storage portion 14a (>v1) is provided on a side wall portion of the storage chamber 100 so as to extend about ⅓ of the height of the side wall portion from the bottom portion. A heat storage portion 14c having the thickness v1 equal to that of the heat storage portion 14a is provided on the side wall portion of the storage chamber 100 so as to extend to a top inner wall portion of the storage chamber 100 from the position of about ⅓ of the height of the side wall portion from the bottom. No heat storage material is provided on the top inner wall portion of the storage chamber 100.

FIG. 23(b) is a sectional view of the storage container 8 illustrating the state in which the storage chamber 100 is viewed from the opening 101. The structure of the storage container 8 is the same as that of the storage containers 6 and 7 except for the arrangement of the heat storage portion 14. In FIG. 23(b), the cold air outlet 60 and the temperature data sampling points P1 to P5 of the storage container 8 are not illustrated. The heat storage portion 14 of the storage container 8 have a thickness v3 over the entire regions of the bottom inner wall portion and side wall portion of the storage chamber 100. The thickness v3 is greater than the thickness v1 and smaller than the thickness v2. No heat storage material is provided on the top inner wall portion of the storage chamber 100. The total amount of heat storage material included in the storage container 8 is equal to the total amount of heat storage material included in the storage container 7.

Thus, the storage container 7 and the storage container 8 include the same total amount of heat storage material, and include no heat storage material on the top inner wall portion of the storage chamber 100. The storage container 7 and the storage container 8 differ from each other in that the storage container 8 includes the heat storage material having a substantially uniform thickness, whereas the storage container 7 includes the heat storage material which has a larger thickness on the side wall in a region close to the bottom portion than in a region above that region.

For the two storage containers 7 and 8 in which the heat storage material is partially arranged on the inner wall of the storage chamber 100 in different patterns, the time for which the temperature in the storage chamber 100 can be maintained at 10° C. is determined by thermo-fluid analysis. The analysis is performed for two cases where the ambient temperature of the storage containers 7 and 8 is 30° C. and 40° C. The initial value of the temperature in the storage chamber 100 is set to 0° C. This can be achieved by blowing cold air at 0° C. from the cold air outlet 60 for ten hours. It is assumed that the storage chamber 100 is sealed, and that no heat sources are present and only natural convection occurs.

FIG. 24 shows graphs of the analysis results. FIG. 24(a) is a bar graph showing the average retention time for which the temperature in the storage chamber 100 can be maintained at 10° C. FIG. 24(b) is a bar graph showing positional distributions of the retention time for which the temperature in the storage chamber 100 can be maintained at 10° C. In each graph, the vertical axis represents time. Group A1 shows the result for the storage container 7 when the ambient temperature is 30° C. Group A2 shows the result for the storage container 7 when the ambient temperature is 40° C. Group B1 shows the result for the storage container 8 when the ambient temperature is 30° C. Group B2 shows the result for the storage container 8 when the ambient temperature is 40° C. In FIG. 24(b), five retention times arranged in order from left to right in each group respectively correspond to the temperature data sampling points P1 to P5. In FIG. 24(a), the average retention time for each group is the average value of the retention times at the temperature data sampling points P1 to P5 of each group in FIG. 24(b).

The following can be understood from the graph of FIG. 24(a). That is, first, the average retention time for which the temperature in the storage chamber 100 can be maintained at 10° C. is longer in the storage container 7 corresponding to Groups A1 and A2 than in the storage container 8 corresponding to Groups B1 and b2. When the ambient temperature is 30° C., the average retention time is about 9 hours in both the storage containers 7 and 8. In both the storage containers 7 and 8, the average retention time obtained when the ambient temperature is 30° C. is about twice the average retention time obtained when the ambient temperature is 40° C.

The following can be understood from the graph of FIG. 24(b). That is, first, the average retention time for which the temperature in the storage chamber 100 can be maintained at 10° C. is longest at the temperature data sampling point P5 and shortest at the temperature data sampling point P1 in both the storage containers 7 and 8. The average retention time decreases in the order of the temperature data sampling points P4, P3, and P2. When the ambient temperature is 30° C., the temperature in the upper region of the container exceeds 10° C. after 4 hours in both the storage containers 7 and 8, and a temperature gap is generated between the upper region and other regions of the container. When the ambient temperature is 40° C., the temperature in the upper region of the container exceeds 10° C. after 1 hour in both the storage containers 7 and 8, and a temperature gap is generated between the upper region and other regions of the container.

According to the above-described analysis, the manufacturing cost can be reduced by reducing the amount of the heat storage material, and the heat storage material can be optimally arranged when there are regions in which the heat storage material cannot be arranged due to structural restrictions of the storage container.

[Seventh Embodiment]

Figure 25:
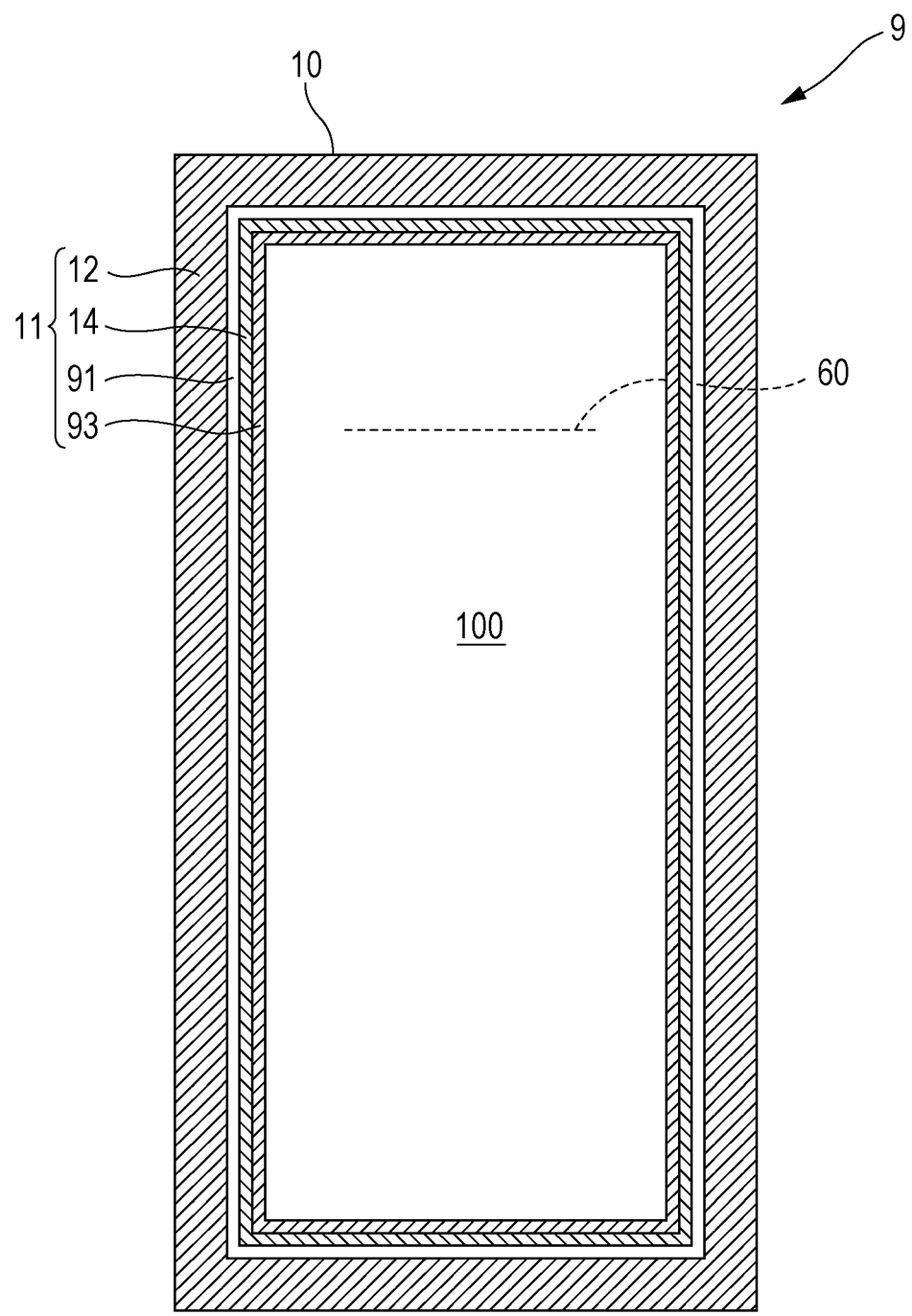
FIG. 25 illustrates a storage container according to a seventh embodiment.
Figure 26:
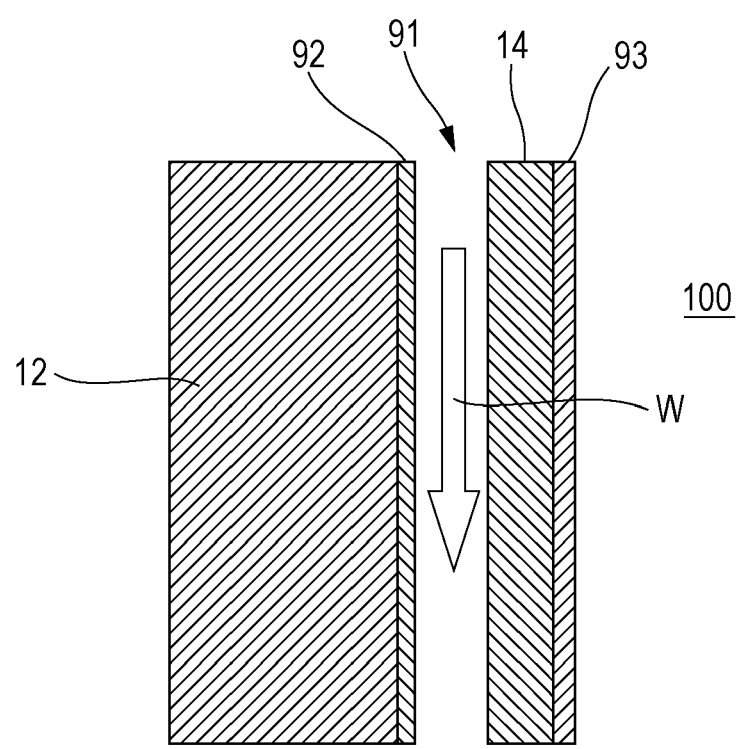
FIG. 26 illustrates the storage container according to the seventh embodiment.

FIGS. 25 and 26 illustrate a storage container 9 according to a seventh embodiment of the present invention. The storage container 9 according to the present embodiment includes portions having the same structures as those of the storage container 6 according to the sixth embodiment. Therefore, in the present embodiment, components having the same structures as those in the sixth embodiment are denoted by the same reference numerals, and detailed descriptions thereof are thus omitted.

FIG. 25 is a sectional view of the storage container 9 illustrating the state in which the storage chamber 100 is viewed from the opening 101. FIG. 26 is a detailed sectional view of a portion of the wall member 11 of the storage container 9. As illustrated in FIGS. 25 and 26, the wall member 11 includes the heat insulating portion 12, an inner wall portion 92, a space portion 91, the heat storage portion 14, and a heat reflecting panel 93 in that order from the outside toward the storage chamber 100. With this structure, the space surrounded by the heat reflecting panel 93 in the storage chamber 100 serves as a storage space in which an object is actually stored.

As illustrated in FIG. 25, in the storage container 9, the cold air outlet 60 is formed in an upper section of the inner wall portion 92 at the back side. The cold air outlet 60 has an elongated opening that extends in the horizontal direction. As illustrated in FIG. 26, cold air is blown into the space portion 91 through the elongated opening of the cold air outlet 60 so that the cold air circulates, for example, at a flow rate of 10 cm/s in the direction shown by the arrow W. Therefore, in the storage container 9, unlike the storage container 6, the cold air from the cold air outlet 60 is not directly blown against the object. As a result, the object can be prevented from becoming excessively dry.

In addition, since the heat storage portion 14 is exposed in the space portion 91, the heat storage portion 14 can be directly cooled by the cold air that circulates through the space portion 91. Thus, the heat storage portion 14 can be cooled in a short time with low power consumption. In addition, since the heat storage portion 14 is directly attached to the heat reflecting panel 93 over substantially the entire area thereof, the heat reflecting panel 93 can be uniformly cooled by the heat storage portion 14. As a result, the inside of the container can be uniformly cooled by the heat reflecting panel 93.

[Eighth Embodiment]

Figure 27:
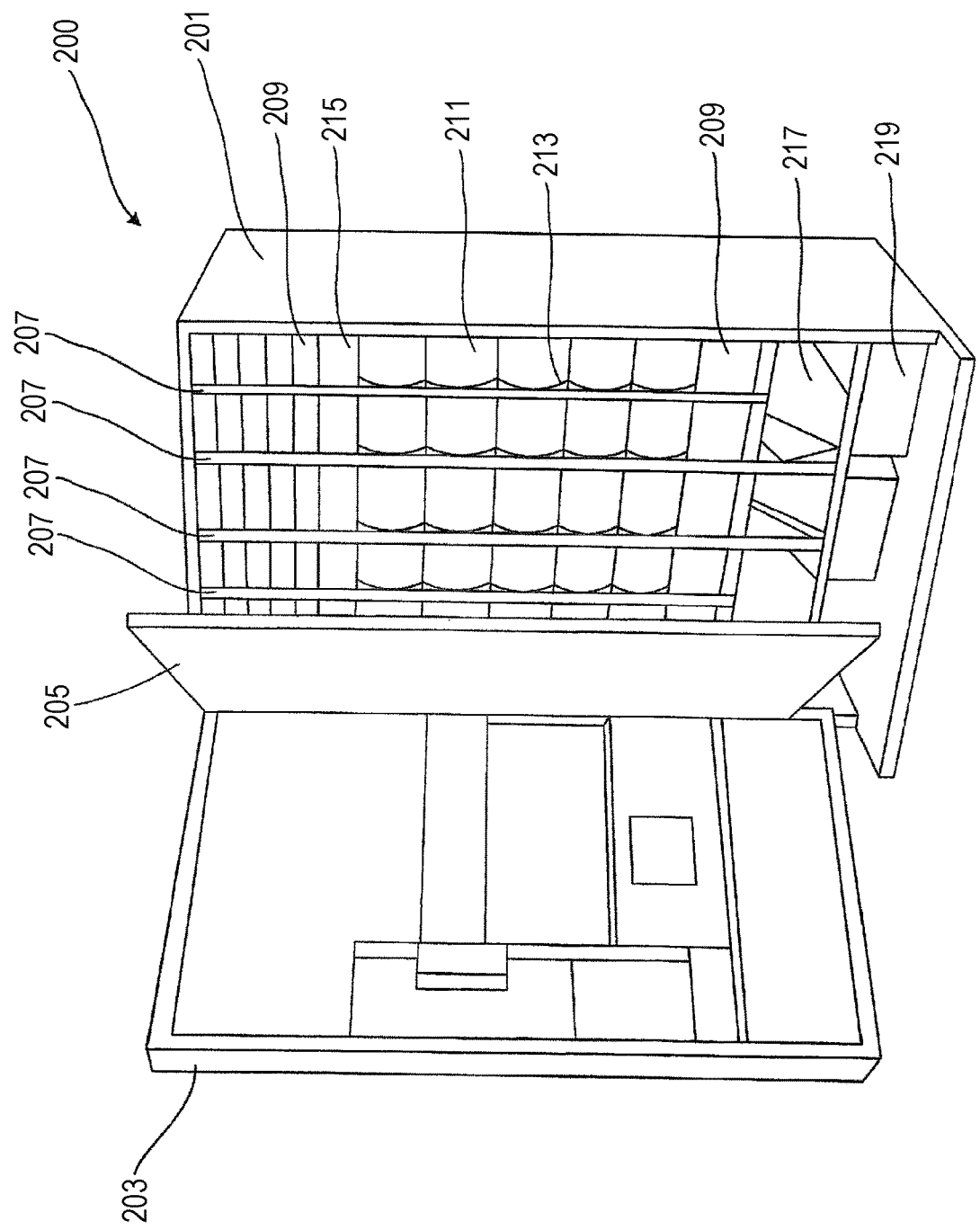
FIG. 27 illustrates a storage container according to an eighth embodiment.

FIG. 27 illustrates a storage container according to an eighth embodiment of the present invention. In the present embodiment, a vending machine 200 will be described as a storage container. The vending machine 200 includes a cabinet 201, an inner door 205, and an outer door 203. The inner door 205 is attached to the cabinet 201 with a hinge mechanism (not illustrated) so that the inner door 205 can be opened and closed. The outer door 203 is attached to the cabinet 201 with a hinge mechanism (not illustrated) so that the outer door 203 can be opened and closed while the inner door 205 is disposed on the inner side of the outer door 203. Product samples, product selection buttons, price tags, a coin slot, a change outlet, a product outlet, etc. are arranged on the front side of the outer door 203. The inner door 205 includes a heat insulating material. FIG. 27 illustrates a state in which the inner door 205 and the outer door 203 are opened away from the cabinet 201.

The cabinet 201 includes a heat insulating material arranged in an inner wall portion of a metal housing. A plurality of product racks 211 that contain products are arranged in regions surrounded by a plurality of vertical partition walls 207 and two horizontal partition walls 209 and 209 in a space inside the heat insulating material. Product inlets 215 are arranged above the uppermost product rack 211. A product outlet 217 is arranged below the lowermost product rack 211.

Heat storage portions 213 are attached to wall portions that surround the product racks 211. Each heat storage portion 213 is made of a heat storage material having a heat storing performance of maintaining the temperature at a desired cooling temperature for a predetermined time. For example, any of the heat storage materials described in the first to seventh embodiments may be used as the material of each heat storage portion 213. A cooling mechanism 219 for cooling the product racks 211 and the heat storage portions 213 is disposed below the product outlet 217.

Energy-saving vending machines are known as one means for achieving load leveling. In energy-saving vending machines, the operation mode for operating the cooling mechanism 219 each day is divided into three modes, which are a normal operation mode, a peak shift mode, and a peak cut mode. The peak shift mode is set, for example, from 10:00 to 13:00, and the cooling operation is performed at a temperature lower than the set temperature for the normal operation mode. The peak cut mode is set, for example, from 13:00 to 16:00. During this time period, the operation of the cooling mechanism 219 is stopped.

In contrast, according to the vending machine 200 of the present embodiment, when the phase of the heat storage material of the heat storage portions 213 arranged around the product racks 211 is set to the solid phase in the normal operation mode, the peak shift mode can be omitted so that only the peak cut mode is set. As a result, power consumption can be further reduced compared to that of the energy-saving vending machines of the related art. Alternatively, when the phase of the heat storage material of the heat storage portions 213 arranged around the product racks 211 is set to the solid phase in the peak shift mode, the duration time of the peak cut mode can be increased. Also in this case, power consumption can be further reduced compared to that of the energy-saving vending machines of the related art.

When the vending machine 200 includes a heating mechanism and the material of the heat storage portions 213 is replaced with one having a phase transition temperature within a temperature range for a heating cabinet, the temperature in the product racks 211 can be increased to sell hot products.

[Ninth Embodiment]

A problem of a storage container of the related art to be overcome by a ninth embodiment of the present invention will be described with reference to a simulation result. FIG. 28 illustrates the structure of a simulation model of a storage container 300 according to the related art. FIG. 28(*a*) is a front sectional view of the storage container 300, and FIG. 28(*b*) is a sectional view of the storage container 300 viewed from the right.

With regard to the external dimensions of the storage container 300, the storage container 300 has a width of 600 mm, a depth of 600 mm, and a height of 650 mm. The thickness of heat insulating portions 12 and 22 is 40 mm at the sides, 30 mm at the ceiling, and 100 mm at the bottom. Heat storage portions (latent heat storage materials) 14 and 24 are arranged to be in contact with an inner wall of the container that defines a storage chamber 100. The heat storage portions 14 and 24 have a thickness of 10 mm, a latent heat of 86 kJ/kg, a density of 0.78 g/cc, and a phase change temperature of 6° C. To cool the storage chamber 100, cold wind of 0° C. is blown toward a door 20 through a cold air outlet 60 for 20 hours at a flow velocity of 10 cm/s and a flow rate of 8000 cc/s. The cold air that has been blown is discharged to the outside through an outlet 62. The ambient temperature of the storage chamber 100 is 30° C.

Figure 29:
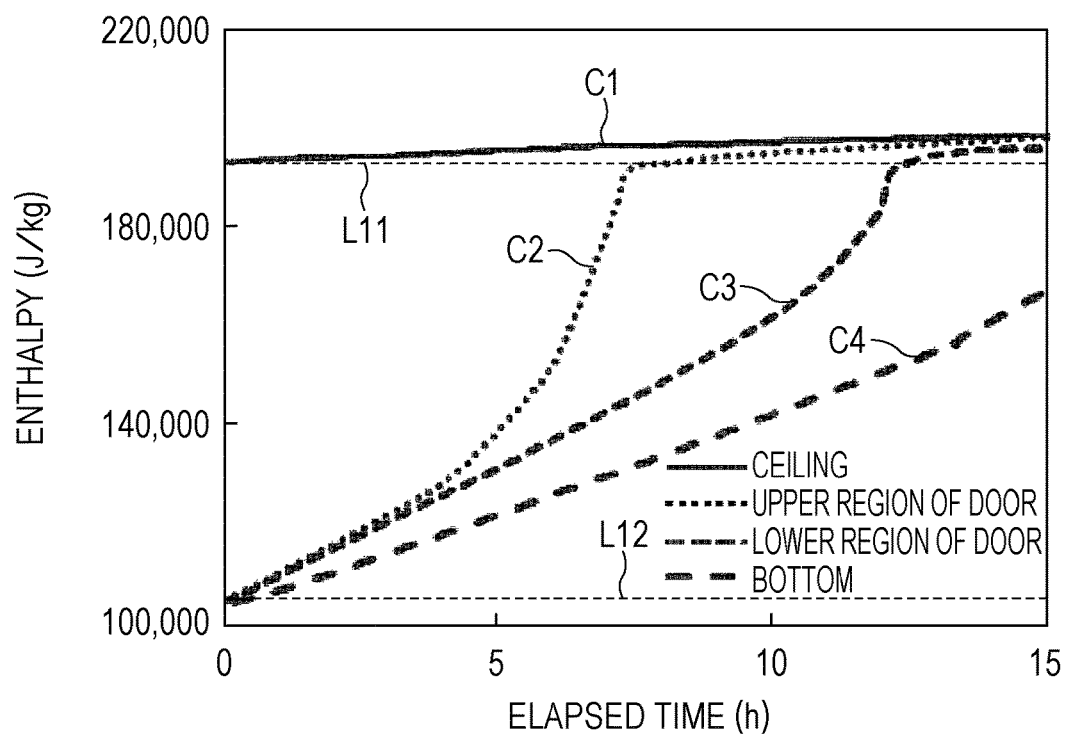
FIG. 29 is a graph showing the variation in enthalpy of a latent heat storage material over time after a storage chamber of the storage container according to the related art has been cooled.

The enthalpy of the latent heat storage material after the storage chamber 100 has been cooled under the above-described conditions is calculated for four positions: a position P11 at substantially the center of the ceiling of the storage chamber 100, an upper position P12 on the inner wall surface of the door 20, a lower position P13 on the inner wall surface of the door 20, and a position P14 at substantially the center of the bottom surface of the storage chamber 100. FIG. 29 is a graph showing variation of the enthalpy of the latent heat storage material with time. The horizontal axis of the graph represents the elapsed time (h) assuming that the time at which cooling of the storage chamber 100 has been completed is 0, and the vertical axis of the graph represents the enthalpy (J/kg). In the graph, the straight line L11 shows the enthalpy in the state in which the latent heat storage material is completely melted (state in which the latent heat storage material is only in the liquid phase and no latent heat storage material in the solid phase is present), and the straight line L12 shows the enthalpy in the state in which the latent heat storage material is completely solidified (state in which the latent heat storage material is only in the solid phase and no latent heat storage material in the liquid phase is present). The region between the straight lines L11 and L12 is a phase transition region of the latent heat storage material (latent heat region). The curve C1 shows the enthalpy at the position P11, the curve C2 shows the enthalpy at the position P12, the curve C3 shows the enthalpy at the position P13, and the curve C4 shows the enthalpy at the position P14.

As illustrated in FIG. 29, the curve C1 is above the straight line L11 when the elapsed time is 0 h. Thus, it is clear that the latent heat storage material is completely liquefied at the position P11 even immediately after the cooling process. In other words, even when the storage chamber 100 is cooled, the latent heat storage material is not solidified on the ceiling of the storage chamber 100, and the latent heat of the latent heat storage material in this region cannot be utilized. Thus, in the storage container according to the related art, the latent heat storage material is not sufficiently solidified in an upper region of the storage chamber 100. Therefore, there is a problem that the cold insulation time for which a low temperature in the storage chamber 100 can be maintained by the latent heat storage material when the operation of the storage container is stopped is reduced. When, for example, a latent heat storage material having a relatively high phase change temperature is used so that the latent heat storage material is sufficiently solidified even in the upper region of the storage chamber 100, the cold insulation temperature at which the temperature in the storage chamber 100 can be maintained by the latent heat storage material is increased.

FIGS. 30 and 31 illustrate the structures of storage containers according to the present embodiment which solve the above-described problem. Each storage container according to the present embodiment includes portions having the same structures as those of the storage container 1 according to the first embodiment. Therefore, in the present embodiment, components having the same structures as those in the first embodiment are denoted by the same reference numerals, and detailed descriptions thereof are thus omitted.

FIG. 30(*a*) is a sectional view illustrating the structure of a storage container 401 according to a first example of the present embodiment, illustrating the state in which the storage chamber 100 is viewed from the front opening side of the storage container 401. As illustrated in FIG. 30(*a*), a heat storage material (latent heat storage material) A is disposed, as the heat storage portions 14 and 24, on the bottom portion and side portions (including side portions at the back of the container body 10 and on the door 20, although not illustrated in FIG. 30(*a*)) of the inner wall (container inner wall) of the storage chamber 100 of the storage container 401. The heat storage material A may be, for example, tetradecane (phase change temperature 6° C.). A heat storage material (latent heat storage material) B, whose phase change temperature is higher than that of the heat storage material A, is disposed on the ceiling portion of the inner wall of the storage chamber 100 as the heat storage portion 14. The heat storage material B may be, for example, a mixture of tetradecane and hexadecane (phase change temperature 8° C.) The heat storage materials A and B are both in contact with the inner wall of the storage chamber 100. The entire area of the inner wall of the storage chamber 100 is covered by the heat storage materials A and B. The set temperature range (control temperature range) of the storage chamber 100 of the storage container 401 of this example is 3° C. to 7° C. More specifically, the lower limit of the control temperature range of the storage chamber 100 is 3° C., and the upper limit of the control temperature range of the storage chamber 100 is 7° C. The control temperature range and the phase change temperatures of the heat storage materials A and B satisfy the following relationship: lower limit of control temperature range (3° C.)<phase change temperature of heat storage material A (6° C.)<upper limit of control temperature range (7° C.)<phase change temperature of heat storage material B (8° C.) Although the phase change temperature of the heat storage material B is above the upper limit of the control temperature range in this example, the phase change temperature of the heat storage material B may instead be lower than or equal to the upper limit of the control temperature range.

In this example, the heat storage material A, which has a relatively low phase transition temperature, is arranged on portions of the inner wall of the storage chamber 100 other than the ceiling portion, and the heat storage material B, whose phase transition temperature is higher than that of the heat storage material A, is arranged on the ceiling portion. Accordingly, even when a non-uniform temperature distribution in which the temperature increases toward the top is generated in the storage chamber 100 during the operation of the storage container 401, not only the heat storage material A arranged on the portions other than the ceiling portion but also the heat storage material B arranged on the ceiling portion can be solidified. Therefore, the latent heat of the heat storage materials A and B provided in the storage chamber 100 can be sufficiently utilized, and the cold insulation time for which a low temperature in the storage chamber 100 can be maintained by the heat storage materials A and B can be increased. In addition, the heat storage material A, whose phase transition temperature is lower than that of the heat storage material B, is arranged on the portions other than the ceiling portion. Therefore, compared to the case in which the heat storage material B is arranged over the entire area of the inner wall of the storage chamber 100, the cold insulation temperature at which the temperature in the storage chamber 100 can be maintained by the heat storage materials A and B can be reduced. Thus, according to the storage container 401 of this example, high cold insulation effect can be provided by the heat storage materials A and B.

In addition, according to this example, since the phase change temperature of the heat storage material A is within the control temperature range of the storage chamber 100, even when the operation of the storage container 401 is stopped due to power failure or the like, the temperature in the storage chamber 100 can be maintained within the control temperature range for a certain time.

FIG. 30(*b*) is a sectional view illustrating the structure of a storage container 402 according to a second example of the present embodiment, illustrating the state in which the storage chamber 100 is viewed from the front opening side of the storage container 402. As illustrated in FIG. 30(*b*), the latent heat storage material A is disposed, as the heat storage portions 14 and 24, on the bottom portion and lower regions of side portions (including side portions at the back of the container body 10 and on the door 20, although not illustrated in FIG. 30(*b*)) of the inner wall of the storage chamber 100 of the storage container 402. The latent heat storage material B, whose phase change temperature is higher than that of the heat storage material A, is disposed on the ceiling portion and upper regions of the side portions of the inner wall of the storage chamber 100 as the heat storage portions 14 and 24. The entire area of the inner wall of the storage chamber 100 is covered by the heat storage materials A and B.

In this example, unlike the first example, the heat storage material B, whose phase transition temperature is higher than that of the heat storage material A, is arranged also on the upper regions of the side portions of the inner wall of the storage chamber 100. Accordingly, even when a non-uniform temperature distribution in which the temperature increases toward the top is generated in the storage chamber 100 during the operation of the storage container 401, the heat storage material arranged on the upper regions of the side portions of the inner wall of the storage chamber 100 can be reliably solidified. Therefore, the latent heat of the heat storage materials A and B provided in the storage chamber 100 can be more reliably utilized compared to the first example, so that the cold insulation time for which a low temperature in the storage chamber 100 can be maintained by the heat storage materials A and B can be increased. However, since the percentage of the heat storage material B in the total amount of heat storage materials is higher than that in the first example, the cold insulation temperature is somewhat higher than that in the first example.

FIG. 31(*a*) is a sectional view illustrating the structure of a storage container 403 according to a third example of the present embodiment, illustrating the state in which the storage chamber 100 is viewed from the front opening side of the storage container 403. As illustrated in FIG. 31(*a*), the heat storage material A is disposed, as the heat storage portions 14 and 24, on the bottom portion and side portions of the inner wall of the storage chamber 100 of the storage container 403. Also, the heat storage material B, whose phase change temperature is higher than that of the heat storage material A, is disposed on the ceiling portion and side portions of the inner wall of the storage chamber 100 as the heat storage portions 12 and 14. The heat storage materials A and B are stacked together on the side portions of the inner wall of the storage chamber 100 such that the heat storage material B is in contact with the inner wall of the storage chamber 100 and the heat storage material A is closer to the inner region of the container than the heat storage material B is. In other words, an overlapping portion in which a portion of the heat storage material A and a portion of the heat storage material B, whose phase change temperature differs from that of the heat storage material A, overlap is provided on the side portions of the inner wall of the storage chamber 100. In the overlapping portion, the heat storage material A, which has a relatively low phase change temperature, is arranged to be closer to the inner region of the container than the heat storage material B is. Also, in the overlapping portion, the heat storage material B is interposed between the heat storage material A and the heat insulating portion 12.

In this example, effects similar to those of the first example can be obtained. In addition, at the side portions of the inner wall of the storage chamber 100 on which the overlapping portion of the heat storage materials A and B is formed, entrance of heat from the outside can be suppressed by the heat storage material B which is located closer to the outside than the heat storage material A is. Therefore, the heat storage material A, which is located closer to the inner region of the container than the heat storage material B is and which has a relatively low phase change temperature, can be reliably solidified. Accordingly, the latent heat of the heat storage materials can be effectively utilized, so that the cold insulation effect of the storage container 403 provided by the heat storage materials can be increased.

FIG. 31(b) is a sectional view illustrating the structure of a storage container 404 according to a fourth example of the present embodiment, illustrating the state in which the storage chamber 100 is viewed from the front opening side of the storage container 404. As illustrated in FIG. 31(b), the storage container 404 is characterized in that an overlapping portion having a layer structure similar to that of the overlapping portion formed on the side portions in the storage container 403 according to the third example is formed not only on the side portions but also on the ceiling portion and the bottom portion. More specifically, the heat storage material B, which is in contact with the inner wall of the storage chamber 100 of the storage container 404, and the heat storage material A, which is located closer to the inner region of the container than the heat storage material B is, are stacked together over substantially the entire area of the inner wall of the storage chamber 100.

In this example, entrance of heat from the outside can be suppressed by the heat storage material B, which is located closer to the outside than the heat storage material A is, over substantially the entire area of the inner wall of the storage chamber 100 on which the overlapping portion of the heat storage materials A and B is formed. Therefore, the heat storage material A, which is located closer to the inner region of the container than the heat storage material B is and which has a relatively low phase change temperature, can be reliably solidified. Accordingly, the latent heat of the heat storage materials can be effectively utilized, so that the cold insulation effect of the storage container 404 provided by the heat storage materials can be increased.

Figure 32:
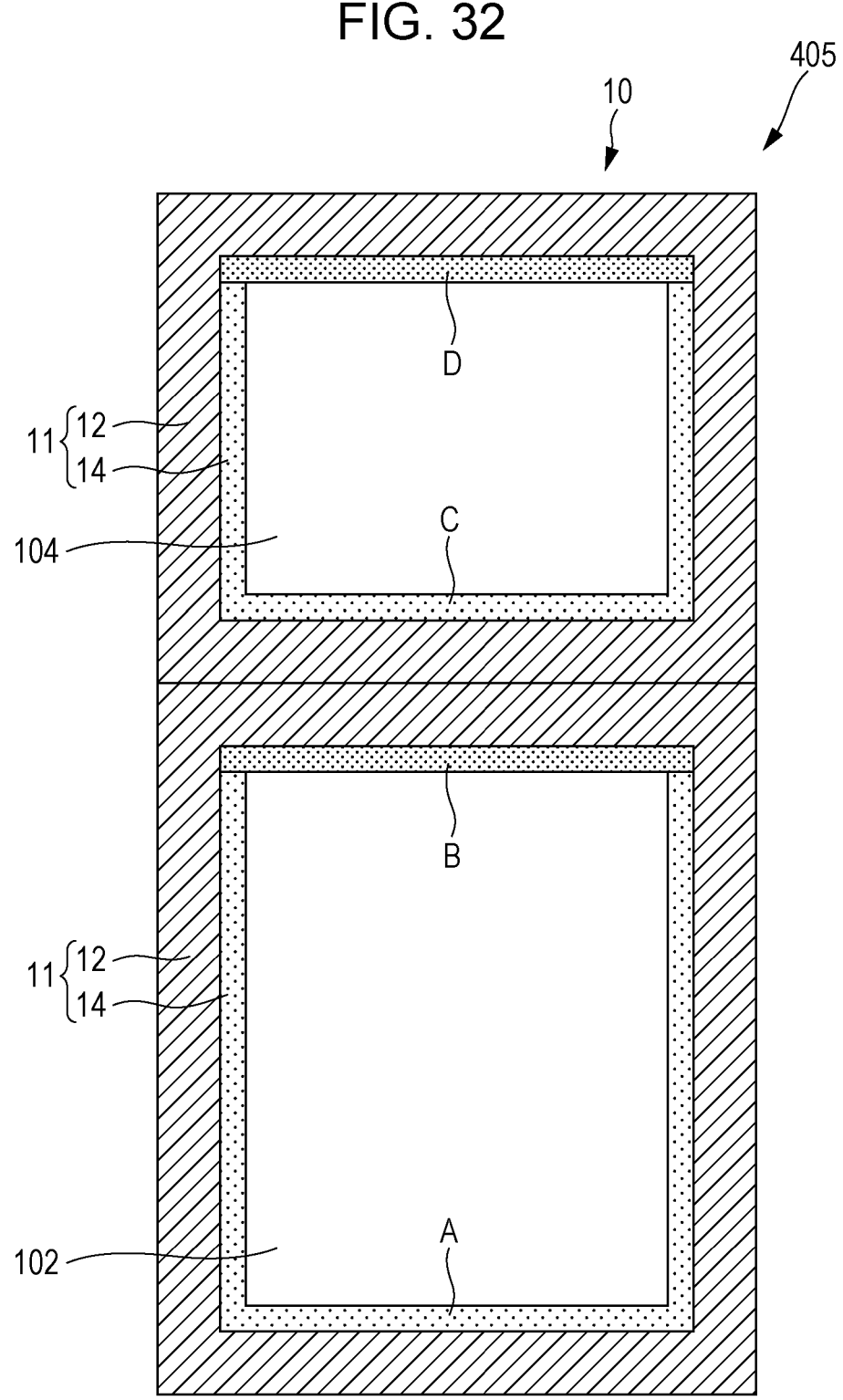
FIG. 32 is a sectional view illustrating the structure of a storage container according to a fifth example of the ninth embodiment.

FIG. 32 is a sectional view illustrating the structure of a storage container 405 according to a fifth example of the present embodiment. As illustrated in FIG. 32, the storage container 405 includes two storage chambers 102 and 104 having different control temperature ranges. In this example, the control temperature range of the lower storage chamber (refrigerator compartment) 102 is 3° C. to 7° C., and that of the upper storage chamber (freezer compartment) 104 is −22° C. to −18° C.

A heat storage material A is disposed on the bottom portion and side portions of the inner wall of the lower storage chamber 102 as the heat storage portions 14 and 24. The phase change temperature of the heat storage material A is, for example, 6° C. A heat storage material B, whose phase change temperature is higher than that of the heat storage material A, is disposed on the ceiling portion of the inner wall of the storage chamber 102 as the heat storage portion 14. The phase change temperature of the heat storage material B is, for example, 8° C. The control temperature range of the storage chamber 102 and the phase change temperature of the heat storage material A satisfy the following relationship: lower limit of control temperature range (3° C.)<phase change temperature of heat storage material A (6° C.)<upper limit of control temperature range (7° C.) The phase change temperature of the heat storage material B may either be lower than or equal to the upper limit of the control temperature range or higher than or equal to the upper limit of the control temperature range as long as the phase change temperature of the heat storage material B is higher than that of the heat storage material A.

A heat storage material C is disposed on the bottom portion and side portions of the inner wall of the upper storage chamber 104 as the heat storage portions 14 and 24. The phase change temperature of the heat storage material C is, for example, −20° C. A heat storage material D, whose phase change temperature is higher than that of the heat storage material C, is disposed on the ceiling portion of the inner wall of the storage chamber 104 as the heat storage portion 14. The phase change temperature of the heat storage material D is, for example, −18° C. The control temperature range of the storage chamber 104 and the phase change temperature of the heat storage material C satisfy the following relationship: lower limit of control temperature range (−22° C.)<phase change temperature of heat storage material C (−20° C.)<upper limit of control temperature range (−18° C.) The phase change temperature of the heat storage material D may either be lower than or equal to the upper limit of the control temperature range or higher than or equal to the upper limit of the control temperature range as long as the phase change temperature of the heat storage material D is higher than that of the heat storage material C.

In this example, the heat storage material A, which has a relatively low phase transition temperature, is arranged on portions of the inner wall of the storage chamber 102 other than the ceiling portion, and the heat storage material B, whose phase transition temperature is higher than that of the heat storage material A, is arranged on the ceiling portion. Accordingly, even when a non-uniform temperature distribution in which the temperature increases toward the top is generated in the storage chamber 102 during the operation of the storage container 405, not only the heat storage material A arranged on the portions other than the ceiling portion but also the heat storage material B arranged on the ceiling portion can be solidified. Therefore, the latent heat of the heat storage materials A and B provided in the storage chamber 102 can be sufficiently utilized, and the cold insulation time for which a low temperature in the storage chamber 102 can be maintained by the heat storage materials A and B can be increased. In addition, the heat storage material A, whose phase transition temperature is lower than that of the heat storage material B, is arranged on the portions other than the ceiling portion. Therefore, compared to the case in which the heat storage material B is arranged over the entire area of the inner wall of the storage chamber 102, the cold insulation temperature at which the temperature in the storage chamber 102 can be maintained by the heat storage materials A and B can be reduced. Thus, according to this example, high cold insulation effect for the storage chamber 102 can be provided by the heat storage materials A and B.

In addition, in this example, the heat storage material C, which has a relatively low phase transition temperature, is arranged on portions of the inner wall of the storage chamber 104 other than the ceiling portion, and the heat storage material D, whose phase transition temperature is higher than that of the heat storage material C, is arranged on the ceiling portion. Accordingly, even when a non-uniform temperature distribution in which the temperature increases toward the top is generated in the storage chamber 104 during the operation of the storage container 405, not only the heat storage material C arranged on the portions other than the ceiling portion but also the heat storage material D arranged on the ceiling portion can be solidified. Therefore, the latent heat of the heat storage materials C and D provided in the storage chamber 104 can be sufficiently utilized, and the cold insulation time for which a low temperature in the storage chamber 104 can be maintained by the heat storage materials C and D can be increased. In addition, the heat storage material C, whose phase transition temperature is lower than that of the heat storage material D, is arranged on the portions other than the ceiling portion. Therefore, compared to the case in which the heat storage material D is arranged over the entire area of the inner wall of the storage chamber 104, the cold insulation temperature at which the temperature in the storage chamber 104 can be maintained by the heat storage materials C and D can be reduced. Thus, according to this example, high cold insulation effect for the storage chamber 104 can be provided by the heat storage materials C and D.

In addition, according to this example, since the phase change temperature of the heat storage material A is within the control temperature range of the storage chamber 102 and the phase change temperature of the heat storage material C is within the control temperature range of the storage chamber 104, even when the operation of the storage container 405 is stopped due to power failure or the like, the temperatures in the storage chambers 102 and 104 can be maintained within the respective control temperature ranges for a certain time.

Figure 33:
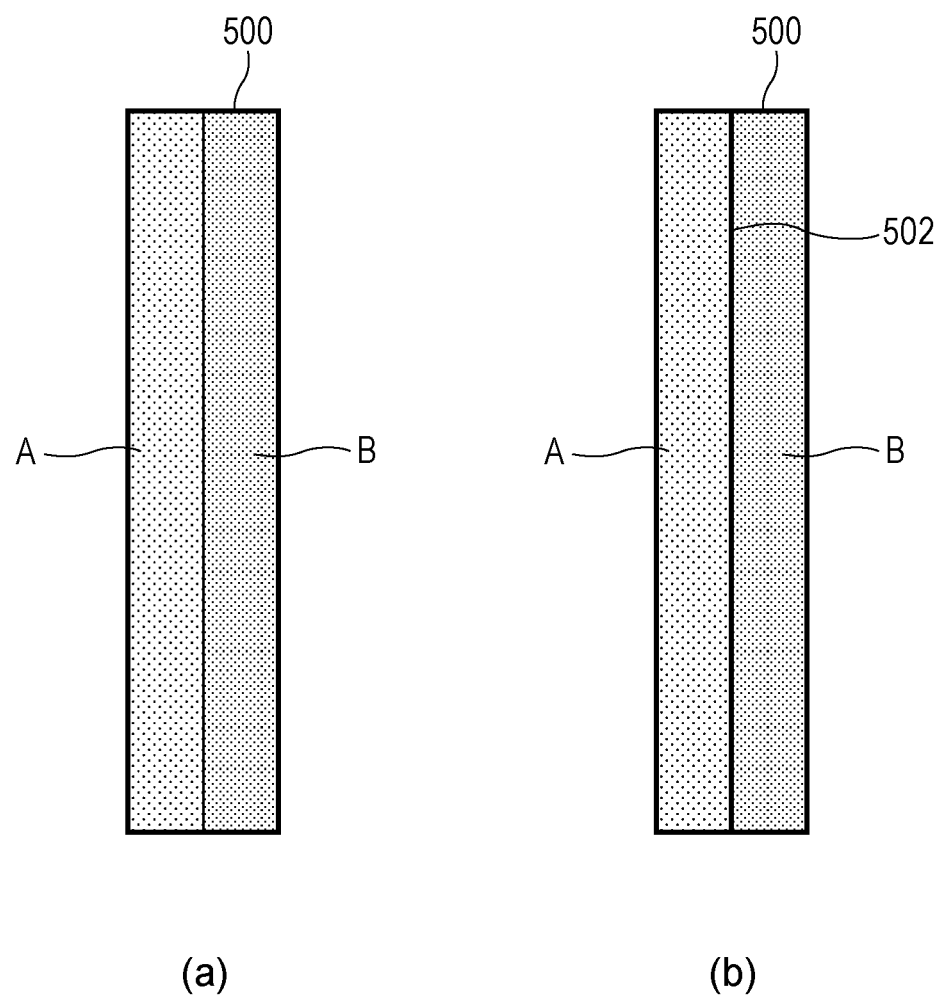
FIG. 33 illustrates examples of structures of heat storage materials A and B included in an overlapping portion.

FIG. 33 illustrates examples of structures of the heat storage materials A and B in the overlapping portions of the storage containers 403 and 404. In the example illustrated in FIG. 33(a), the heat storage materials A and B are stacked so as to be in direct contact with each other. The stacked heat storage materials A and B are packaged by being integrally covered with a thin film 500 or the like from the outside. In the example illustrated in FIG. 33(b), the heat storage materials A and B are not in direct contact with each other and a thin film 502 or the like is interposed between the heat storage materials A and B. The heat storage materials A and B may be individually packaged by being covered with respective thin films or the like and then be stacked together.

In the examples of the present embodiment, the heat storage materials are disposed on the inner wall of the storage chamber. However, the heat storage materials may instead be interposed between the inner wall and the heat insulating material. In this case, the heat storage materials are preferably in contact with the inner wall of the storage chamber so that the heat storage materials can be easily solidified.

In addition, in the present embodiment, the heat storage materials B and D, which have relatively high phase change temperatures, are disposed in upper regions of the respective storage chambers. However, the heat storage materials B and D, which have relatively high phase change temperatures, may instead be disposed in other regions of the storage chambers in which the temperatures easily increase (for example, corners, a region near a compressor, or a region in which the heat insulation performance is low).

[Tenth Embodiment]

Figure 36:
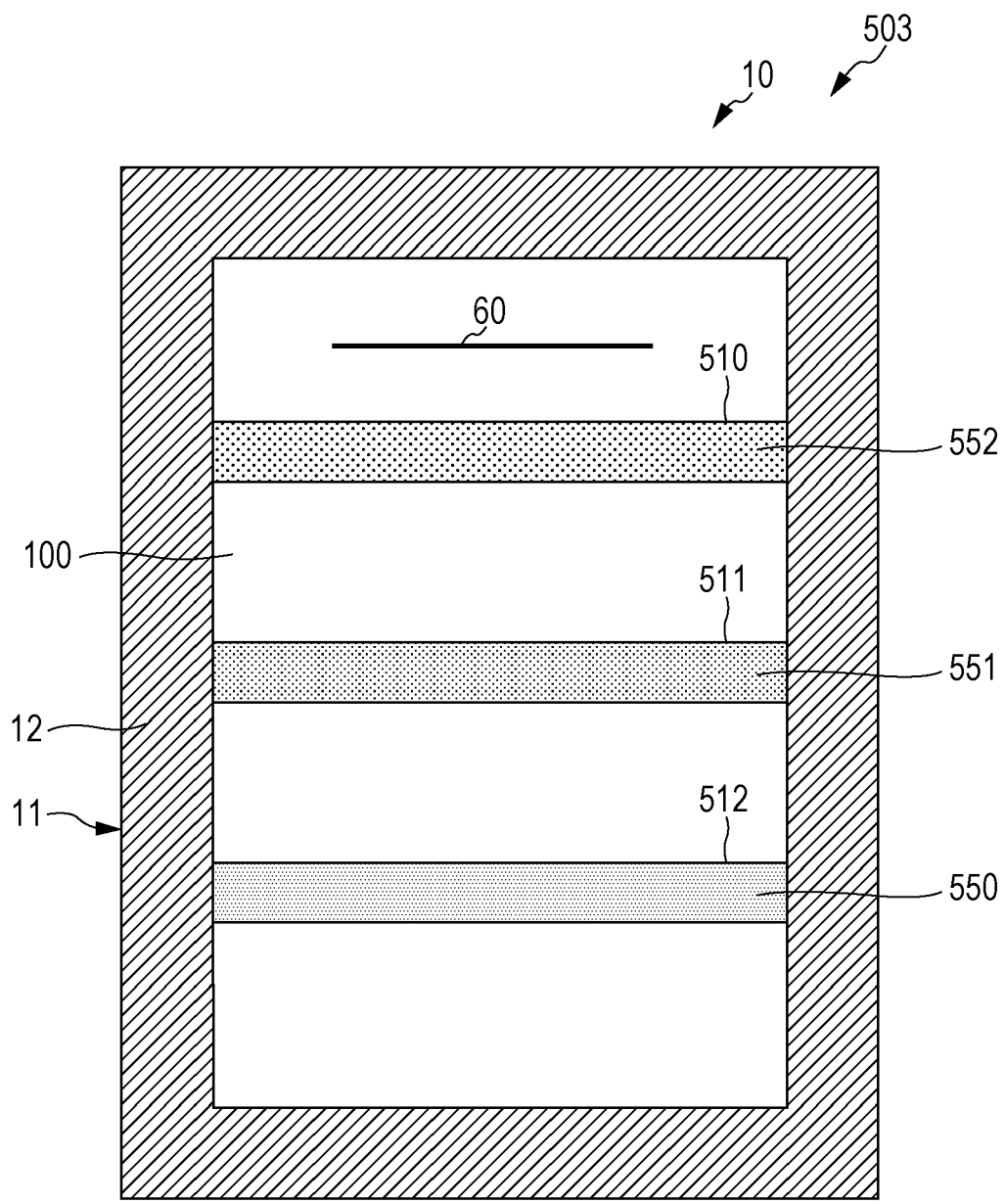
FIG. 36 illustrates a storage container according to the tenth embodiment.
Figure 37:
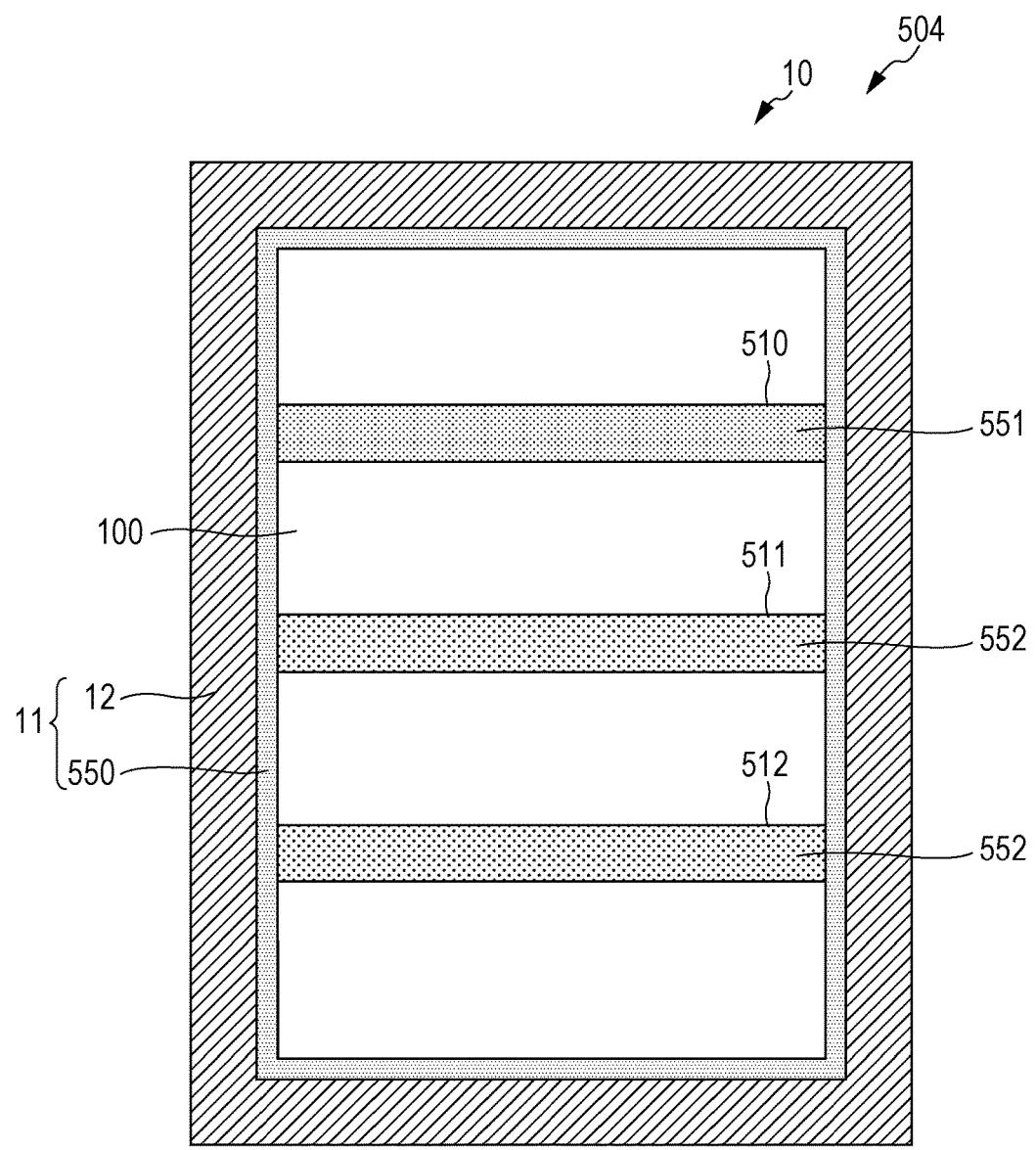
FIG. 37 illustrates a storage container according to the tenth embodiment.

FIGS. 35 to 37 illustrate storage containers according to a tenth embodiment of the present invention. Each storage container according to the present embodiment includes portions having the same structures as those of the storage containers according to the above-described embodiments. Therefore, in the present embodiment, components having the same structures as those in the above-described embodiments are denoted by the same reference numerals, and detailed descriptions thereof are thus omitted.

FIG. 35(a) is a sectional view illustrating the structure of a storage container 501 according to a first example of the present embodiment, illustrating the state in which the storage chamber 100 is viewed from the front opening side of the storage container 501. As illustrated in FIG. 35(a), shelves 510, 511, and 512 are arranged in the storage chamber 100 of the storage container 501 in that order from the top so that the storage chamber 100 is substantially evenly divided into four sections. The shelves 510, 511, and 512 are arranged so that the surfaces thereof extend horizontally with respect to the vertical direction when the storage container 501 is installed. The shelves 510, 511, and 512 are arranged in the storage chamber 100 so that an object can be mounted thereon.

The wall member 11 of the storage container 501 according to this example does not have a heat storage portion. In this example, the shelf 510 includes a heat storage material (latent heat storage material) 550 as a heat storage portion, the shelf 511 includes a heat storage material (latent heat storage material) 551 as a heat storage portion, and the shelf 512 includes a heat storage material (latent heat storage material) 552 as a heat storage portion. The heat storage material 550 is located above the heat storage material 551. The heat storage material 551 is located above the heat storage material 552. In this example, the phase change temperature of the heat storage material 550 is higher than that of the heat storage material 551, and the phase change temperature of the heat storage material 551 is higher than that of the heat storage material 552. When the storage container 501 is in operation, the temperature distribution in the storage chamber 100 is such that the temperature increases toward the top and decreases toward the bottom. However, each of the heat storage materials 550, 551, and 552 is cooled to a temperature below the phase change temperature thereof, and is maintained in a solidified state. In the storage container 501 of this example, when power failure or the like occurs, a low temperature in the storage chamber 100 is maintained by utilizing the latent heat of the heat storage materials 550, 551, and 552, so that the temperature in the storage chamber 100 can be maintained within a control temperature range for a certain time.

FIG. 35(b) is a sectional view of a storage container 502 according to a second example of the present embodiment viewed from the right. As illustrated in FIG. 35(b), in the storage container 502 of this example, no heat storage portions are arranged in the wall members 11 and 21, and heat storage materials 550, 551, and 552 are arranged on each of the shelves 510, 511, and 512 as heat storage portions. The heat storage materials 550 are located closer to the door 20 than the heat storage materials 551 are. The heat storage materials 551 are located closer to the door 20 than the heat storage materials 552 are. In this example, the phase change temperature of the heat storage materials 550 is higher than that of the heat storage materials 551, and the phase change temperature of the heat storage materials 551 is higher than that of the heat storage materials 552. When the heat flows into the storage chamber 100 from the outside through the packing P, the temperature distribution in the storage chamber 100 is such that the temperature increases as the distance to the door 20 decreases, and decreases as the distance to the door 20 increases. However, each of the heat storage materials 550, 551, and 552 is cooled to a temperature below the phase change temperature thereof, and is maintained in a solidified state. In the storage container 501 of this example, when power failure or the like occurs, a low temperature in the storage chamber 100 is maintained by utilizing the latent heat of the heat storage materials 550, 551, and 552, so that the temperature in the storage chamber 100 can be maintained within a control temperature range for a certain time.

FIG. 36 is a sectional view illustrating the structure of a storage container 503 according to a third example of the present embodiment, illustrating the state in which the storage chamber 100 is viewed from the front opening side of the storage container 503. In the storage container 503, a cold air outlet 60 is provided in an upper portion of the inner wall at the back side of the storage chamber 100. The cold air outlet 60 is located above a shelf 510.

In this example, the shelf 510 includes a heat storage material 552 as a heat storage portion, the shelf 511 includes a heat storage material 551 as a heat storage portion, and the shelf 512 includes a heat storage material 550 as a heat storage portion. The shelf 512 including the heat storage material 550 is located at a position farther from the cold air outlet 60 than the shelf 511 including the heat storage material 551 is. The shelf 511 including the heat storage material 551 is located at a position farther from the cold air outlet 60 than the shelf 510 including the heat storage material 552 is. In this example, the phase change temperature of the heat storage material 550 is higher than that of the heat storage material 551, and the phase change temperature of the heat storage material 551 is higher than that of the heat storage material 552.

The temperature distribution in the storage chamber 100 of the storage container 503 is such that the temperature decreases as the distance to the cold air outlet 60 decreases and increases as the distance to the cold air outlet 60 increases. The heat storage material 552, which has a relatively low phase change temperature, is disposed in the shelf 510, which is disposed in a region where the temperature is lowest among the shelves. The heat storage material 550, which has a relatively high phase change temperature, is disposed in the shelf 512, which is disposed in a region where the temperature is highest among the shelves. Accordingly, each of the heat storage materials 550, 551, and 552 is cooled to a temperature below the phase change temperature thereof, and is maintained in a solidified state. In the storage container 503 of this example, when power failure or the like occurs, a low temperature in the storage chamber 100 is maintained by utilizing the latent heat of the heat storage materials 550, 551, and 552, so that the temperature in the storage chamber 100 can be maintained within a control temperature range for a certain time.

FIG. 37 is a sectional view illustrating the structure of a storage container 504 according to a fourth example of the present embodiment, illustrating the state in which the storage chamber 100 is viewed from the front opening side of the storage container 504. The inner wall of the storage chamber 100 is covered with a heat storage material 550 included in the wall member 11. In addition, as illustrated in FIG. 37, a shelf 510 includes a heat storage material 551, and shelves 511 and 512 include heat storage materials 552. The phase change temperature of the heat storage material 550 is higher than that of the heat storage material 551. The phase change temperature of the heat storage material 551 is higher than that of the heat storage material 552.

The temperature in the region around the inner wall of the storage chamber 100 is relatively high. Therefore, the heat storage material 550, which has a relatively high phase change temperature, is included in the wall member 11. The shelf 510, which is disposed in an upper region of the storage chamber 100, includes the heat storage material 551 having an intermediate phase change temperature. The shelves 511 and 512, which are disposed below the center of the storage chamber 100, include the heat storage materials 552 having a relatively low phase change temperature. Each of the heat storage materials 550, 551, and 552 is cooled to a temperature below the phase change temperature thereof, and is maintained in a solidified state. In the storage container 504 of this example, when power failure or the like occurs, a low temperature in the storage chamber 100 is maintained by utilizing the latent heat of the heat storage materials 550, 551, and 552, so that the temperature in the storage chamber 100 can be maintained within a control temperature range for a certain time.

In the present embodiment, heat storage materials having relatively high phase change temperatures are disposed in regions where the temperature is relatively high. Each storage container according to the present embodiment is capable of maintaining the temperature in the storage chamber 100 low by utilizing the latent heat of the heat storage materials when power failure or the like occurs.

Next, the shelves will be described in more detail with reference to FIGS. 38 to 40. Although a shelf 520 will be described as an example, the structure of the shelf 520 may also be applied to shelves 510, 511, and 512.

FIG. 38(a) illustrates the shelf 520 according to this example viewed from the front. The shelf 520 includes a shelf board 600. The shelf board 600 is rectangular plate-shaped. An object, such as a food item, can be placed on a surface 600a of the shelf board 600. The shelf board 600 is placed on a pair of shelf board supports 602 provided on the inner wall of the storage chamber. The pair of shelf board supports 602 are provided on the left and right sides of the inner wall of the storage chamber so as to face each other in the horizontal direction. End portions of the shelf board 600 are placed on the respective shelf board supports 602 such that the surface 600a extends horizontally with respect to the vertical direction when the storage container is installed.

FIG. 38(b) illustrates the shelf 520 viewed from a back-surface-600b side of the shelf board 600. As illustrated in FIGS. 38(a) and 38(b), a heat storage material (latent heat storage material) 604 is arranged on a back surface 600b of the shelf board 600. The heat storage material 604 is packaged in a thin plate shape with a packaging material 606. The packaging material 606, with which the heat storage material 604 is packaged, is bonded to the back surface 600b with an adhesive. Thus, the storage member 604 is provided on the shelf 600.

Figure 38:
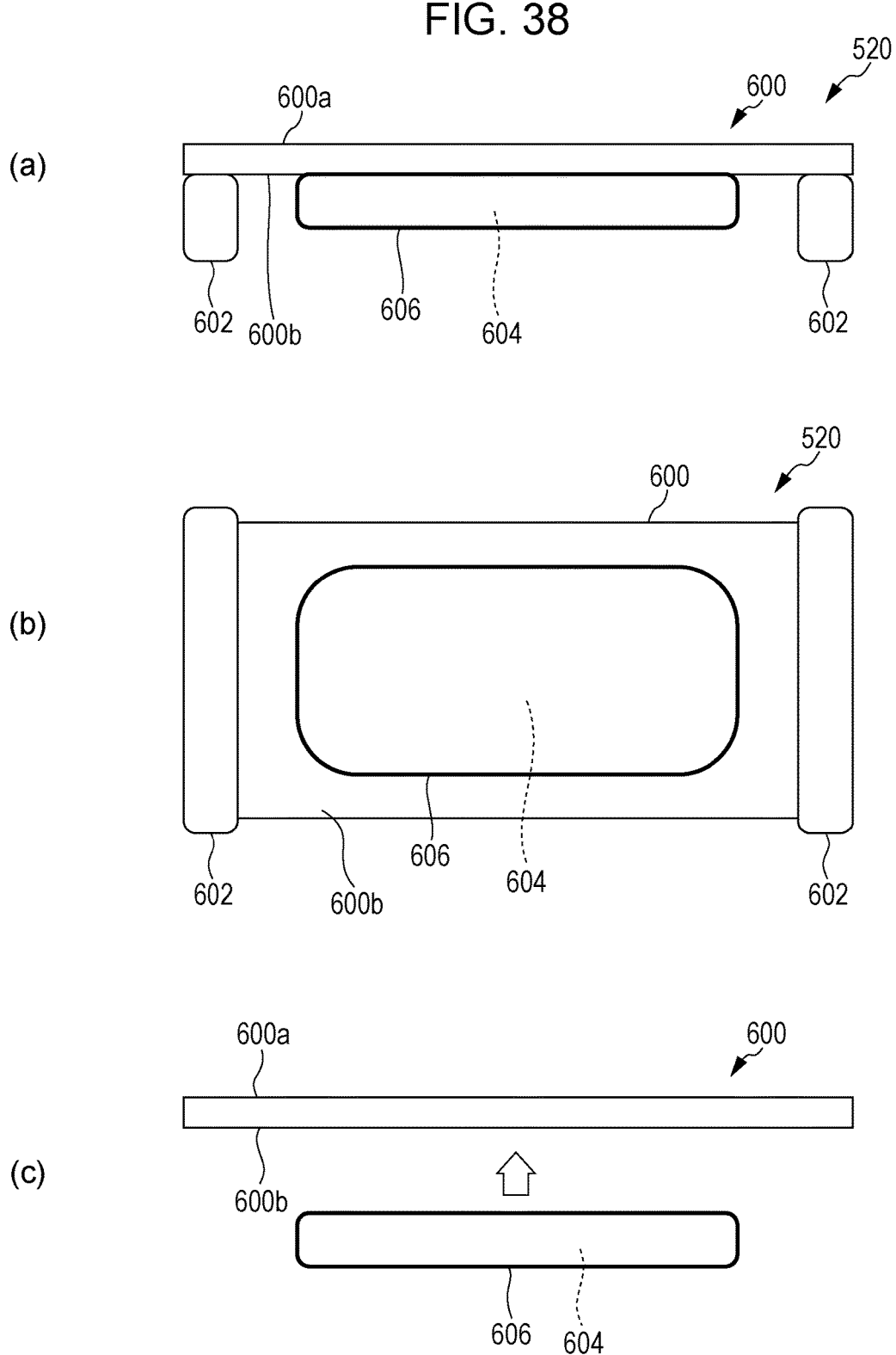
FIG. 38 illustrates a shelf 520.

FIG. 38(c) illustrates a manufacturing method of the shelf 520. The adhesive is applied to the surface of the packaging material 606 that faces the back surface 600b, and the packaging material 606 is moved in a direction shown by the empty arrow in FIG. 38(*c*), so that the packaging material 606 is bonded to the back surface 600*b*. Thus, the shelf 520 in which the shelf board 600 and the heat storage material 604 are integrated together is manufactured.

Next, another structure of the shelf 520 will be described. FIG. 39(*a*) is a front sectional view of the shelf 520 of this example. FIG. 39(*b*) illustrates the shelf 520 of this example viewed from the back-surface-600*b* side of the shelf board 600. The shelf 520 of this example includes a shelf board 600 and a tray 608. The tray 608 includes a pair of edge portions 608*a* that can be placed on the respective shelf board supports 602, that have an elongated shape, and that extend parallel to each other. A recess that is deep enough to accommodate the heat storage material 604 packaged with the packaging material 606 is formed between the edge portions 608*a*. The shelf board 600 extends from one end portion 608*a* to the other end portion 608*a* so as to cover the recess. Portions of the back surface 600*b* of the shelf board 600 above the shelf board supports 602 are bonded to the top surfaces of the end portions 608*a* by thermocompression bonding or the like. The shelf board 600 may instead be fixed to the shelf board supports 602 by inserting projections formed on the shelf board 600 into holes formed in the end portions 608*a*.

Figure 39:
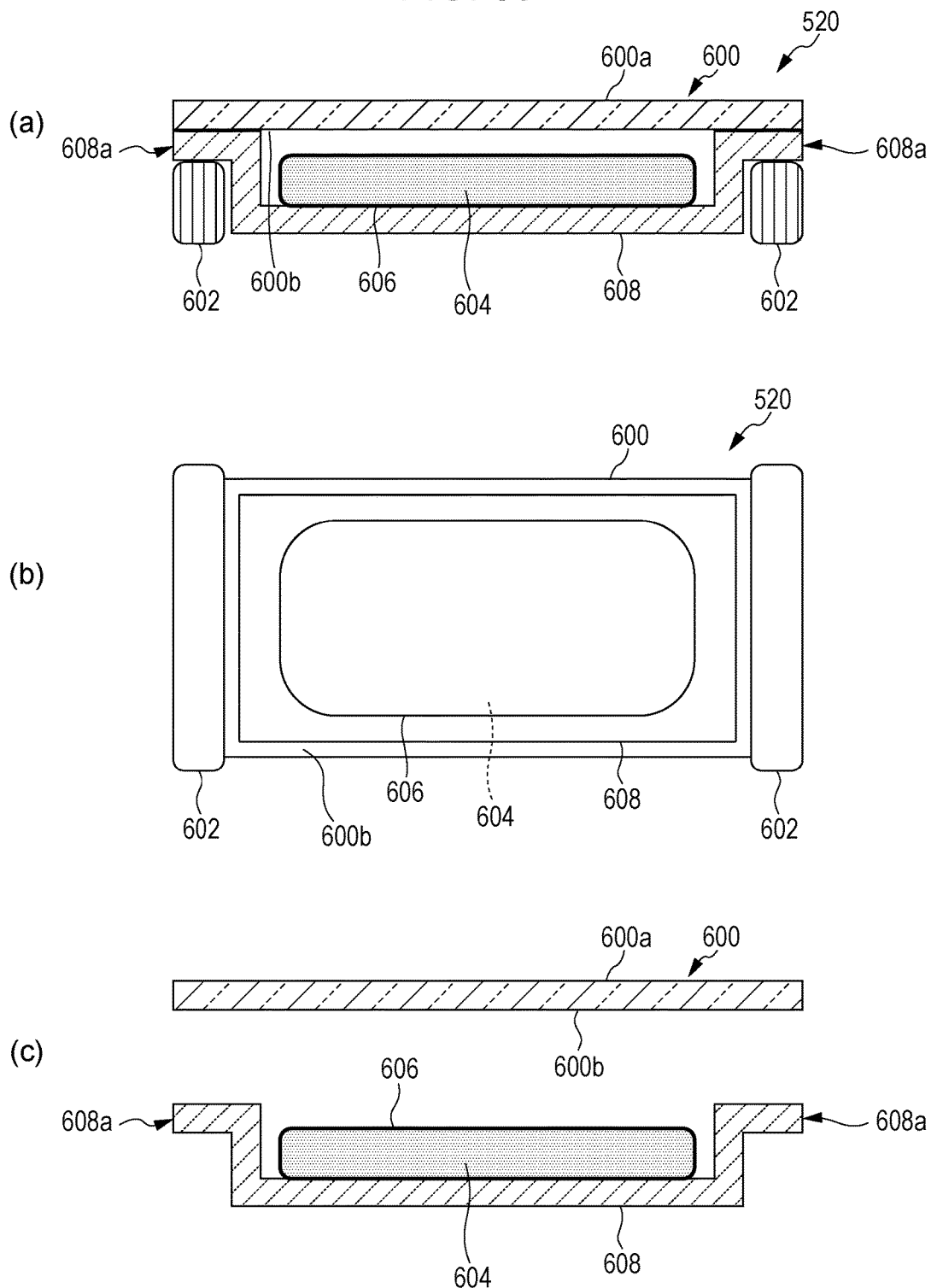
FIG. 39 illustrates a shelf 520.
Figure 40:
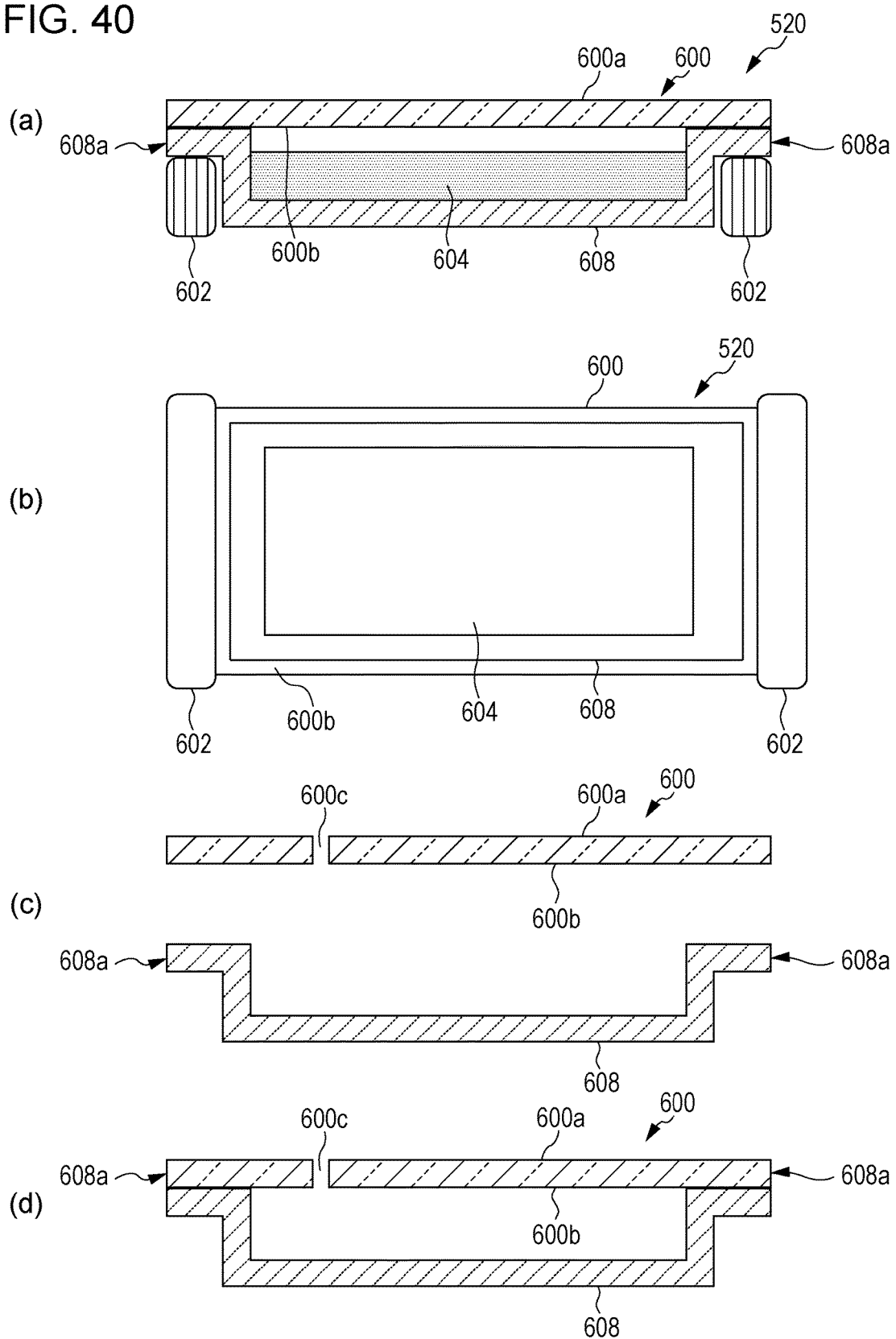
FIG. 40 illustrates a shelf 520.

FIG. 39(*c*) illustrates a manufacturing method of the shelf 520 of this example. The heat storage material 604 is placed in the recess of the tray 608, and then the shelf board 600 is placed on the tray 608 so as to cover the recess. Thus, the shelf 520 of this example is manufactured.

Next, another structure of the shelf 520 will be described. FIG. 40(*a*) is a front sectional view of the shelf 520 of this example. FIG. 40(*b*) illustrates the shelf 520 of this example viewed from the back-surface-600*b* side of the shelf board 600. The shelf 520 of this example is characterized in that the heat storage material 604 is not packaged. In the shelf 520 of this example, the heat storage material 604 is sealed by the shelf board 600 and the tray 608. Therefore, it is not necessary to package the heat storage material 604 with a packaging material.

Next, a manufacturing method of the shelf 520 of this example will be described with reference to FIGS. 40(*c*) and 40(*d*). As illustrated in FIGS. 40(*c*) and 40(*d*), the shelf board 600 and the tray 608 are integrated together before the heat storage material 604 is place on the tray 608. The shelf board 600 has an inlet 600*c*. After the shelf board 600 and the tray 608 are integrated together, the heat storage material 604 is injected into the recess of the tray 608 through the inlet 600*c*. The inlet 600*c* is a circular hole that extends through the shelf board 600. After the heat storage material 604 has been injected, the inlet 600*c* is closed. In this way, the shelf 520 is manufactured.

[Eleventh Embodiment]

Figure 41:
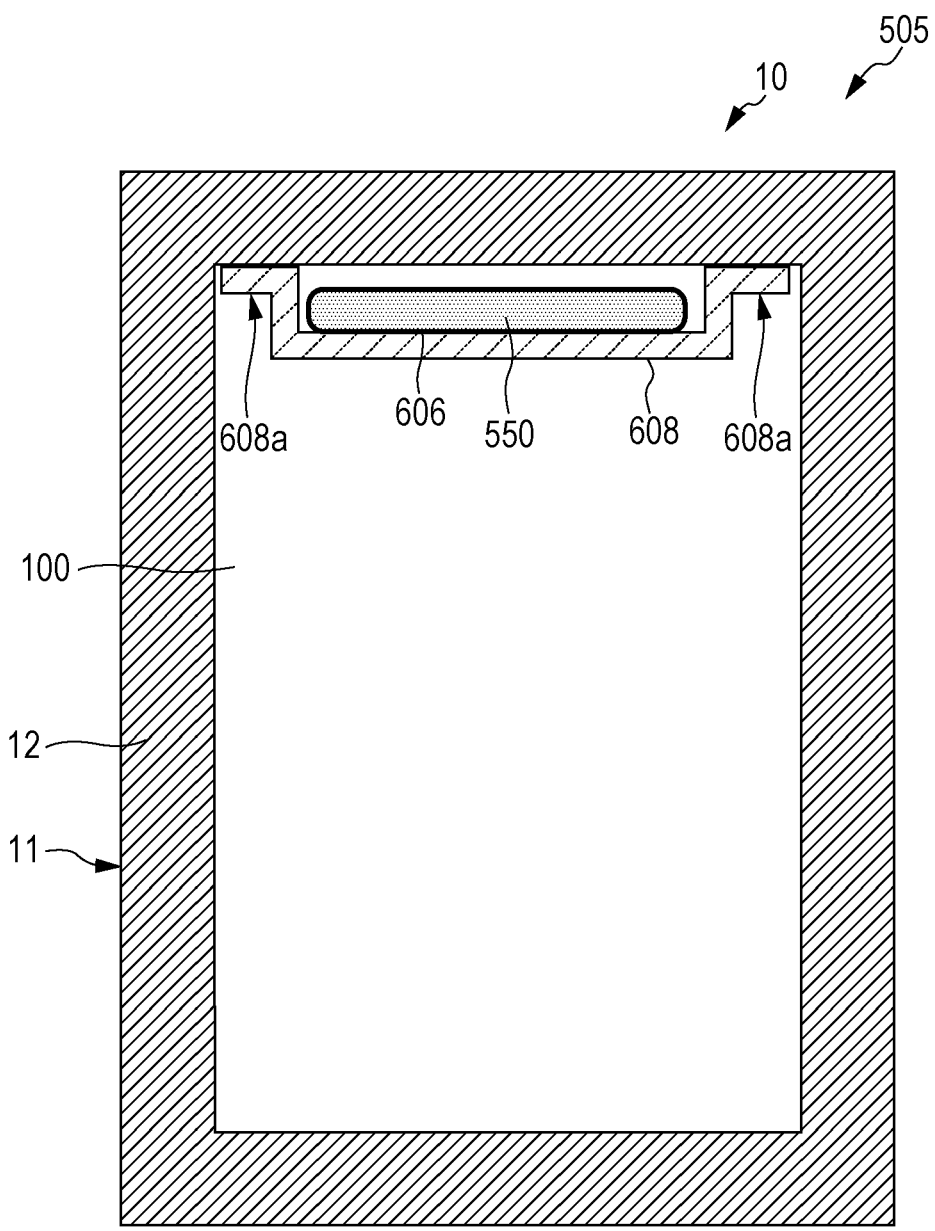
FIG. 41 illustrates a storage container according to an eleventh embodiment.

FIG. 41 illustrates a storage container according to an eleventh embodiment of the present invention. The storage container according to the present embodiment includes portions having the same structures as those of the storage containers according to the above-described embodiments. Therefore, in the present embodiment, components having the same structures as those in the above-described embodiments are denoted by the same reference numerals, and detailed descriptions thereof are thus omitted.

FIG. 41 is a sectional view illustrating the structure of a storage container 505 according to the present embodiment, illustrating the state in which the storage chamber 100 is viewed from the front opening side of the storage container 505. As illustrated in FIG. 41, the tray 608 on which the heat storage material 550 is placed is provided on the ceiling of the storage chamber 100. The pair of end portions 608*a* are fixed to the ceiling of the storage chamber 608 with screws or the like. Alternatively, the tray 608 may instead be fixed to the ceiling of the storage chamber 100 by engaging hook-shaped projections formed on the ceiling with holes having a predetermined shape formed in the end portions 608*a*.

[Twelfth Embodiment]

FIGS. 42 to 45 illustrate shelves included in storage containers according to a twelfth embodiment of the present invention. Each storage container according to the present embodiment includes portions having the same structures as those of the storage containers according to the above-described embodiments. Therefore, in the present embodiment, components having the same structures as those in the above-described embodiments are denoted by the same reference numerals, and detailed descriptions thereof are thus omitted.

Figure 42:
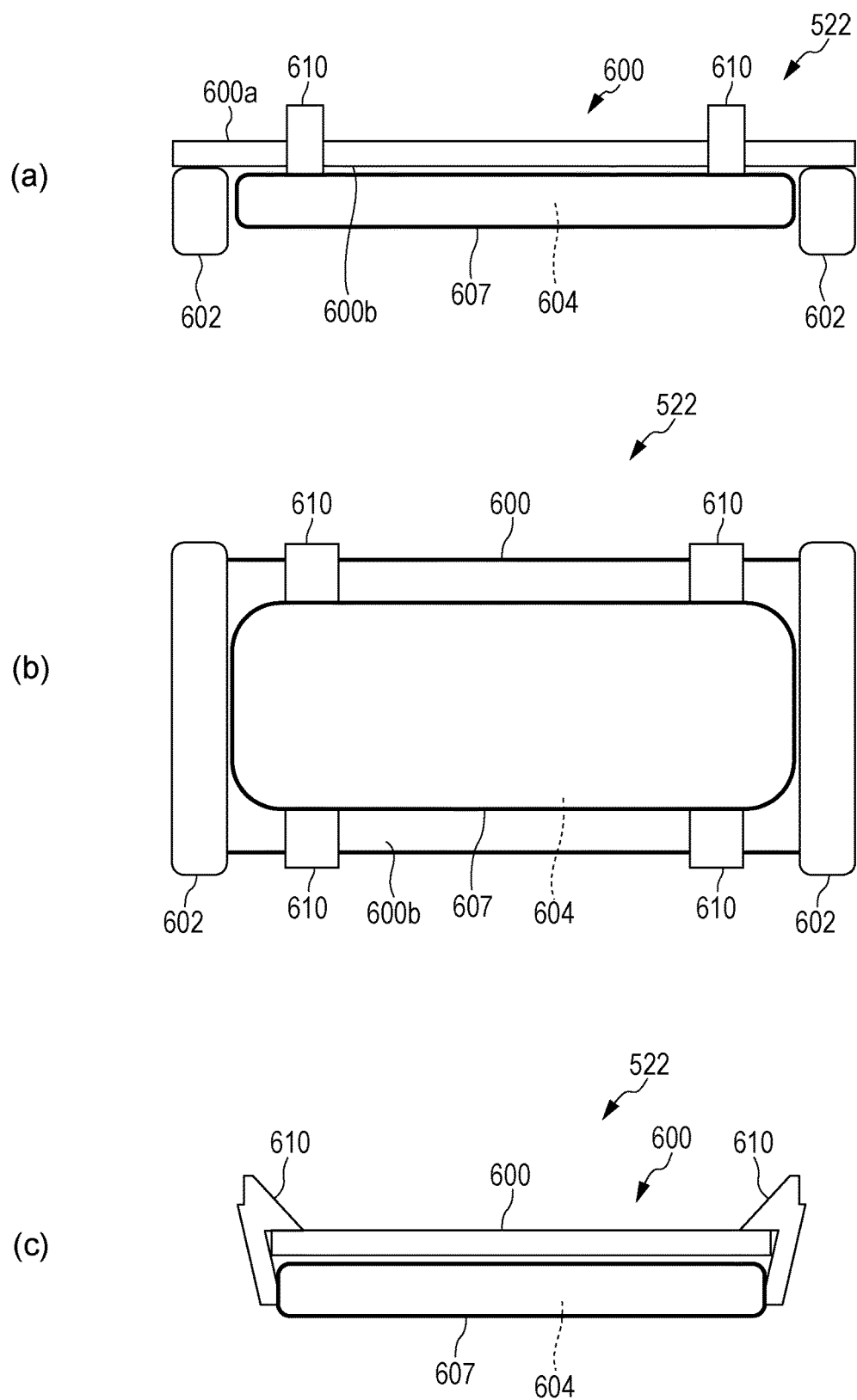
FIG. 42 illustrates a shelf 522 included in a storage container according to the twelfth embodiment.

FIG. 42 illustrates a shelf 522 included in a storage container according to a first example of the present embodiment. FIG. 42(*a*) is a front view of the shelf 522. FIG. 42(*b*) illustrates the shelf 522 viewed from the back-surface-600*b* side of the shelf board 600. FIG. 42(*c*) is a side view of the shelf 522.

The shelf 522 includes the heat storage material 604 sealed in a hard container 607. The container 607 is arranged on the back surface 600*b* of the shelf board 600. The container 607 is thin plate shaped. Four hook-shaped portions 610 are provided on the container 607. The hook-shaped portions 610 are engaged with the shelf board 600. Thus, the container 607 is attached to the shelf board 600.

Figure 43:
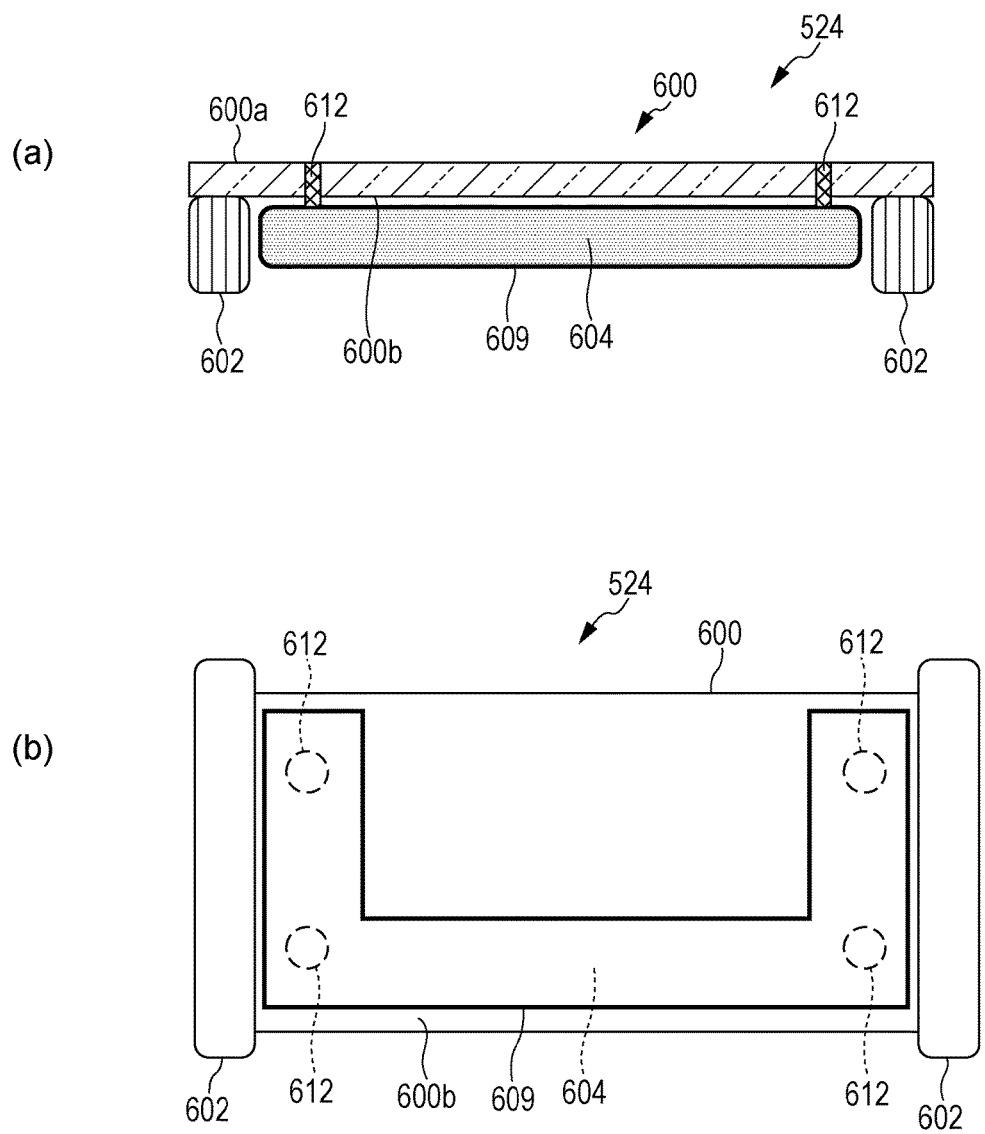
FIG. 43 illustrates a shelf 524 included in a storage container according to the twelfth embodiment.

FIG. 43 illustrates a shelf 524 included in a storage container according to a second example of the present embodiment. FIG. 43(*a*) is a front sectional view of the shelf 524. FIG. 43(*b*) illustrates the shelf 524 viewed from the back-surface-600*b* side of the shelf board 600.

The shelf 524 includes a hard container 609. The heat storage material 604 is sealed in the container 609. Four pairs of holes that face each other are formed in the shelf board 600 and the container 609, and rivets 612 are inserted into the holes. Thus, the container 609 is fixed to the shelf board 600. The container 609 is angular U-shaped when the back surface 600*b* is viewed in the direction of the normal. With the container 609 having this shape, the space below the shelf 524 can be increased.

Figure 44:
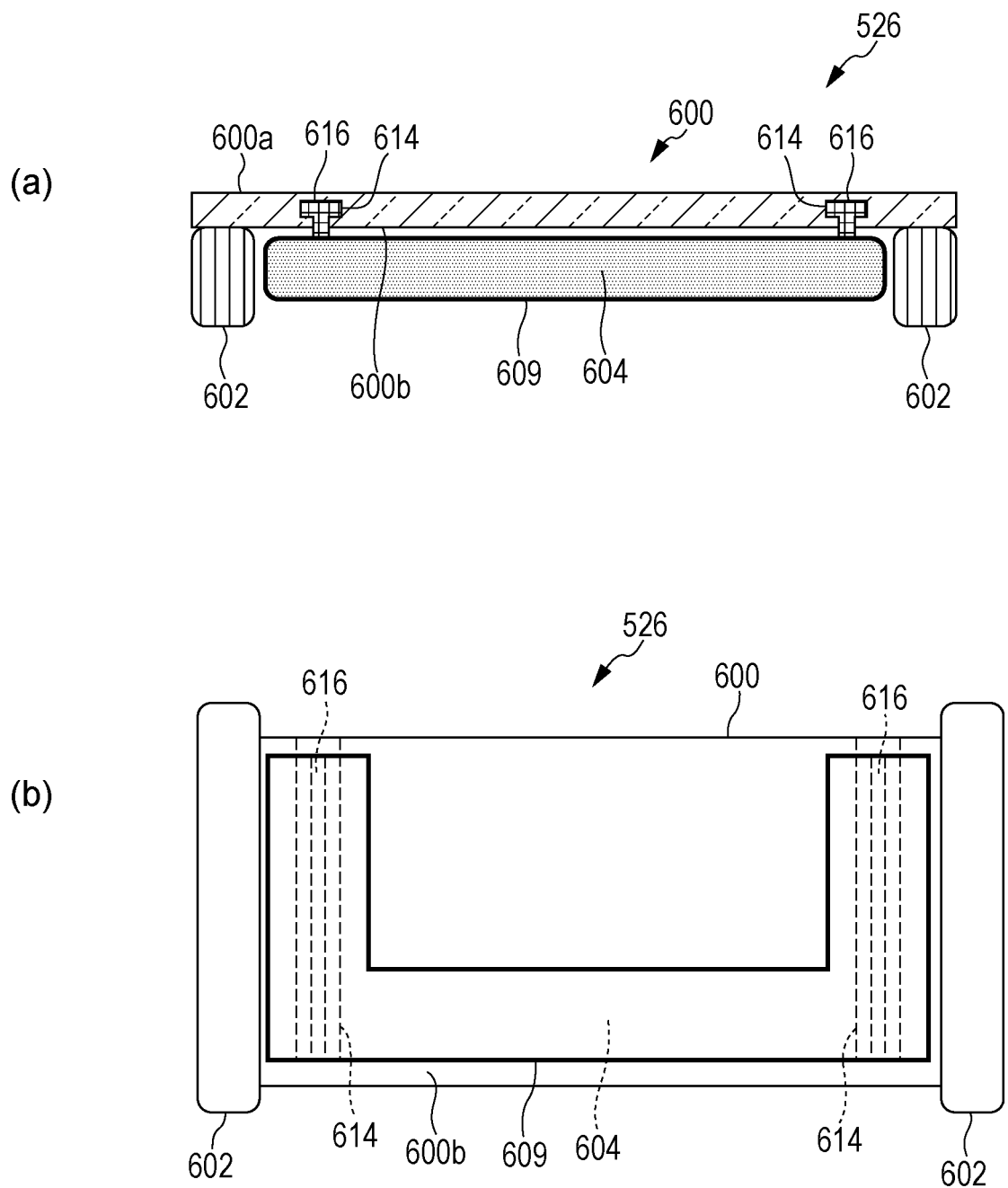
FIG. 44 illustrates a shelf 526 included in a storage container according to the twelfth embodiment.

FIG. 44 illustrates a shelf 526 included in a storage container according to a third example of the present embodiment. FIG. 44(*a*) is a front sectional view of the shelf 526. FIG. 44(*b*) illustrates the shelf 526 viewed from the back-surface-600*b* side of the shelf board 600.

The shelf board 600 has grooves 614 that open in portions of the back surface 600*b* and portions of a side surface that is perpendicular to the back surface 600*b*. The grooves 614 are formed such that the width thereof is relatively large at the front-surface-600*a* side and relatively small at the back-surface-600*b* side. The grooves 614 are formed in a T-shape in cross section when viewed in a state such that the back surface 600*b* is at the bottom.

T-shaped projections 616, whose shape matches the shape of the grooves 614, are formed on a surface of the container 609 that faces the back surface 600*b*. The length of the projections 616 is substantially equal to that of the grooves 614. The projections 616 can be fitted to the grooves 614. The container 609 is fixed to the shelf board 600 by fitting the projections 616 into the grooves 614.

FIG. 45 illustrates a shelf 528 included in a storage container according to a fourth example of the present embodiment. FIG. 45(a) is a front sectional view of the shelf 528. FIG. 45(b) illustrates the shelf 528 viewed from the back-surface-600b side of the shelf board 600.

The shelf 528 includes two hard containers 611. Heat storage materials 604 are sealed in the respective containers 611. Two pairs of holes that face each other are formed in the shelf board 600 and each container 611, and rivets 612 are inserted in these holes. Thus, the containers 611 are fixed to the shelf board 600. Each container 611 is L-shaped when the back surface 600b is viewed in the direction of the normal. The containers 611 having this shape can be attached to the shelf board 600 irrespective of the width of the shelf board 600.

In each of the above-described embodiments and the present embodiment, the shelf is structured such that the heat storage material is arranged on the back surface 600b of the shelf board 600. However, the structure of the shelf is not limited to this. For example, the shelf may instead be structured such that the heat storage material is arranged on the front surface 600a of the shelf board 600.

In addition, in the above-described embodiments and the present embodiment, each heat storage material 604 is attached to the shelf board 600 by, for example, using rivets or fitting T-shaped male parts (projections 616) to T-shaped female parts (grooves 614). However, the attachment method is not limited to this. For example, the heat storage material 604 may be fixed to the shelf board 600 by fitting screws to threaded holes having the same shape formed in the shelf board 600 and the heat storage material 604. Alternatively, the heat storage material 604 may be bonded to the shelf board 600 by using an adhesive or a piece of adhesive tape. Alternatively, the shelf board 600 and the heat storage material 604 may be completely fixed together by ultrasonic thermocompression bonding. The heat storage material 604 may either be completely fixed to the shelf board 600 or be detachably attached to the shelf board 600. Also, these fixing methods may be applied in combination to attach the heat storage material 604 to the shelf board 600.

[Thirteenth Embodiment]

Next, a method for measuring the phase change temperature (melting point) of a heat storage material included in a storage container will be described. First, a method for measuring the phase change temperature of the heat storage material with a DSC will be described with reference to FIG. 21(b). The phase change temperature is determined as a temperature at the intersecting point C between an imaginary line X1 and an imaginary line X2.

Alternatively, whether or not the heat storage material has melted may be visually checked while the heat storage material is being heated, and the temperature at which the heat storage material has melted may be determined as the phase change temperature. In this case, instead of visually observing the heat storage material, the optical transmittance of the heat storage material may be measured and the temperature at which the transmittance of the heat storage material has changed may be determined as the phase change temperature.

Alternatively, a thermocouple may be inserted into a sample of the heat storage material while the sample is being heated or cooled at a certain amount of heat, and the temperature at which the temperature change has been reduced to approximately zero may be determined as the phase change temperature.

[Fourteenth Embodiment]

Figure 46:
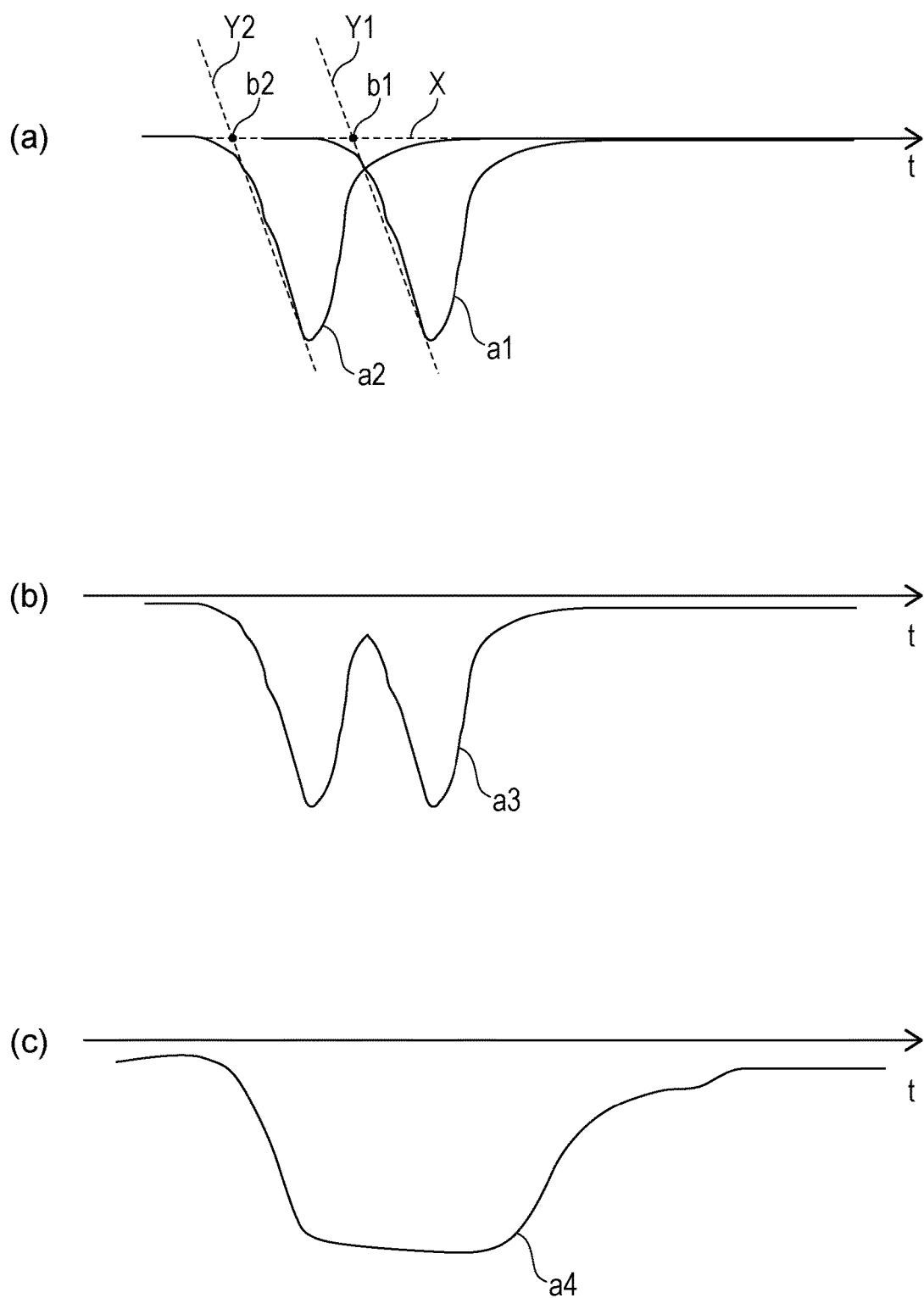
FIG. 46 illustrates endothermic peak temperatures of heat storage materials included in a storage container according to a fourteenth embodiment.

Next, types of heat storage materials included in a storage container will be described. First, an example in which a heat storage material A1 and a heat storage material A2 are used will be described with reference to FIG. 46(a). FIG. 46(a) shows the result of measurement of the phase change temperatures (endothermic peak temperatures) of the heat storage materials A1 and A2 with a DSC in a temperature rising process. In FIGS. 46(a) to 46(c), the horizontal axis represents the temperature t and the vertical axis represents the amount of heat. In FIGS. 46(a) to 46(c), the solid curves show the measurement results obtained when a DSC furnace is heated at a predetermined temperature rising rate. In FIG. 46(a), the measurement result of the heat storage material A1 is shown by the curve a1, and the measurement result of the heat storage material A2 is shown by the curve a2. The dashed line obtained by extending, toward the high temperature side, straight portions of the curves in ranges before the start of phase transition of the heat storage materials A1 and A2 from the solid phase to the liquid phase is defined as an imaginary straight line X. The dashed line obtained by extending a straight portion of the curve a1 in a range after the start of phase transition of the heat storage material A1 and before the amount of heat absorbed reaches a maximum is defined as an imaginary straight line Y1. The dashed line obtained by extending a straight portion of the curve a2 in a range after the start of phase transition of the heat storage material A2 and before the amount of heat absorbed reaches a maximum is defined as an imaginary straight line Y2. The phase change temperature of the heat storage material A1 is the temperature at the intersecting point b1 between the imaginary lines X and Y1. The phase change temperature of the heat storage material B1 is the temperature at the intersecting point b2 between the imaginary lines X and Y2.

The heat storage materials A1 and A2 are separately arranged depending on the temperatures at which they are located. In this example, the phase change temperature of the heat storage material A1 is higher than that of the heat storage material A2. Therefore, the heat storage material A1 is disposed at a location where the temperature is relatively high. The heat storage material A2 is disposed at a location where the temperature is relative low. Thus, different types of heat storage materials may be arranged in accordance with the temperatures of the locations where they are arranged. When heat storage materials are selected in accordance with the locations thereof, the latent heat of the heat storage materials can be effectively utilized for cold insulation of the storage chamber.

Next, a heat storage material having a plurality of endothermic peak temperatures will be described with reference to FIG. 46(b). In FIG. 46(b), the curve a3 shows the result of measurement with a DSC in a temperature rising process in which a plurality of endothermic peak temperatures (two endothermic peak temperatures) are obtained. An example of a material having two endothermic peak temperatures is pentadecane. A heat storage portion having two endothermic peak temperatures may be formed by microcapsulating each of the heat storage materials A1 and A2 and sealing the microcapsules with a single packaging material or in a shelf. The heat storage portion having a plurality of endothermic peak temperatures (two endothermic peak temperatures) has more freedom in terms of arrangement position thereof. Therefore, the materials and components of the storage container can be simplified.

Next, a heat storage material having an endothermic peak temperature with a wide temperature range (broad peak type) will be described with reference FIG. 46(c). In FIG. 46(c), the curve a4 shows the result of measurement with a DSC in a temperature rising process in which an endothermic peak temperature with a wide temperature range is obtained. An example of a material having an endothermic peak temperature with a wide temperature range is natural oil. In a material having an endothermic peak temperature with a wide temperature range, there is a temperature difference between the melting start point and the melting end point.

Although preferred embodiments of the present invention have been described with reference to the accompanying drawings, the present invention is, of course, not limited to the embodiments. Shapes, combinations, etc., of the components described in the embodiments are merely examples, and various changes may be made in accordance with, for example, the design requirements within the scope of the present invention.

INDUSTRIAL APPLICABILITY

The present invention is applicable to storage containers that store an object at a temperature different from the ambient temperature.

REFERENCE SIGNS LIST 1 to 9, 300, 401 to 405 . . . storage container, 10 . . . container body, 11, 21 . . . wall member, 12, 13, 22 . . . heat insulating portion, 14, 24 . . . heat storage portion, 18 . . . housing, 20 . . . door (lid), 30 . . . reflective layer (infrared reflective layer), 100, 102, 104 . . . storage chamber, 101 . . . opening, 500, 502 . . . film, AR1 . . . first region, AR2 . . . second region, P . . . packing, D1, D2, U, U1, and U2 . . . curve

The invention claimed is:

1. A storage container that has an electric cooling function and stores an object, the storage container comprising:
    at least one storage chamber that stores the object;
    a door at an opening of the at least one storage chamber;
    a first latent heat storage material that is disposed in the at least one storage chamber and has a predetermined phase change temperature; and
    a second latent heat storage material that is disposed in the at least one storage chamber and has a phase change temperature higher than the phase change temperature of the first latent heat storage material, wherein
    the second latent heat storage material is disposed in at least a portion of an upper region of the at least one storage chamber, and
    the first latent heat storage material or the second latent heat storage material is thicker in an area adjacent to a boundary between the opening and the door of the at least one storage chamber than in another area of the at least one storage chamber.

2. The storage container according to claim 1, further comprising:
    a first insulating material that is inside a wall of each of the at least one storage chamber and the door of the at least one storage chamber, and
    a second insulating material that is inside the wall and has an insulation performance higher than an insulation performance of the first insulating material, wherein
    the first insulating material is in a region where a thickness of the first latent heat storage material or the second latent heat storage material in a thickness direction is thinner than the second insulating material.

3. The storage container according to claim 1, further comprising:
    an overlapping portion in which at least a portion of the first latent heat storage material and at least a portion of the second latent heat storage material are disposed in an overlapping manner, wherein
    in the overlapping portion, the first latent heat storage material is located closer to an inner region of the storage container than the second latent heat storage material.

4. The storage container according to claim 1, wherein
    a phase change temperature of the first latent heat storage material is within a control temperature range of the at least one storage chamber, and
    a phase change temperature of the second latent heat storage material is higher than or equal to an upper limit of the control temperature range of the at least one storage chamber.

* * * * *